(12) United States Patent
Seifi et al.

(10) Patent No.: US 10,880,576 B2
(45) Date of Patent: Dec. 29, 2020

(54) METHOD FOR ENCODING A LIGHT FIELD CONTENT

(71) Applicant: THOMSON Licensing, Issy-les-Moulineaux (FR)

(72) Inventors: Mozhdeh Seifi, Thorigne-Fouillard (FR); Valter Drazic, Betton (FR); Arno Schubert, Chevaigne (FR); Olivier Bureller, Cesson Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 41 days.

(21) Appl. No.: 15/761,088

(22) PCT Filed: Sep. 15, 2016

(86) PCT No.: PCT/EP2016/071873
§ 371 (c)(1),
(2) Date: Mar. 17, 2018

(87) PCT Pub. No.: WO2017/046272
PCT Pub. Date: Mar. 23, 2017

(65) Prior Publication Data
US 2018/0262776 A1    Sep. 13, 2018

(30) Foreign Application Priority Data

Sep. 17, 2015   (EP) ..................................... 15306435
Sep. 17, 2015   (EP) ..................................... 15306437
(Continued)

(51) Int. Cl.
*G06K 9/00*      (2006.01)
*H04N 19/60*    (2014.01)
(Continued)

(52) U.S. Cl.
CPC ............. *H04N 19/60* (2014.11); *G06T 7/557* (2017.01); *H04N 19/597* (2014.11); *G06T 2207/10052* (2013.01)

(58) Field of Classification Search
CPC ...... H04N 19/60; H04N 19/597; G06T 7/557; G06T 2207/10052
See application file for complete search history.

(56) References Cited

U.S. PATENT DOCUMENTS 6,023,523 A   2/2000   Cohen et al.
6,097,394 A   8/2000   Levoy et al.
(Continued)

FOREIGN PATENT DOCUMENTS

GB     2488905          9/2012
JP     2007240295 A     9/2007
(Continued)

OTHER PUBLICATIONS

Author Unknown, "Bresenhann's Line Algorithm", Wikipedia, Version from Aug. 30, 2015 (Year: 2015).*
(Continued)

*Primary Examiner* — Aaron W Carter
(74) *Attorney, Agent, or Firm* — Robert D. Shedd

(57) ABSTRACT

In one embodiment, it is proposed a method for encoding a light field content. The method is remarkable in that it comprises: —obtaining, for a set of light rays (401) associated with said light field content, four coordinates per light ray from a two planes parametrization (2000; 402, 403) of said light field content; —obtaining (2001), for each light ray from said set, two coordinates from said four coordinates, corresponding to a projection of said light rays from said set onto a plane (404, 405, P) perpendicular to two planes used in said two planes parametrization, defining points in a first 2D ray diagram ($\Pi(\chi_1, \chi_2)$, $\Pi(\chi_1, \chi_2)$);
(Continued)

—applying (2002) a discrete Radon transform on said first 2D ray diagram ($\Pi(\chi_1, \chi_2), \Pi(\chi_1, \chi_2)$) that delivers lines of interest in said first 2D ray diagram; —encoding (2003) said lines of interest into encoded lines of interest; and—storing (2004) said encoded lines of interest.

17 Claims, 34 Drawing Sheets

(30) Foreign Application Priority Data

| Sep. 17, 2015 | (EP) | 15306438 |
|---|---|---|
| Sep. 17, 2015 | (EP) | 15306439 |
| Sep. 17, 2015 | (EP) | 15306440 |
| Sep. 17, 2015 | (EP) | 15306441 |

(51) Int. Cl.
  *H04N 19/597* (2014.01)
  *G06T 7/557* (2017.01)

(56) References Cited

U.S. PATENT DOCUMENTS

| 8,237,708 | B2 | 8/2012 | Mantzel | |
| 9,593,982 | B2* | 3/2017 | Rhoads | G01J 3/513 |
| 9,843,787 | B2* | 12/2017 | Georgiev | G06T 5/50 |
| 2009/0304264 | A1* | 12/2009 | Au | G06T 7/557 |
| | | | | 382/154 |
| 2010/0265386 | A1 | 10/2010 | Raskar et al. | |
| 2011/0032337 | A1* | 2/2011 | Rodriguez Ramos | |
| | | | | G06T 15/205 |
| | | | | 348/49 |
| 2013/0176394 | A1 | 7/2013 | Tian et al. | |
| 2013/0258098 | A1 | 10/2013 | Ikemoto | |
| 2014/0003732 | A1 | 1/2014 | Le Floch | |
| 2014/0263963 | A1* | 9/2014 | Broxton | G02B 21/367 |
| | | | | 250/208.1 |
| 2015/0146032 | A1 | 5/2015 | Rime et al. | |
| 2015/0177062 | A1* | 6/2015 | Nishiyama | G01J 1/4228 |
| | | | | 702/150 |
| 2015/0312549 | A1* | 10/2015 | Georgiev | G06T 5/50 |
| | | | | 348/46 |
| 2016/0063706 | A1* | 3/2016 | Gonzalez-Banos | G06T 7/73 |
| | | | | 348/222.1 |
| 2017/0048551 | A1* | 2/2017 | Evenou | H04N 19/60 |
| 2017/0085832 | A1* | 3/2017 | Drazic | H04N 5/9201 |
| 2018/0131861 | A1* | 5/2018 | Schillebeeckx | G06T 7/80 |
| 2018/0260968 | A1* | 9/2018 | Drazic | G06T 5/50 |
| 2018/0262776 | A1* | 9/2018 | Seifi | H04N 19/597 |
| 2019/0101765 | A1* | 4/2019 | Blonde | G01J 1/4257 |
| 2019/0174115 | A1* | 6/2019 | Drazic | G06T 5/50 |
| 2019/0295232 | A1* | 9/2019 | Blonde | G06T 19/20 |

FOREIGN PATENT DOCUMENTS

| WO | WO2007013194 | 2/2007 |
| WO | WO2010126612 | 11/2010 |
| WO | WO2013168091 | 11/2013 |
| WO | WO2013180192 | 12/2013 |
| WO | WO2014149403 | 9/2014 |

OTHER PUBLICATIONS

Yamashita et al., "Compressive Acquisition of Ray-Space Using Radon Transform", IS&T/SPIE Electronic Imaging Conference, San Jose, California, USA, Feb. 18, 2009, pp. 1-10.

Zhang et al., "Spectral Analysis for Sampling Image-Based Rendering Data", IEEE Transactions on Circuits and Systems for Video Technology, vol. 13, No. 11, Nov. 2003, pp. 1038-1050.

Zhang et al., "A survey on image-based rendering-representation, sampling and compression", Signal Processing: Image Communication, vol. 19, No. 11, Jan. 2004, pp. 1-28.

Lin et al., "Occlusion-Aware Layered Scene Recovery From Light Fields", 2013 20th IEEE International Conference on Image Processing (ICIP), Melbourne, Australia, Sep. 15, 2013, pp. 295-299.

Egan et al: "Frequency Analysis and Sheared Filtering for Shadow Light Fields of Complex Occluders", ACM Transactions on Graphics, vol. 30, No. 2, Article 9, Apr. 2011, pp. 9:1-9:13.

Zhang et al., "Generalized Plenoptic Sampling", Carnegie Mellon University, Electrical and Computer Engineering, Technical Report AMP 01-06, Sep. 2001, pp. 1-32.

Levin et al., "Understanding camera trade-offs through a Bayesian analysis of light field projections", 10th European Conference on Computer Vision (ECCV), Marseille, France, Oct. 12, 2008, pp. 88-101.

Park et al., "Light ray field capture using focal plane sweeping and its optical reconstruction using 3D displays", Optics Express, vol. 22, No. 21,Oct. 20, 2014, pp. 25444-25454.

Levin et al., "Image and Depth from a Conventional Camera with a Coded Aperture", ACM Transactions on Graphics, vol. 26, No. 3, Article 70, Jul. 2007, pp. 70:1-70:8.

Dowski et al., "Extended Depth of Field Through Wave-Front Coding", Applied Optics, vol. 34, No. 11, Apr. 10, 1995, pp. 1859-1866.

Ng, R., "Digital Light Field Photography", Stanford University, Department of Computer Science, Doctoral Dissertation, Jul. 2006, pp. 1-203.

Wanner et al., "Generating EPI Representations of 4D Light Fields with a Single Lens Focused Plenoptic Camera", 7th International Symposium on Visual Computing (ISVC 2011), Las Vegas, Nevada, USA, Sep. 26, 2011, pp. 90-101.

Liang et al., "Light Field Analysis for Modeling Image Formation", IEEE Transactions on Image Processing, vol. 20, No. 2, Feb. 2011, pp. 446-460.

Levoy et al., "Light Field Rendering", ACM 23rd Annual Conference on Computer Graphics and Interactive Techniques, SIGGRAPH'96, New Orleans, Louisiana, USA, Aug. 4, 1996, pp. 31-42.

Lanman et al., "Near-Eye Light Field Displays", ACM Conference on Computer Graphics and Interactive Techniques, SIGGRAPH'2013, Anaheim, California, USA, Jul. 21, 2013, pp. 1-10.

Bishop et al., "The Light Field Camera: Extended Depth of Field, Aliasing, and Superresolution", IEEE Transactions on Pattern Analysis and Machine Intelligence, vol. 34, No. 5, May 2012, pp. 972-986.

Wilburn et al., "High Performance Imaging Using Large Camera Arrays", ACM Transactions on Graphics, vol. 24, No. 3, Jul. 2005, pp. 765-776.

Gu et al., "Polyhedral Geometry and the Two-Plane Parametrization", Proceedings of the Eurographics Workshop on Rendering Techniques, St. Etienne, France, Jun. 16, 1997, pp. 1-12.

Gotz et al., "A Fast Digital Radon Transform—An Efficient Means for Evaluating the Hough Transform", Journal Pattern Recognition, vol. 28, No. 12, Dec. 1995, pp. 1985-1992.

Press, W., "Discrete Radon transform has an exact, fast inverse and generalizes to operations other than sums along lines", Proceedings of the National Academy of Sciences, vol. 103, No. 51, Dec. 19, 2006, pp. 19249-19254.

English Language Abstract of JP 2007240295 A.

Yamashita, Keiji, et al.,: "Compressive acquisition of ray-space using radon transform", SPIE, Bellingham, WA, USA, Feb. 5, 2009, vol. 7237, doi:10.1117/12.807085, XP040493754.

\* cited by examiner

| Tags | | Data | | |
|---|---|---|---|---|
| Parametrization plane offset $z_2-z_1$ ($z_3$ is relative to $z_1$) (float) | | $\Delta z$ | | |
| Width in number of $x_1$ cells (integer) | min $x_1$ value (float) | max $x_1$ value (float) | N | $x_{1min}$ | $x_{1Max}$ |
| Width in number of $x_2$ cells (integer) | min $x_2$ value (float) | max $x_2$ value (float) | M | $x_{2min}$ | $x_{2Max}$ |
| Number of cameras (integer) | | n | | |
| $Cam_1$ focus (2 floats) | | x31 | z31 | |
| lowest $cam_1$ intercept in $(x_1,x_2)$ | $cam_1$ steepness | $d_1$ | $s_1$ | $m(1)$ |
| data line $(m(1))*N * 3$ bytes) | $cam_1$ number of digital lines in $x_1,x_2$ | $RGB_0$ | $RGB_1$ | ... | $RGB_{m(1)*N}$ |
| ... | | ... | ... | ... |
| $Cam_n$ focus (2 floats) | | x31 | z31 | |
| lowest $cam_n$ intercept in $(x_1,x_2)$ | $cam_n$ steepness | $d_n$ | $s_n$ | $m(n)$ |
| data line $(m(n))*N * 3$ bytes) | $cam_n$ number of digital lines in $x_1,x_2$ | $RGB_0$ | $RGB_1$ | ... | $RGB_{m(n)*N}$ |

FIG.21

| Tags | | Data | | |
|---|---|---|---|---|
| Parametrization plane offset $z_2$-$z_1$ ($z_3$ is relative to $z_1$) (float) | | $\Delta z$ | | |
| Width in number of $x_1$ cells (integer) | min $x_1$ value (float) | max $x_1$ value (float) | N | $x_{1min}$ | $x_{1Max}$ |
| Width in number of $x_2$ cells (integer) | min $x_2$ value (float) | max $x_2$ value (float) | M | $x_{2min}$ | $x_{2Max}$ |
| Width in number of $y_1$ cells (integer) | min $y_1$ value (float) | max $y_1$ value (float) | P | $y_{1min}$ | $y_{1Max}$ |
| Width in number of $y_2$ cells (integer) | min $y_2$ value (float) | max $y_2$ value (float) | Q | $y_{2min}$ | $y_{2Max}$ |
| Number of cameras (integer) | | n | | |
| Aperture size for $cam_1$ | | $A_1$ | | |
| $Cam_1$ focus (3 floats) | | $x3_1$ | $y3_1$ | $z3_1$ |
| lowest $cam_1$ intercept in $(x_1,x_2)$ | $cam_1$ steepness | $d_1$ | $m_1$ | $I^x_1$ |
| | $cam_1$ number of digital lines in $x_1,x_2$ | | | |
| | $cam_1$ number of digital lines in $y_1,y_2$ | | | $I^y_1$ |
| data line ($end_1$=$I^x_1$*N*$I^y_1$*P) * 3 bytes | | $RGB_0$ | $RGB_1$ | $RGB_{end1}$ |
| ... | | ... | ... | ... |
| Aperture size for $cam_n$ | | $A_n$ | | |
| $Cam_n$ focus (3 floats) | | $x3_n$ | $y3_n$ | $z3_n$ |
| lowest $cam_n$ intercept in $(x_1,x_2)$ | $cam_n$ steepness | $d_n$ | $m_n$ | $I^x_n$ |
| | $cam_n$ number of digital lines in $x_1,x_2$ | | | |
| | $cam_n$ number of digital lines in $y_1,y_2$ | | | $I^y_n$ |
| data line ($end_n$=$I^x_n$*N*$I^y_n$*P) * 3 bytes | | $RGB_0$ | $RGB_1$ | $RGB_{endn}$ |

FIG.22(a)

| Tags | Data | |
|---|---|---|
| | one tag w from (-x,+x,-y,+y,-z,+z) | |
| Light slab orientation 1 | | |
| Parametrization plane offset $w_2 - w_1$ ($w_3$ is relative to $w_1$) (float) | $\Delta e$ | |
| Width in number of $u_1$ cells (integer) | min $u_1$ value (float) | max $u_1$ value (float) |
| | N | $u_1$min ... $u_1$max |
| Width in number of $u_2$ cells (integer) | min $u_2$ value (float) | max $u_2$ value (float) |
| | M | $u_2$min ... $u_2$max |
| Width in number of $v_1$ cells (integer) | min $v_1$ value (float) | max $v_1$ value (float) |
| | P | $v_1$min ... $v_1$max |
| Width in number of $v_2$ cells (integer) | min $v_2$ value (float) | max $v_2$ value (float) |
| | Q | $v_2$min ... $v_2$max |
| Number of cameras (integer) | n | |
| Aperture size for $cam_1$ | $A_1$ | |
| $cam_1$ focus (3 floats) | $u3_1$ | $v3_1$ ... $w3_1$ |
| Lowest $cam_1$ intercept in ($u_1$, $u_2$) | $d_1$ | $m_1$ ... $l_1^X$ |
| $cam_1$ steepness | | |
| $cam_1$ number of digital lines in $u_1$, $u_2$ | | |
| $cam_1$ number of digital lines in $v_1$, $v_2$ | | $l_1^Y$ |
| | | |
| data line ($end_1 = l_1^X * N * l_1^Y * P$) * 3 bytes | $RGB_0$ $RGB_1$ ... $RGB_{end1}$ | |
| ... | ... ... ... | |
| Aperture size for $cam_n$ | $A_n$ | |
| $cam_n$ focus (3 floats) | $x3_n$ $y3_n$ $z3_n$ | |
| lowest $cam_n$ intercept in ($u_1$, $u_2$) | $d_n$ $m_n$ $l_n^X$ | |
| $cam_n$ steepness | | |
| $cam_n$ number of digital lines in $u_1$, $u_2$ | | |
| $cam_n$ number of digital lines in $v_1$, $v_2$ | | $l_n^Y$ |
| data line ($end_n = l_n^X * N * l_n^Y * P$) * 3 bytes | $RGB_0$ $RGB_1$ ... $RGB_{endn}$ | |

FIG. 22(b)

| | Light slab orientation 2 | one tag w from (-x,+x,-y,+y,-z,+z) | |
|---|---|---|---|
| Parametrization plane offset $w_2 - w_1$ ($w_3$ is relative to $w_1$) (float) | $\Delta e$ | | |
| Width in number of $u_1$ cells (integer) | min $u_1$ value (float) | max $u_1$ value (float) | N | $u_1 min$ | $u_1 max$ |
| Width in number of $u_2$ cells (integer) | min $u_2$ value (float) | max $u_2$ value (float) | M | $u_2 min$ | $u_2 max$ |
| Width in number of $v_1$ cells (integer) | min $v_1$ value (float) | max $v_1$ value (float) | P | $v_1 min$ | $v_1 max$ |
| Width in number of $v_2$ cells (integer) | min $v_2$ value (float) | max $v_2$ value (float) | Q | $v_2 min$ | $v_2 max$ |
| Number of cameras (integer) | | n | | |
| Aperture size for $cam_1$ | | $A_1$ | | |
| $Cam_1$ focus (3 floats) | | $u3_1$ | $v3_1$ | $w3_1$ |
| Lowest $cam_1$ intercept in $(u_1, u_2)$ | $cam_1$ number of digital lines in $u_1, u_2$ | $cam_1$ steepness | $d_1$ | $m_1$ | $l_1^X$ |
| | $cam_1$ number of digital lines in $v_1, v_2$ | | | | $l_1^Y$ |
| data line ($end_1 = l_1^X * N * l_1^Y * P) * 3$ bytes | | $RGB_0$ | $RGB_1$ | ... | $RGB_{end1}$ |
| ... | | ... | ... | ... | ... |
| Aperture size for $cam_n$ | | $A_n$ | | |
| $cam_n$ focus (3 floats) | | $x3_n$ | $y3_n$ | $z3_n$ |
| lowest $cam_n$ intercept in $(u_1, u_2)$ | $cam_n$ number of digital lines in $u_1, u_2$ | $cam_n$ steepness | $d_n$ | $m_n$ | $l_n^X$ |
| | $cam_n$ number of digital lines in $v_1, v_2$ | | | | $l_n^Y$ |
| data line ($end_n = l_n^X * N * l_n^Y * P) * 3$ bytes | | $RGB_0$ | $RGB_1$ | ... | $RGB_{endn}$ |

FIG. 22(b) (Continued)

METHOD FOR ENCODING A LIGHT FIELD CONTENT

This application claims the benefit, under 35 U.S.C. § 365 of International Application PCT/EP2016/071873, filed Sep. 15, 2016, which was published in accordance with PCT Article 21(2) on Mar. 23, 2017, in English, and which claims the benefit of European Patent Application No. 15306437.3, filed Sep. 17, 2015, European Patent Application No. 15306439.9, filed Sep. 17, 2015, European Patent Application No. 15306440.7, filed Sep. 17, 2015, European Patent Application No. 15306441.5, filed Sep. 17, 2015, European Patent Application No. 15306435.7, filed Sep. 17, 2015 and European Patent Application No. 15306438.1, filed Sep. 17, 2015.

TECHNICAL FIELD

The disclosure relates to the field of computational imaging, light-field acquisition devices, and plenoptic cameras. More precisely, it deals with a representation format for the light-field that can be used for transmission, rendering, processing, mixing of light-field data.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The acquisition of 4D light-field data, which can be viewed as a sampling of a 4D light field (i.e. the recording of light rays as explained in FIG. 1 of the article: "*Understanding camera trade-offs through a Bayesian analysis of light field projections*" by Anat Levin and al., published in the conference proceedings of ECCV 2008) is a hectic research subject.

Indeed, compared to classical 2D images obtained from a camera, 4D light-field data enable a user to have access to more post processing features that enhance the rendering of images and/or the interactivity with the user. For example, with 4D light-field data, it is possible to perform with ease refocusing of images a posteriori (i.e. refocusing with freely selected distances of focalization meaning that the position of a focal plane can be specified/selected a posteriori), as well as changing slightly the point of view in the scene of an image. In order to acquire 4D light-field data, several techniques can be used. For example, a plenoptic camera, as depicted in document WO 2013/180192 or in document GB 2488905, is able to acquire 4D light-field data. Details of the architecture of a plenoptic camera are provided in FIGS. 1 and 2 of the present document. Another way to acquire 4D light-field data is to use a camera array as depicted in FIG. 3 of the present document. Details of an architecture of a camera array are provided in FIG. 3. At last, another way of acquiring a 4D light field is to use a conventional camera that is configured to capture a sequence of 2D images of a same scene at different focal planes. For example, the technique described in the document "*Light ray field capture using focal plane sweeping and its optical reconstruction using 3D displays*" by J.-H. Park et al., published in OPTICS EXPRESS, Vol. 22, No. 21, in October 2014, can be used to achieve the acquisition of 4D light field data.

In the following only plenoptic camera and camera array are described, but it should be noted that the present disclosure can also be applied to other devices that acquire 4D light field data such as devices that comprise coded aperture elements as depicted in document US 2010/0265386, or in the article entitled "*Image and depth from a conventional camera with a coded aperture*" by A. Levin a al., published in the proceedings of SIGGRAPH 2007, or use wavefront coding techniques as mentioned in the article entitled "Extended depth of field through wave-front coding" by Edward R. Dowski, Jr., and W. Thomas Cathe, published in Applied Optics, 1995 Apr. 10.

In the state of the art, there are several ways to represent (or define) 4D light-field data. Indeed, in the Chapter 3.3 of the Phd dissertation thesis entitled "*Digital Light Field Photography*" by Ren Ng, published in July 2006, three different ways to represent 4D light-field data are described. Firstly, 4D light-field data can be represented, when recorded by a plenoptic camera as the one depicted in FIG. 1 for example, by a collection of micro-lens images (see the description of FIG. 2 in the present document). 4D light-field data in this representation are named raw images (or raw 4D light-field data). Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images (see for example the article entitled: "*Generating EPI Representation of a 4D Light Fields with a Single Lens Focused Plenoptic Camera*", by S. Wanner and al., published in the conference proceedings of ISVC 2011).

However, due to the fact that plenoptic devices are extremely heterogeneous (for example we can distinguish plenoptic devices of type 1 or 2 (which define particular optical arrangements of the micro-lenses (for example micro-lenses with different focal lengths, etc.))), and that camera arrays come in different flavors, it appears that all these light field acquisition devices have their proprietary file format, so that light-field technology cannot live besides regular 2D or 3D imaging as there is no standard supporting the acquisition and transmission of multi-dimensional information. For example, in the case that 4D light-field data is represented as raw 4D light-field data, some additional information such as the size of the micro-lenses, etc. are needed for the processing of the raw 4D light-field data, and for the moment there isn't a standard that list all the needed additional information.

However, it should be noted that 4D light-field data as mentioned previously could also be represented by values derived from a parametrization process, as detailed in the paragraph III section A named "*Light Field Representation*" of the article entitled "Light Field Analysis for Modeling Image Formation" by Chi-Kai Liang and al., published in the IEEE Transactions on Image Processing, Vol. 20, No 2, in February 2011, or in the article entitled "*Light Field Rendering*" by Mar Levoy and Pat Hanrahan, or in the documents U.S. Pat. Nos. 8,237,708, 6,097,394 or 6,023,523. Hence, 4D light-field data can be represented as a set of points (being associated with light rays) in a coordinate system (see paragraphs [0028] to [0030] of document WO 2013/180192). More precisely, the use of a parametrization of a 4D light-field via the use of two planes, either parallel or not, in order to represent 4D light-field data (i.e. each light ray is represented by a set of coordinates values corresponding to the intersection of such light ray with two planes) could be a way to avoid the use of proprietary formats, and to foster the interoperability between 4D light-field devices (i.e. plenoptic devices and/or camera arrays for example, but also for 4D light field display devices, such as the one described in the article entitled "*Near-Eye Light Field Displays*" by D. Lanman and D. Luebke, presented at the conference SIGGRAPH 2013 in July 2013).

Indeed, instead of sharing RAW information with complex inter-leaving structure, it seems to be better to share a representation of the light rays that have been captured, with all their conventionality. Then the data can be processed, shared, transmitted and rendered independently of the way it has been acquired. It should be noted that a parametrized light field is also named a light slab representation in the previously mentioned article entitled "*Light Field Rendering*".

However, one drawback of this representation of a 4D light-field is that content to be stored is huge as mentioned in p. 23 of the present document.

Indeed, using such representation implies to store for each parametrized ray the coordinates in the two planes (i.e. it is necessary to store a 4-uplet and the value of the radiance of such light ray). The process of converting a set of 2D images (defining a sampled light field) into a representation of light rays (each light ray being associated with a 4-uplet and a value of radiance) is depicted for example in document U.S. Pat. No. 6,023,523

Hence, there is a need to provide a technique for providing a compact light field representation in the sense that it overcomes the previously mentioned storage issue.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for encoding a light field content. The method is remarkable in that it comprises:
  obtaining, for a set of light rays associated with said light field content, four coordinates per light ray from a two planes parametrization of said light field content;
  obtaining, for each light ray from said set, two coordinates from said four coordinates, corresponding to a projection of said light rays from said set onto a plane perpendicular to two planes used in said two planes parametrization, defining points in a first 2D ray diagram;
  applying a discrete Radon transform on said first 2D ray diagram that delivers lines of interest in said first 2D ray diagram;
  encoding said lines of interest into encoded lines of interest; and
  storing said encoded lines of interest.

In a preferred embodiment, the method is remarkable in that said encoding further comprises applying the Bresenham algorithm.

In a preferred embodiment, the method is remarkable in that said two planes used in said two planes parametrization, named a first plane and a second plane, are discretized planes comprising rectangular elements, wherein maximum value for a length side of a rectangular element in said first plane is equal to $$\frac{z_f - z_1}{f} p,$$

where $z_f$ is a depth value of a sensor array comprised in a camera device with a pixel pitch p, f is a focal length of said camera device, and $z_1$ is a first depth value associated with said first plane, and wherein maximum value for a length side of a rectangular element in said second plane is equal to $$\frac{z_f - z_2}{f} p,$$

where $z_2$ is a second depth value associated with second first plane.

In a preferred embodiment, the method is remarkable in that said storing comprises, for at least one first point belonging to a first encoded line of interest in said first 2D ray diagram:
  storing radiance of a light ray associated with at least a second point belonging to a second encoded line of interest in a second 2D ray diagram, said second encoded line of interest having the same slope as the first encoded line of interest, and storing a first additional information indicating the presence of a light ray; and/or
  storing a second additional information indicating that no light ray is associated with at least a third point belonging to said second encoded line of interest.

In a preferred embodiment, the method is remarkable in that said first and/or second additional information is a bit, and wherein said radiance of a light ray is encoded by three bytes values.

In a preferred embodiment, the method is remarkable in that it further comprises estimating coordinates of at least one center of projection and a radius associated with said at least one center of projection, said estimating comprising:
  obtaining at least one slope parameter m and thickness parameters $d_{max_x}$, $d_{min_x}$ for a line of interest in said first 2D ray diagram, said line of interest being associated with a center of projection $x_3$, $y_3$, $z_3$ and a radius A;
  estimating said coordinates $x_3$, $y_3$, $z_3$ of a center of projection and said radius A from said at least one slope parameter m and said thickness parameters $d_{max_x}$, $d_{min_x}$.

In a preferred embodiment, the method is remarkable in that said two planes used in said two planes parametrization, named a first plane and a second plane, are associated with respectively a first depth value $z_1$ and a second depth value $z_2$, and wherein said estimating comprises obtaining $$z_3 = \frac{mz_1 - z_2}{m - 1}, \quad A = \frac{d_{max_x} - d_{min_x}}{2k} \quad \text{with } k = \frac{z_2 - z_1}{z_3 - z_1},$$

-continued $$x_3 = A\frac{d_{max_x} + d_{min_x}}{d_{max_x} - d_{min_x}} \text{ and } y_3 = A\frac{d_{max_y} + d_{min_y}}{d_{max_y} - d_{min_y}}.$$

In a preferred embodiment, the method is remarkable in that said storing said encoded lines of interest further comprises storing a slope associated with an encoded line of interest, and storing, for each point belonging an encoded line of interest in said first 2D ray diagram, a set of points belonging to a second 2D ray diagram, and in the case that a slope associated with a processed encoded line of interest in said first 2D ray diagram is greater than another slopes associated with other encoded lines of interest in said first 2D ray diagram, avoiding the storage of said set of point belonging to said second 2D ray diagram, when a point in said first 2D ray diagram belongs to an intersection between said processed encoded line of interest and said other encoded line of interest.

In a preferred embodiment, the method is remarkable in that said avoiding further comprises storing an information indicating an occlusion.

In a preferred embodiment, the method is remarkable in that said information is a null value.

In a variant, it is proposed a method for delivering a set of images from a table representing a light field content, each image comprising m×n pixels, m and n being integer greater than one. The method is remarkable in that said table is based on a 2D ray diagram representation of a light field content, and in that it comprises:
  obtaining a 2-dimensional look-up table comprising pointers to data in said table representing said light field content; and, for each image in said set,
  obtaining, for a pixel addressed by an index (i,j), a radiance value of a light ray from said table representing said light field content via the obtaining of a pointer in said 2-dimensional look-up table positioned at same index (i,j).

In a preferred embodiment, said radiance of a light ray is encoded by three bytes values.

In a preferred embodiment, the method is remarkable in that said obtaining said radiance value is done for all the pixels comprised in said images.

In a preferred embodiment, the method is remarkable in that said table based on said 2D ray diagram representation of a light field content comprises parameters defining a set of lines.

In a preferred embodiment, the method is remarkable in that each pointer in said 2-dimensional look-up table is an index of two elements.

In another embodiment of the disclosure, it is proposed a method generating a 2-dimensional look-up table. The method is remarkable in that it comprises:
  obtaining a table representing a light field content, said table being based on a 2D ray diagram representation of a light field content;
  determining, for an index value (i,j) addressing an element in said 2-dimensional look-up table, a pointer value to a radiance value in said table representing said light field content.

In a preferred embodiment, the method for generating a 2-dimensional look-up table is remarkable in that said determining comprises applying a pixel back tracing process for a pixel addressed by said index (i,j); determining intersection coordinates for a ray associated with said pixel addressed by said index (i,j) via a two plane parametrization; and determining in said table representing said light field content a position corresponding to radiance value associated with said intersection coordinates.

In a preferred embodiment, the method for generating is remarkable in that each pointer in said 2-dimensional look-up table is an index of two elements.

In another embodiment, it is proposed a method for storing radiance values into a table representing a light field content. The method is remarkable in that said table is based on a 2D ray diagram representation of a light field content, and in that it comprises:
  obtaining a 2-dimensional look-up table comprising pointers to data position in the table representing a light field content;
  obtaining, for a pixel addressed by an index (i,j), a radiance value of a light ray from an image comprising m×n pixels, m and n being integer greater than one; and
  storing the obtained radiance value into said table via the obtaining of a pointer in said 2-dimensional look-up table positioned at same index (i,j).

In a preferred embodiment, the method for storing is remarkable in that said storing is done for all the radiance values comprised in said image.

In a preferred embodiment, the method for storing is remarkable in that said storing of obtained radiance values for all the pixels in the image are done in parallel.

The common inventive features of these methods is the 2-dimensional look-up table.

In another embodiment of the disclosure, it is proposed a method for rendering a 4D light-field data. Such method is executed by an electronic device, and is remarkable in that it comprises:
  obtaining at least two Cartesian coordinates, each Cartesian coordinate being associated with a camera position in a three dimensional space;
  obtaining at least one 4D light-field data associated with a selected Cartesian coordinates from said at least two Cartesian coordinates; and
  rendering obtained 4D light-field data.

In a preferred embodiment, the method is remarkable in that obtaining said at least one 4D light-field data comprises receiving a digital lines representation of said at least one 4D light-field data.

In a preferred embodiment, the method is remarkable in that said obtaining at least one 4D light-field data comprises selecting data, based on said selected Cartesian coordinates, from a table.

In a preferred embodiment, said table is stored on distant server.

According to an exemplary implementation, the different steps of the previous mentioned methods are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of modules comprising software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In another embodiment of the disclosure, it is proposed an electronic device for encoding a light field content. The electronic device is remarkable in that it comprises: a memory; and at least one processor coupled to the memory, the at least one processor being configured to:

obtain, for a set of light rays associated with said light field content, four coordinates per light ray from a two planes parametrization of said light field content;

obtain, for each light ray from said set, two coordinates from said four coordinates, corresponding to a projection of said light rays from said set onto a plane perpendicular to two planes used in said two planes parametrization, defining points in a first 2D ray diagram;

apply a discrete Radon transform on said first 2D ray diagram that delivers lines of interest in said first 2D ray diagram;

encode said lines of interest into encoded lines of interest; and store said encoded lines of interest.

In a preferred embodiment, the electronic device is remarkable in that said at least one processor is further configured to encode said lines of interest with the Bresenham algorithm.

In a preferred embodiment, the electronic device is remarkable in that said two planes used in said two planes parametrization, named a first plane and a second plane, are discretized planes comprising rectangular elements, wherein maximum value for a length side of a rectangular element in said first plane is equal to $$\frac{z_f - z_1}{f} p,$$

where $z_f$ is a depth value of a sensor array comprised in a camera device with a pixel pitch p, f is a focal length of said camera device, and $z_1$ is a first depth value associated with said first plane, and wherein maximum value for a length side of a rectangular element in said second plane is equal to $$\frac{z_f - z_2}{f} p,$$

where $z_2$ is a second depth value associated with second first plane.

In a preferred embodiment, the electronic device is remarkable in that said at least one processor is further configured to, for at least one first point belonging to a first encoded line of interest in said first 2D ray diagram:

store radiance of a light ray associated with at least a second point belonging to a second encoded line of interest in a second 2D ray diagram, said second encoded line of interest having the same slope as the first encoded line of interest, and storing a first additional information indicating the presence of a light ray; and/or store a second additional information indicating that no light ray is associated with at least a third point belonging to said second encoded line of interest.

In another embodiment of the disclosure, it is proposed an electronic device for delivering a set of images from a table representing a light field content, each image comprising m×n pixels, m and n being integer greater than one. The electronic device is remarkable in that said table is based on a 2D ray diagram representation of a light field content, and in that it comprises:

a module configured to obtain a 2-dimensional look-up table comprising pointers to data in said table representing said light field content; and, for each image in said set, a module configured to obtain, for a pixel addressed by an index (i,j), a radiance value of a light ray from said table representing said light field content via the obtaining of a pointer in said 2-dimensional look-up table positioned at same index (i,j).

In a preferred embodiment, the electronic device is remarkable in that said module configured to obtain said radiance value is used to process all the pixels comprised in said images.

In a preferred embodiment, the electronic device is remarkable in that said table based on said 2D ray diagram representation of a light field content comprises parameters defining a set of lines.

In a preferred embodiment, the electronic device is remarkable in that each pointer in said 2-dimensional look-up table is an index of two elements.

In another embodiment of the disclosure, it is proposed an electronic device for generating a 2-dimensional look-up table. Such electronic device is remarkable in that it comprises:

a module configured to obtain a table representing a light field content, said table being based on a 2D ray diagram representation of a light field content;

a module configured to determine, for an index value (i,j) addressing an element in said 2-dimensional look-up table, a pointer value to a radiance value in said table representing said light field content.

In a preferred embodiment of the disclosure, the electronic device is remarkable in that said module configured to determine, is further configured to: apply a pixel back tracing process for a pixel addressed by said index (i,j); determine intersection coordinates for a ray associated with said pixel addressed by said index (i,j) via a two plane parametrization; and determine in said table representing said light field content the position corresponding to radiance value associated with said intersection coordinates.

In a preferred embodiment, the electronic device is remarkable in that each pointer in said 2-dimensional look-up table is an index of two elements.

In another embodiment of the disclosure, it is proposed an electronic device for storing radiance values into a table representing a light field content. The electronic device is remarkable in that said table is based on a 2D ray diagram representation of a light field content, and in that it comprises:

a module configured to obtain a 2-dimensional look-up table comprising pointers to data position in the table representing a light field content;

a module configured to obtain, for a pixel addressed by an index (i,j), a radiance value of a light ray from an image comprising m×n pixels, m and n being integer greater than one; and a module configured to store the obtained radiance value into said table via the obtaining of a pointer in said 2-dimensional look-up table positioned at same index (i,j).

In another embodiment of the disclosure, it is proposed an electronic device for rendering 4D light-field data. Such electronic device is remarkable in that it comprises:

a first module configured to obtain at least two Cartesian coordinates, each Cartesian coordinate being associated with a camera position in a three dimensional space;

a second module configured to obtain at least one 4D light-field data associated with a selected Cartesian coordinates from said at least two Cartesian coordinates; and a third module configured to render obtained 4D light-field data.

In a preferred embodiment, said second module is further configured to receive a digital lines representation of said at least one 4D light-field data.

In a preferred embodiment, said second module is further configured to select data, based on said selected Cartesian coordinates, from a table.

BRIEF DESCRIPTION OF THE DRAWINGS

The above and other aspects of the invention will become more apparent by the following detailed description of exemplary embodiments thereof with reference to the attached drawings in which:

FIG. 21 is an example of a representation of light field rays according to an embodiment of the disclosure;

FIG. 22(*b*) is another example of a representation of light field rays according to an embodiment of the disclosure;

FIG. 22(*c*)-(*d*) illustrate an enclosed object into a double cube according to an embodiment of the disclosure;

FIG. 26(*b*) presents a synthetic scheme that depicts a conversion from either 4D light-field data or a conventional 2D image into a representation based on the parametrization of light rays via the use of two planes according to an embodiment of the disclosure;

FIGS. 26 (*c*)-(*d*) present how a ray is "extracted" from a pixel (or virtual pixel) sensor, according to an embodiment of the disclosure;

FIG. 27(*b*) presents a perspective view of the planes involved in the projection process according to one embodiment of the disclosure;

FIG. 27(*c*) presents a discretization of the planes used to perform the parametrization of the light field, according to one embodiment of the disclosure;

DETAILED DESCRIPTION

Figure 1:
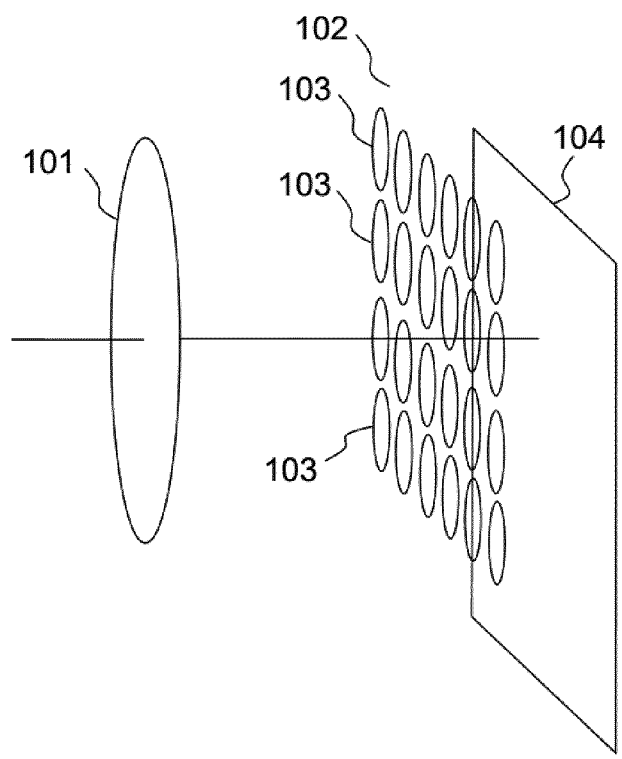
FIG. 1 is a schematic diagram of a plenoptic camera being a light field camera according to an embodiment of the disclosure.

FIG. 1 present schematically the main components comprised in a plenoptic camera. More precisely, a plenoptic camera comprises a main lens referenced 101, and a sensor array (i.e. an array of pixels), referenced 104. Between the main lens 101 and the sensor array 104, a microlens array referenced 102, that comprises a set of micro lenses referenced 103, is positioned. It should be noted that optionally some spacers might be located between the micro-lens array around each lens and the sensor to prevent light from one lens to overlap with the light of other lenses at the sensor side. Hence, a plenoptic camera can be viewed as a conventional camera plus a micro-lens array set just in front of the sensor as illustrated in FIG. 1. The light rays passing through a micro-lens cover a part of the sensor array that records the radiance of these light rays. The recording by this part of the sensor defines a micro-lens image.

Figure 2:
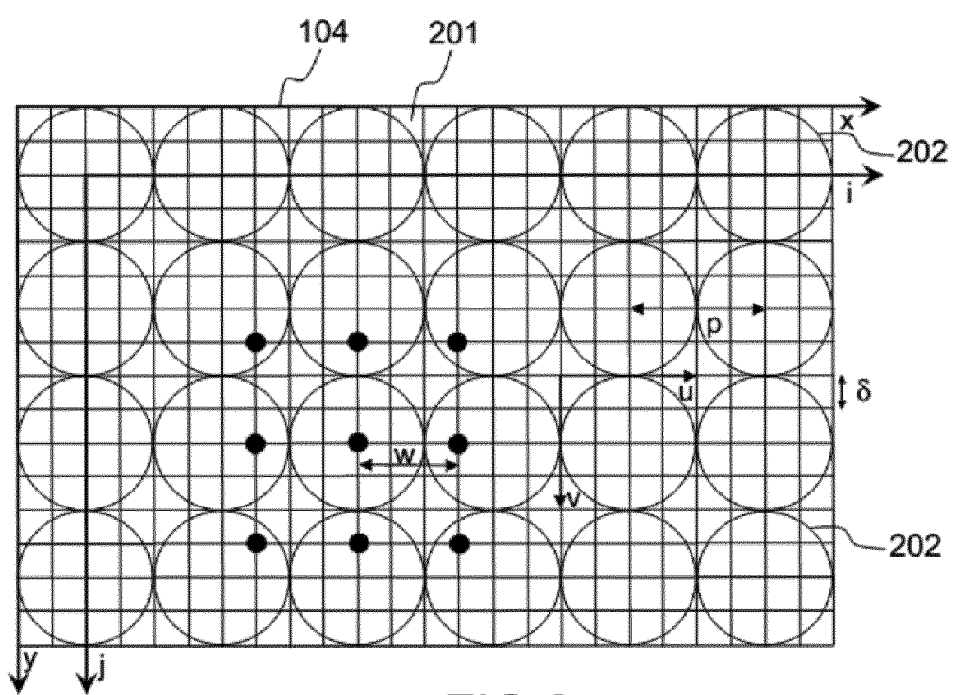
FIG. 2 present another view of the sensor array disclosed in FIG. 1.

FIG. 2 present another view of the sensor array 104. Indeed, in such view, it appears that the sensor array 104 comprises a set of pixels, referenced 201. The light rays passing through a micro-lens cover a number of pixels 201, and these pixels record the energy value of light rays that are incident/received.

Hence the sensor array 104 of a plenoptic camera records an image which comprises a collection of 2D small images (i.e. the micro-lens images referenced 202) arranged within a 2D image (which is also named a raw 4D light-field image). Indeed, each small image (i.e. the micro-lens images) is produced by a lens (the lens can be identified by coordinates (i, j) from the array of lens). Hence, the pixels of the light-field are associated with 4 coordinates (x, y, i, j). L(x, y, i, j) being the 4D light-field recorded by the sensor illustrates the image which is recorded by the sensor. Each micro-lens produces a micro-image represented by a circle (the shape of the small image depends on the shape of the micro-lenses which is typically circular). Pixel coordinates (in the sensor array) are labelled (x, y). p is the distance between 2 consecutive micro-images, p is not necessarily an integer value. Micro-lenses are chosen such that p is larger than a pixel size 6. Micro-lens images are referenced by their coordinate (i, j). Each micro-lens image samples the pupil of the main-lens with the (u, v) coordinate system. Some pixels might not receive any photons from any micro-lens especially if the shape of the micro-lenses is circular. In this case, the inter micro-lens space is masked out to prevent photons to pass outside from a micro-lens, resulting in some dark areas in the micro-images. (if the micro-lenses have a square shape, no masking is needed). The center of a micro-lens image (i, j) is located on the sensor at the coordinate ($x_{i,j}$, $y_{i,j}$). θ is the angle between the square lattice of pixel and the square lattice of micro-lenses, in FIG. 2 θ=0. Assuming the micro-lenses are arranged according to a regular square lattice, the $(x_{i,j}, y_{i,j})$ can be computed by the following equation considering $(x_{0,0}, y_{0,0})$ the pixel coordinate of the micro-lens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix}$$

FIG. 2 also illustrates that an object from the scene is visible on several contiguous micro-lens images (dark dots). The distance between 2 consecutive views of an object is w, this distance is named the replication distance. Hence, an object is visible on r consecutive micro-lens images with:

$$r = \left\lfloor \frac{p}{|p-w|} \right\rfloor$$

r is the number of consecutive micro-lens images in one dimension. An object is visible in $r^2$ micro-lens images. Depending on the shape of the micro-lens image, some of the $r^2$ views of the object might be invisible.

As mentioned previously in this document, 4D light-field data can be represented by sub-aperture images (when the 4D light field data have been acquired by a plenoptic camera of type 1.0 for example). Each sub-aperture image is composed of the pixels of same position selected from each microlens image.

According to the location of the pixel, multiview sub-aperture images can be obtained and have different information of incident rays respectively. The conventional photograph is equal to the integration of all sub-aperture images, summing all the incident light.

Hence, a 4D light-field image represented by sub-aperture images is defined as being a set (or collection) of m×n sub-aperture images where each sub-aperture image corresponds to a slightly different perspective of a same scene, and where the parameters m and n are integer greater or equal to one. Such 4D light-field image is also named a matrix of view in the state of the art. In order to obtain such representation, the pixels from the raw sensor image are re-arranged to create an array of images, with the pixels in each coming from the same position under every micro-lens. Each sub-aperture image can be thought of as capturing a traditional image of the light passing through only a small sub-aperture region of the camera's lens. While these images are quite similar, they each have a unique optical center within the camera's aperture plane, so the same real-world object will appear in different locations of each sub-aperture image. That is, the sub-aperture images provide parallax on the captured scene: foreground objects have relatively higher displacements between adjacent sub-aperture images than background objects.

Usually, in the case that a light field image is acquired by a plenoptic camera of type 1.0, the number of pixels positioned below a micro-lens determines the number of sub-aperture images, and the number of micro-lens determines the number of pixels in each sub-aperture images.

More details related to plenoptic camera can be found out in the Section 4 entitled "*Image formation of a Light field camera*" in the Article "*The Light Field Camera: Extended Depth of Field, Aliasing, and Superresolution*" by Tom E. Bishop and Paolo Favaro, published in the IEEE Transactions on Pattern Analysis and Machine Intelligence, Vol. 34, No 5, in May 2012.

It should be noted that the present technique can also be applied on "conventional camera" (in the sense that no additional micro-lens array is positioned between the main lens and array of pixels), in the case that at least a part of the pixels of such conventional camera are designed in the same way (or similar way) as the one described in the document US2013258098. Indeed, document US2013258098 discloses a pixel that can record light field data due to the use of several light receiving sections (for example referenced 116 and 117 in document US2013258098). Hence, one skilled in the art could assimilate such conventional camera with an array of pixels integrating the technique of document US2013258098 as a kind of plenoptic camera as depicted in FIG. 1, in which each micro-lens concentrates light rays on two pixels comprised in the sensor 104. It should be noted that technique of document US2013258098 can be generalized in the sense that a pixel can record more than two data information (obtained by the two low and high receiving sections), if more receiving section are integrated in the architecture of a pixel. The present disclosure can reduce the aberrations of the main lens of such "conventional camera" integrating pixels that can record light field data as mentioned previously.

It should also be noted that the present disclosure can also be applied to other devices that acquire 4D light field data such as devices that comprise coded aperture elements as depicted in document US 2010/0265386, or in the article entitled "*Image and depth from a conventional camera with a coded aperture*" by A. Levin a al., published in the proceedings of SIGGRAPH 2007, or use wavefront coding techniques as mentioned in the article entitled "Extended depth of field through wave-front coding" by Edward R. Dowski, Jr., and W. Thomas Cathe, published in Applied Optics, 1995 Apr. 10.

Figure 3:
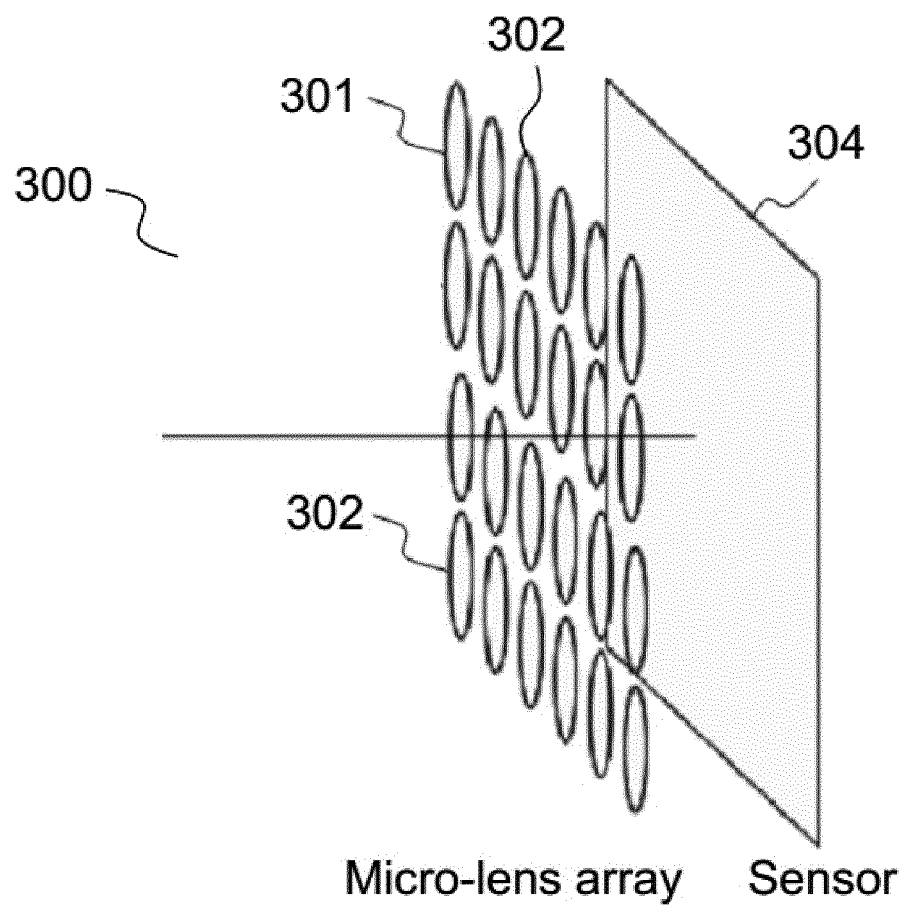
FIG. 3 is a schematic diagram of a multi-camera array being a light field camera according to an embodiment of the disclosure.

FIG. 3 presents in a schematic way a multi-camera array referenced 300. The multi-camera array 300 comprises an array of lenses, referenced 301, comprising several lenses referenced 302, and one or several sensor arrays, referenced 304. The multi-camera array 300 is without main lens. The array of lenses is often a small device, which is commonly named a micro-lens array. It is worth noting that the multi-camera array with a single sensor can be considered as a special case of plenoptic camera where the main lens has an infinite focal. Indeed, a lens with an infinite focal distance has no impact on the rays of light.

For example, a multi-camera array can be a Pelican array camera as the one depicted in the document WO 2014149403 A1, or a multi camera array as the one developed by Standford University in the article entitled "*High Performance Imaging Using Large Camera Arrays*", by B. Wilburn et al., published ACM Transactions on Graphics, Vol 24, No 3, July 2005, pp. 765-776 (Proceedings of ACM SIGGRAPH 2005).

Figure 4:
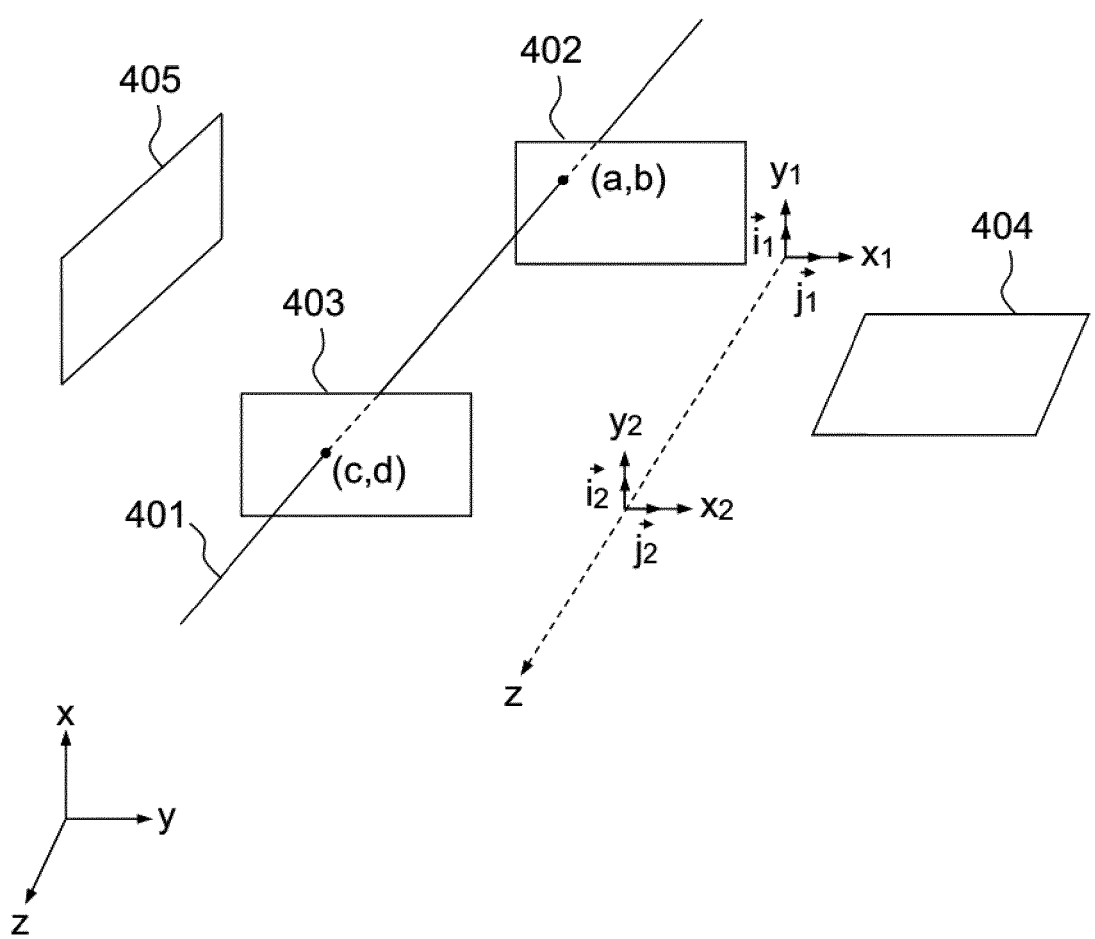
FIG. 4 presents the parametrization of a light ray by the use of at least two planes according to an embodiment of the disclosure.
Figure 5A:
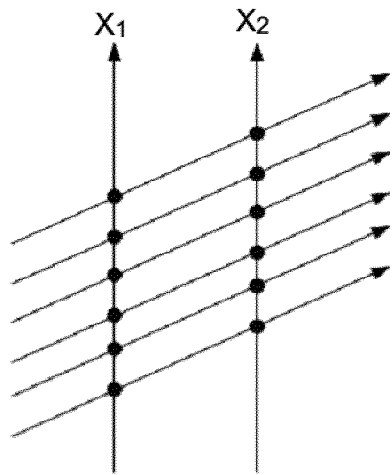
FIGS. 5(a) to (h) show two different representations of 2D slices according to an embodiment of the disclosure.
Figure 5B:
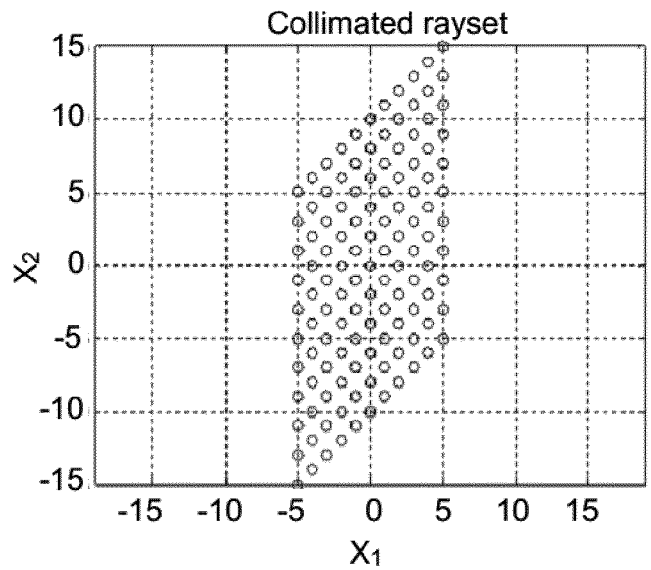
Figure 5C:
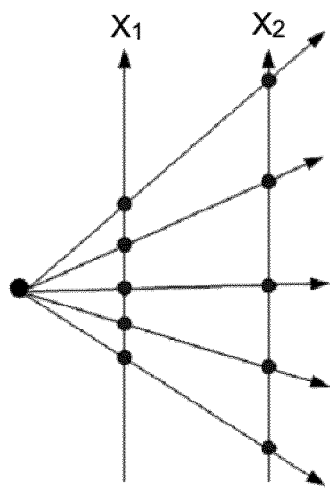
Figure 5D:
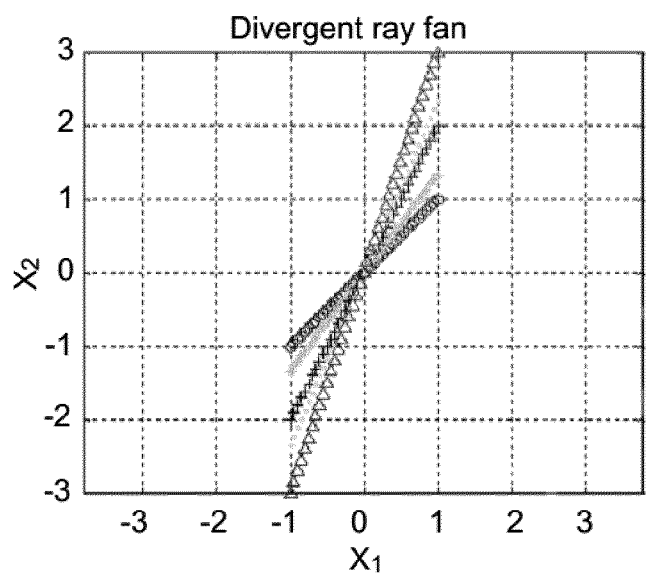
Figure 5E:
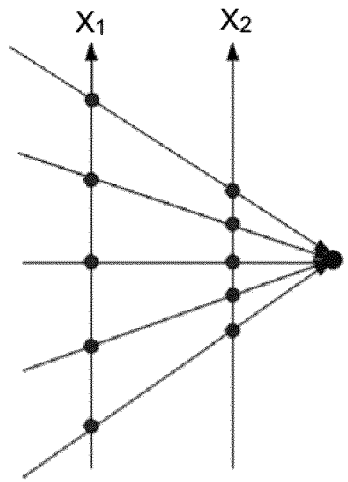
Figure 5F:
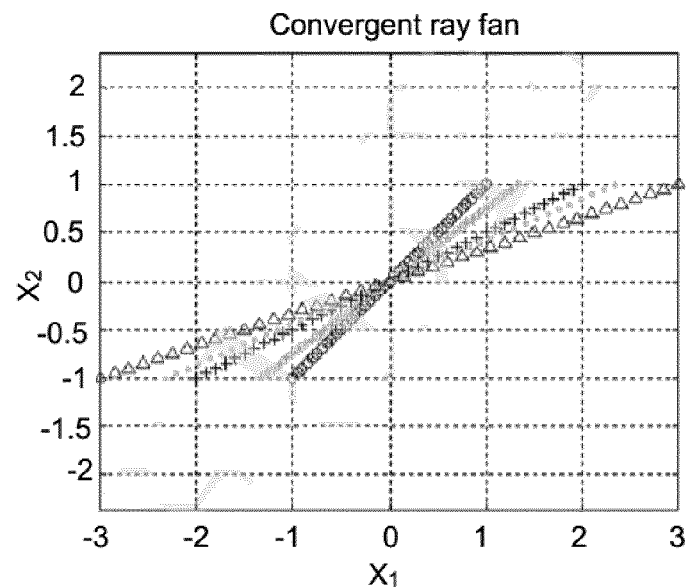
Figure 5G:
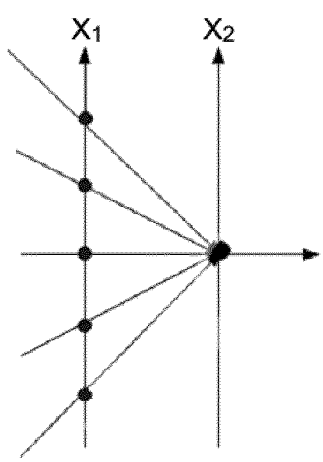
Figure 5H:
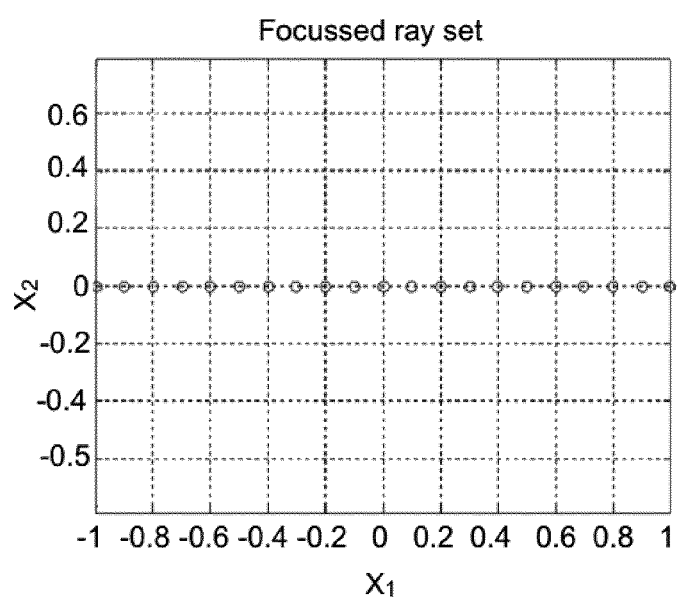

FIG. 4 presents how to parametrize a light ray, referenced 401, by the use of two planes, referenced 402 and 403, in 3D space. Each plane 402, 403 is defined by two normal vectors (for plane 402, the vectors $(\vec{i}_1, \vec{j}_1)$ defines it, and a 2D coordinates system can be used (i.e. the coordinates system defined by the orthogonal axes $(x_1)$ and $(y_1)$, and for plane 403, the vectors $(\vec{i}_2, \vec{j}_2)$ defines it and a 2D coordinates system can be used (i.e. the coordinates system defined by the orthogonal axes $(x_2)$ and $(y_2)$). When a light ray intersects a plane, it is possible to determine in 3D space the coordinates of the intersection point (that comprise three components). However, in order to obtain the direction of the light ray it is necessary to use another plane for identifying the direction of the light ray in the 3D space. By considering that the two planes used for the parametrization are parallel and have known z values (in the 3D Cartesian coordinate space), it is possible to identify a light ray by only four coordinates (two values in the 2D coordinates system defined by the orthogonal axes ($x_1$) and ($y_1$), and two values in the 2D coordinates system defined by the orthogonal axes ($x_2$) and ($y_2$)), and a value L which corresponds to the intensity/radiance of such light ray (see more details on such parametrization in the previously mentioned article entitled "*Light Field Rendering*")). Hence, a light field, which can be viewed as a collection of light rays in a scene, can be parametrized by a pair of planes, and each light ray of the light field is represented as a point with four coordinates (for example the light ray 401, which has coordinates (a, b, c, d)$\in \mathbb{R}^4$, and a radiance value L(a, b, c, d)$\in \mathbb{R}$. By abuse of notation, the coordinates of a light ray are noted ($x_1$, $y_1$, $x_2$, $y_2$)$\in \mathbb{R}^4$ (which could be misleading as the terms $x_1$, $y_1$, $x_2$, $y_2$ also mentioned axis).

It should be noted that a light ray can also be projected (via an orthographic or orthogonal projection) onto either a plane referenced 404 or a plane referenced 405. The plane 404 is a plane which is perpendicular to the two planes 402 and 403, in which y in the 3D Cartesian coordinate space has a constant value. The plane 405 is a plane which is perpendicular to the two planes 402 and 403, in which x in the 3D Cartesian coordinate space has a constant value. The result of the projection of some light rays onto plane 404 are depicted in FIGS. 5(*a*), 5(*c*), 5(*e*), and 5(*g*). Then, in FIGS. 5(*b*), 5(*d*), 5(*f*) and 5(*h*) a representation in a 2D ray diagram of the rays depicted respectively in FIGS. 5(*a*), 5(*c*), 5(*e*), and 5(*g*) is given. Indeed, each projected light ray (as represented in FIGS. 5(*a*), 5(*c*), 5(*e*), and 5(*g*)) is represented by a point in a 2D ray diagram (as also explained in FIG. 4B of document WO 2013/180192). Hence, a point in the 2D ray diagram correspond to a projected light ray. It should be noted that similar Figures can be obtained by considering projections on the plane 405.

Indeed, as the light-field is a function of four variables, it is very difficult to illustrate in general. However, we can take a 2D slice and figure out in two different ways how particular light ray sets map into 2D graphs. FIGS. 5(*a*) to (*h*) show two different representations of such 2D slices restricted to the $x_1$ and $x_2$ axis. FIG. 5(*a*) shows a collimated ray set, FIG. 5(*c*) presents a divergent ray fan, FIG. 5(*e*) presents a convergent ray fan, and FIG. 5(*g*) presents a convergent ray fan, focused on the plane 403. FIGS. 5(*b*), 5(*d*), 5(*f*) and 5(*h*) present another way of plotting light-field data (i.e. ray lights with their direction) into a 2D ray coordinate system which is maybe easier to handle or create but more difficult to visualize.

Beginning with FIG. 5(*b*), where we have plotted in the 2D ray diagram, collimated raysets with various angle of incidence. When the ray set is parallel to the z axis, then each light ray is plotted along a 45° line (due to the fact that $x_2 = x_1 +$ constant). When the rayset points upward, the line shifts upward in the 2D diagram, and when the rayset points downward, the line shifts also downward (negative $x_2$). The conclusion is that parallel rays will map onto a line at 45°, and if the parallel rayset makes an angle with the z axis, the $x_2$ line intercept shifts accordingly.

FIG. 5(*d*) presents a diverging beam. Indeed, various degrees of divergence are plotted. The markers on the red line represent a set of rays diverging from infinity. Basically, this means that the set is collimated. The FIG. 5(*a*) showed already that the line is at 45° and that the relationship between $x_1$ and $x_2$ is linear. As the point of divergence is moved from infinity toward the axis $x_1$, the 2D ray diagrams is still linear but the steepness of the lines increases with the amount of divergence.

At the limit, if the point, from where the set of rays diverges, is on the $x_1$ axis, the rays would be plotted along the vertical axis $x_2$ on the 2D ray diagram.

FIG. 5(*e*) presents a convergent ray set. Again, the red marker line is at 45° and represents a beam converging from infinity, which is again a parallel set of rays. It should be noticed that when the point of convergence is pulled toward the $x_2$ axis, the rays would map on lines of decreasing slopes.

FIG. 5(*g*) is the limit when the convergence point is on $x_2$, a focused rayset, then all rays on the diagram are one the horizontal axis.

It should be noted that in the case that two 2D ray diagrams are used (one derived from the projection onto the plane 404 (see FIGS. 5(*a*), 5(*c*), 5(*e*), and 5(*g*)), noted $\Pi(x_1, x_2)$, and one obtained from the projection onto the plane 405, noted $\Pi(y_1, y_2)$) for representing the light rays, it is necessary to store another information that enables the linking between a point in one 2D ray diagram (i.e. a point in $\Pi(x_1, x_2)$) with a point comprises into the other 2D ray diagram (i.e. in $\Pi(y_1, y_2)$), or vice-versa. In the FIG. 26, a technique that enables to bypass the storing of such explicit additional information is described for all the light rays in a sampled light field. However, in order to understand such technique, some remarks and comments should be given, in view of FIGS. 6 to 24.

Figure 6:
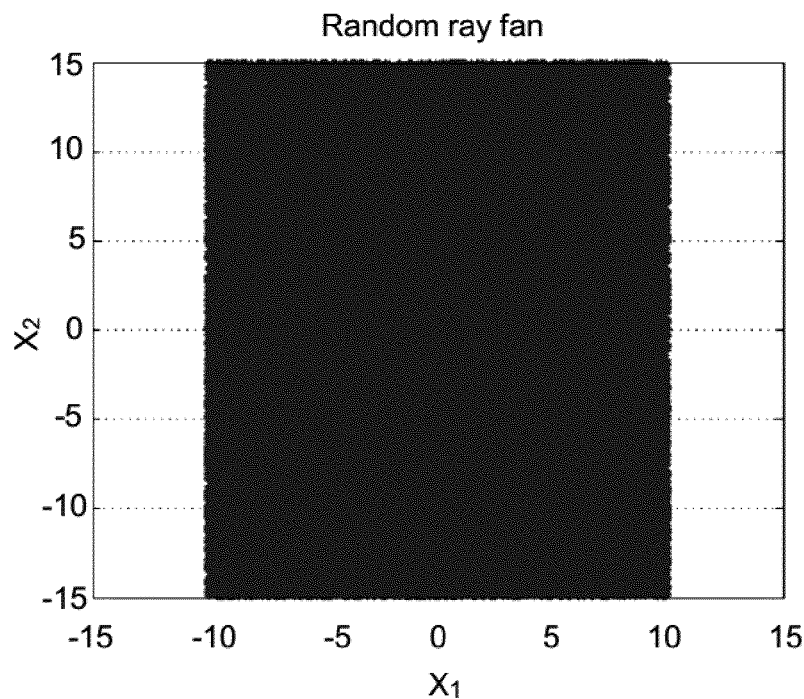
FIG. 6 presents a 2D ray diagram of a random ray fan according to an embodiment of the disclosure.

FIG. 6 presents a 2D ray diagram of a random ray fan.

In order to generate a random light-field, a uniform random number generator can be used. Then a 2D ray diagram as the basic representation of the light-field and then regenerate in a simple way chosen portions of the light-field from the format.

The x value will extend over [−10; 10], the direction of propagation is z, the second plane for parametrization is placed at z=1 and the rays will be assigned with a random direction. In order to generate uniformly distributed random ray directions, it is better to randomly generate the $x_2$ component with a uniform number generator, for instance inside of [−15; 15]. FIG. 6 shows the corresponding 2D ray-diagram. As expected, there are rays everywhere within $\|x_1\| < 10$ and $\|x_2\| < 15$, where $\|.\|$ is the Euclidian norm.

We would like here to get proofs for observations previously identified in FIGS. 5(*a*)-(*g*). It will give us some formula for particular renderings. The questions that need to be answered among others are: how to render a viewpoint, how to refocus elsewhere, what rays in the 2D ray diagram are used for what purpose? There could be millions of points in a 2D ray-diagram like the one of FIG. 6. Do we need to test or trace all of them to render some particular image?

In computer graphics, renderings use pinhole cameras to generate images. An image is formed on a plane by filtering the light-field by a tiny hole some focal distance in front of that plane (see for example the previously mentioned article entitled:" *Understanding camera trade-offs through a Bayesian analysis of light field projections*"). Hence, rendering images is a matter of "holes". From a ray stand point, this is equivalent to search for convergence or divergence of a set of rays.

Figure 17:
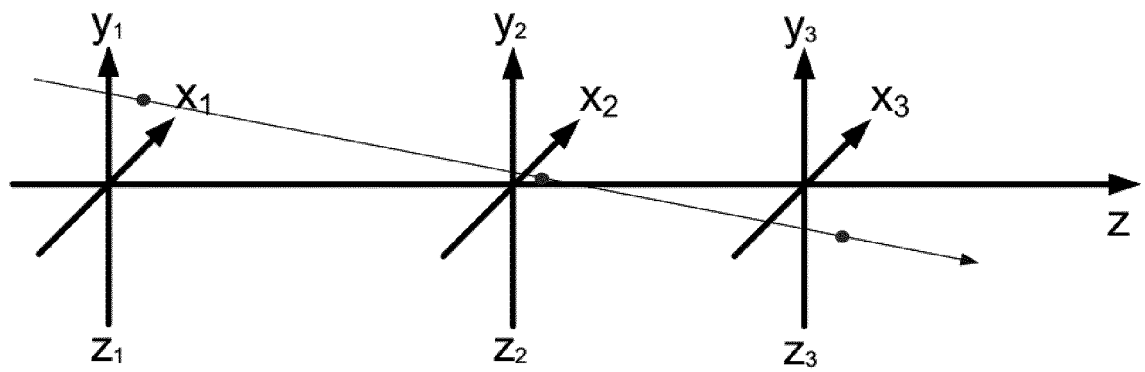
FIG. 17 presents a coordinate system used for general viewpoint rendering in 3D space according to an embodiment of the disclosure.

FIG. 17 presents the notation used to analyze the relationship between the light-field and the ray diagram. From this figure, if $z_1 \neq z_2$, and $z_3 \neq z_1$:

$$\frac{x_1 - x_3}{z_1 - z_3} = \frac{x_2 - x_1}{z_2 - z_1} \Leftrightarrow L_{2D}(x_1, x_2) = (z_2 - z_3)x_1 + (z_3 - z_1)x_2 = (z_1 - z_3)x_3$$

This formula, referenced as equation 1, links the pinhole, or the viewpoint $(x_3, z_3)$ to the recorded lightfield parameters $(x_1, z_1, x_2, z_2)$ which is the position in the 2D ray-diagram since $z_1$ and $z_2$ are known. Equation 1 is, as expected from the previous section, a line of the form ax+by=c. Also, as expected, its slope (the coefficient of $x_1$ is a function of the depth of the rendering pinhole at $z_3$ to one of the plane and the y intercept is a function of the off-axis position $x_3$ of the pinhole. Let us now consider some limit cases of that equation:

a) On axis collimated ray fan ($z_3 \to \pm\infty$, $x_3 = 0$)

If $z_3 \to \pm\infty$ and $x_3 = 0$, we are in the presence of a collimated ray fan parallel to the z axis and from equation 1, $$\lim_{z_3 \to \pm\infty} L_{2D}(x_1, x_2) = x_2 - x_1 = 0$$

which is indeed a linear relationship $x_2 = x_1$. Hence, if from the 2D ray-diagram of FIG. 6, we only select and render rays that obey the relationship $x_2 = x_1$, we a going to trace only the rays from the light-field that propagate parallel to the z axis.

b) Off axis collimated ray fan ($z_3 \to +\infty$, $x_3 \neq 0$)

Figure 7A:
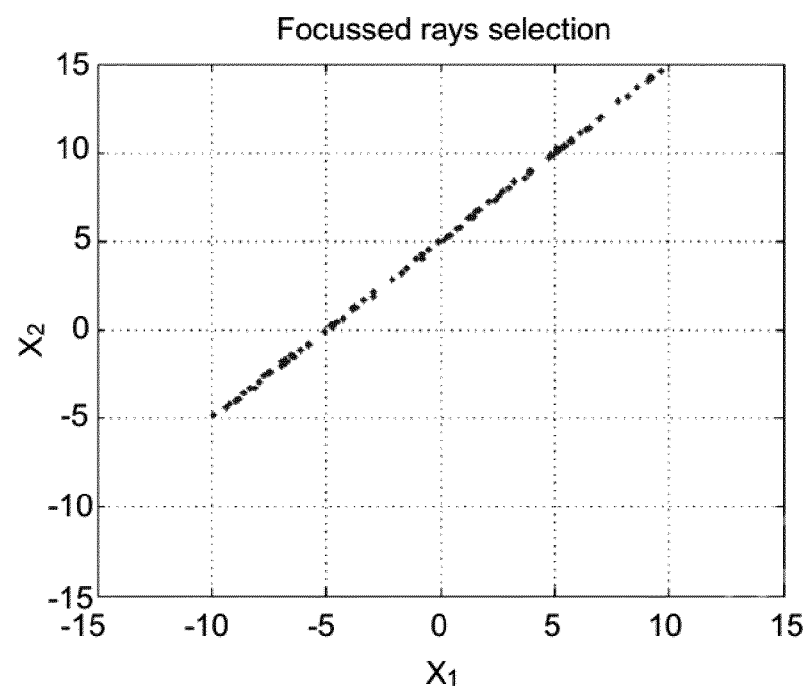
FIGS. 7(a)-(b) present the result of light field filtering from the 2D ray diagram of FIG. 6, according to an embodiment of the disclosure.
Figure 7B:
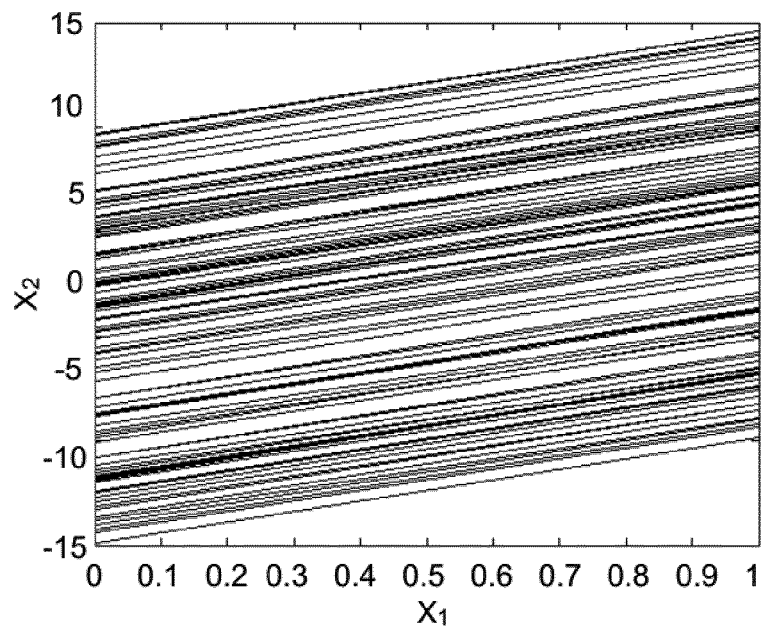
Figure 8:
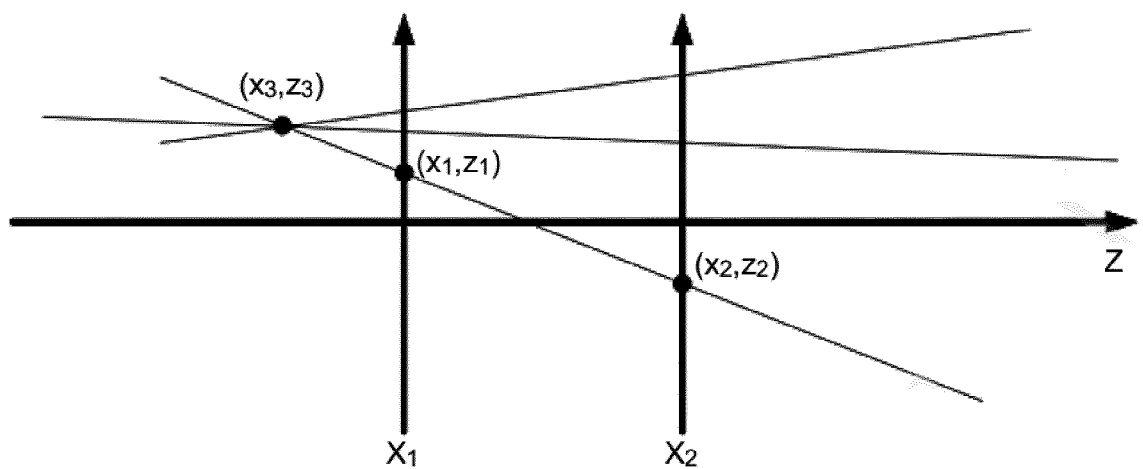
FIG. 8 presents a coordinate system used for general viewpoint rendering according to an embodiment of the disclosure.

For off-axis collimated ray fans, there is an affine relationship between $z_3$ and $x_3$: $x_3 = az_3 + b$ so that if we put that into equation 1:

$$\lim_{z_3 \to \pm\infty} L_{2D}(x_1, x_2) = x_2 - x_1 = a(z_2 - z_1) \Leftrightarrow x_2 = x_1 + a(z_2 - z_1),$$

which is illustrated in FIG. 5(*a*) where off axis beams are 45° lines with y intercepts varying as the slope the collimated beams makes with the z axis. Again, if from the 2D ray-diagram, we only select and render light rays that obey the relationship $x_2 = x_1 + c$, we are going to trace light rays from the whole light field that propagate as a parallel ray set with some angle with respect to the z axis. The FIGS. 7(*a*) and 7(*b*) illustrate exactly this case, by selecting the rays from the 2D diagram of FIG. 6, we see that off-axis parallel rays are traced. Indeed, FIGS. 7(*a*) and 7(*b*) presents Light field filtering and reconstruction of light rays from the 2D ray diagram of FIG. 6. More precisely, the FIG. 7(*a*) depicts the selection of the light rays in the 2D ray diagram of FIG. 6, according to a selection criteria being $\|L_{2D}(x_1, x_2) - (x_1 + 5)\| < 0.1$, which enables the selection of parallel set of rays with a direction propagation as shown in FIG. 7(*b*). Indeed, the FIG. 7(*b*) depicts the reconstructed light field from the selected rays in the 2D ray diagram of FIG. 6.

c) Focused Ray Fan

By "focused" we mean a fan that converges to a point after the second sampling line at $z = z_2$. In this case, we have $z_3 > z_2$ and $z_2 > z_1$, then equation 1 can be written as $$x_2 = \frac{z_3 - z_2}{z_3 - z_1}x_1 + \frac{z_2 - z_1}{z_3 - z_1}x_3$$

And the conditions $z_3 > z_2$ and $z_2 > z_1$, imply that $$0 < \alpha = \frac{z_3 - z_2}{z_3 - z_1} < 1 \text{ and } 0 < \beta = \frac{z_2 - z_1}{z_3 - z_1} < 1.$$

On axis ray fan converging to $x_3 = 0$, like on FIGS. 5(*e*) and 5(*f*), the relationship describes lines with a slope angle smaller than 45° ($\alpha < 1$).

Let us demonstrate how this is practically used. Let's assume that we have two planes sampled light field from which we build up a ray diagram. We are still in a 2D slice of the 4D light field. This ray diagram is the one from FIG. 6. Let's assume also that we would like to render three views. For that purpose, we define three pinholes, or three points after $z = z_2$, where rays shall converge to. We know now that those rays can be selected on the 2D ray-diagram along line $x_2 = \alpha x_1 + \beta x_3$, where $|\alpha| < 1$.

We define three cameras located respectively at position $C_0$ ($z_3 = +2$, $x_3 = 0$), $C_{-1}$ ($z_3 = +2$, $x_3 = -2$) and $C_{+1}$ ($z_3 = +2$, $x_3 = +3$). We set $z_1 = 0$ and $z_2 = 1$. Once those values are set in equation 1, we have to select the rays on the 2D ray-diagram that obey the three relationships:

$$x_2 = \frac{x_1}{2}$$

$$x_2 = \frac{x_1 - 2}{2}$$

$$x_2 = \frac{x_1 + 3}{2}$$

Figure 9:
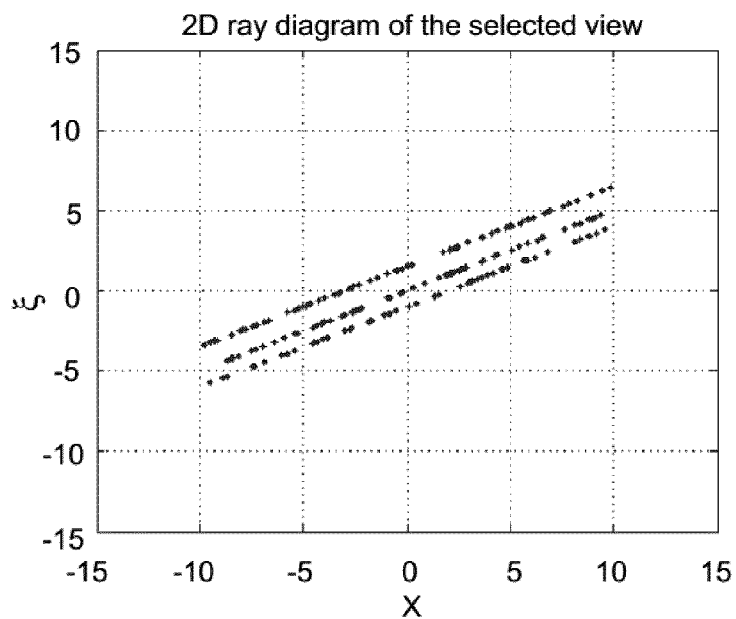
FIG. 9 depicts a selection of rays according to an embodiment of the disclosure.
Figure 10:
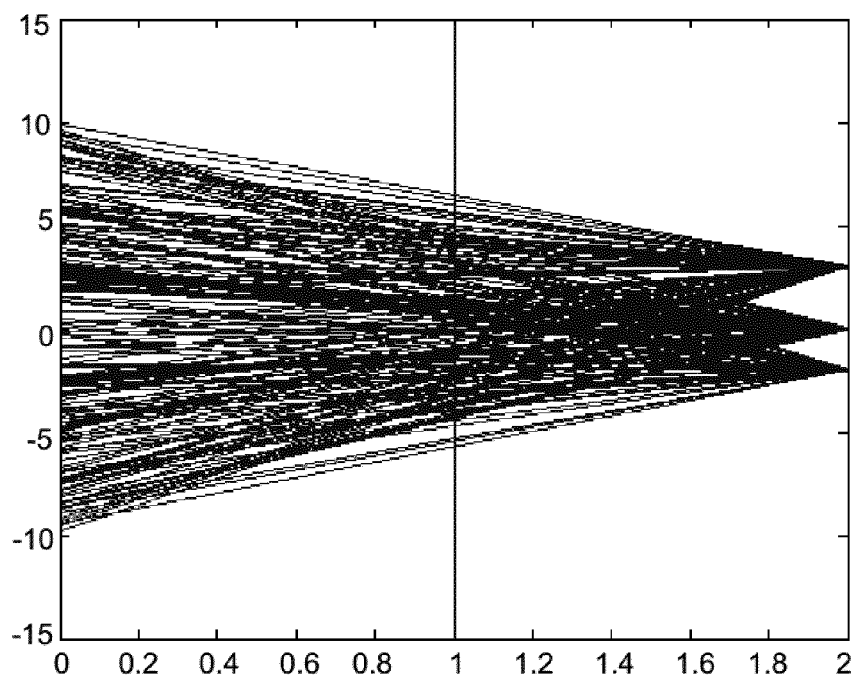
FIG. 10 presents a rendering ray trace of selected rays of FIG. 9, according to an embodiment of the disclosure.
Figure 11:
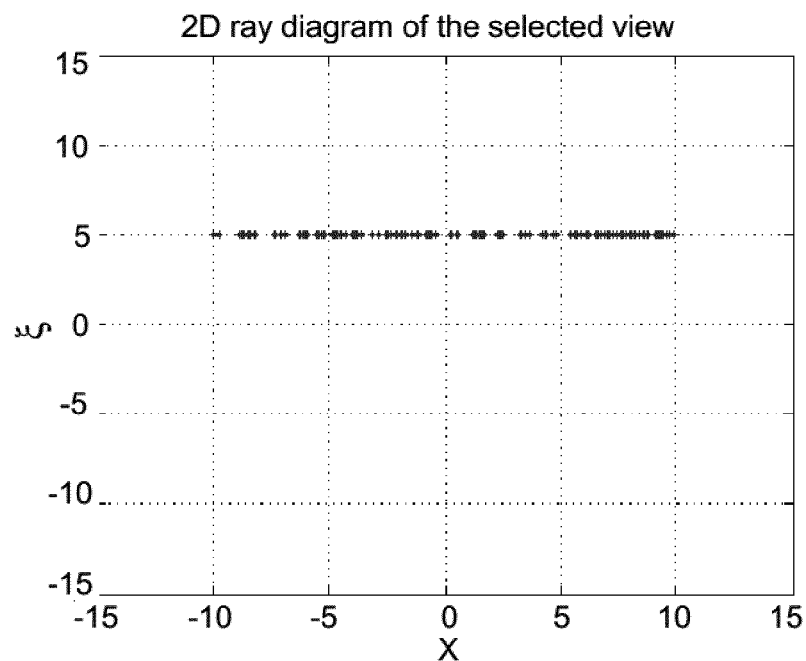
FIG. 11 presents a 2D ray diagram with selected rays according to an embodiment of the disclosure.
Figure 12:
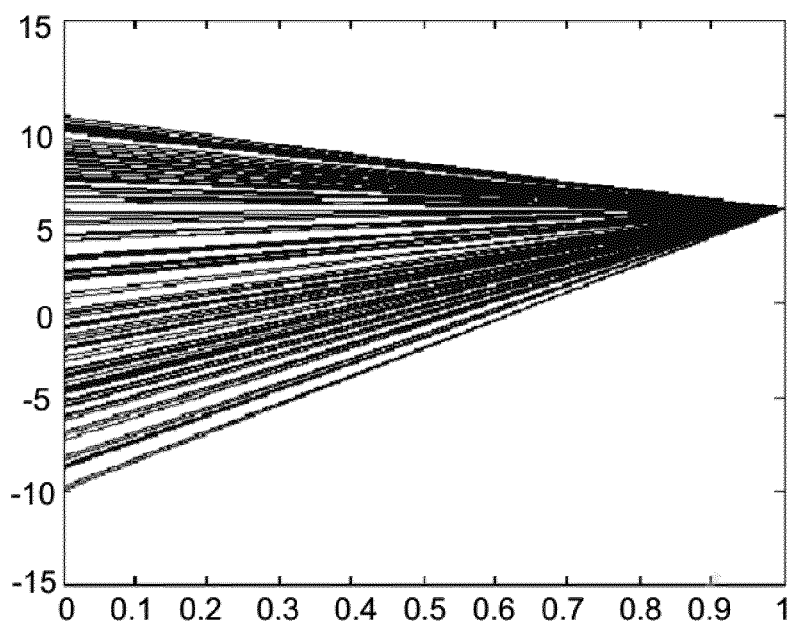
FIG. 12 shows the rendering ray trace of selected rays of FIG. 11, according to an embodiment of the disclosure.

The FIG. 9 presents a selection of the light rays in FIG. 6 with a selection criteria being $\|L_{2D}(x_1, x_2) - x_1/2\| \leq 0.1$. The FIG. 10 depicts the rendering of the selected light rays (as selected in FIG. 9).

d) Divergent Ray Fan

With "divergent", it is meant a ray fan that appears to diverge from a point ($z_3 < z_1$, $x_3$) set before the first line at $z = z_1$. With $z_3 < z_1 < z_2$, we get that $z_2 - z_3 > z_1 - z_3 > 0$, and the slope $\alpha$ is then:

$$\alpha = \frac{z_3 - z_2}{z_3 - z_1} > 1.$$

Divergent beams map into the 2D ray diagram as lines with a slope greater than 45°.

e) Divergent Ray Fan on the First Parametrization Line

The point of divergence can be placed at $z_3 = z_1$. In this case, equation 1 can be rewritten, and we get $x_1 = x_3$. To ray trace those rays that appear to diverge from the first plane, we have to select vertical lines on the 2D ray diagram.

f) Convergent Ray Fan on the Second Parametrization Line

From equation 1, if we set $z_3 = z_2$, then we get $x_2 = x_3$. Ray fan converging to the second plane map as horizontal lines on the 2D ray diagram. The FIGS. 11 and 12 have been obtained with $(z_3, x_3) = (1, 5)$.

g) The Case of Real Lenses

Pinholes are abstract objects, if we want to render the light field by using real lenses models, we need to know the position and the size of the entrance pupil of the lens, and then select in the ray diagram those rays that will trace through the entrance pupil. If the entrance pupil is at $(z_l, x_l)$, and if it has an aperture diameter A with the lens axis parallel to z, then we need to select in the ray diagram all ray points of the ray diagram whose coordinates satisfy equation 1, but with $x_3$ varying inside $$\left[ x_l - \frac{A}{2}, x_l + \frac{A}{2} \right].$$

Figure 13:
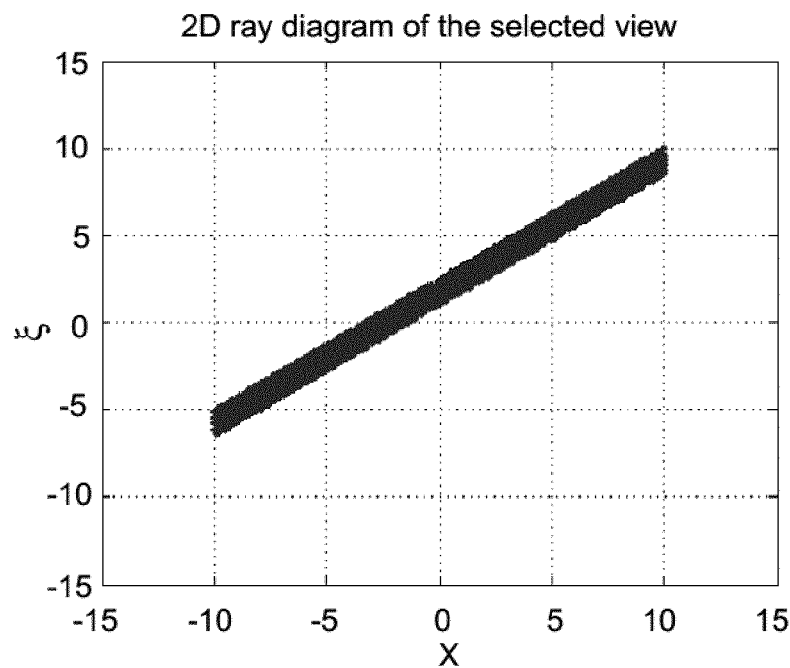
FIG. 13 presents a 2D ray diagram with selected rays according to an embodiment of the disclosure.
Figure 14:
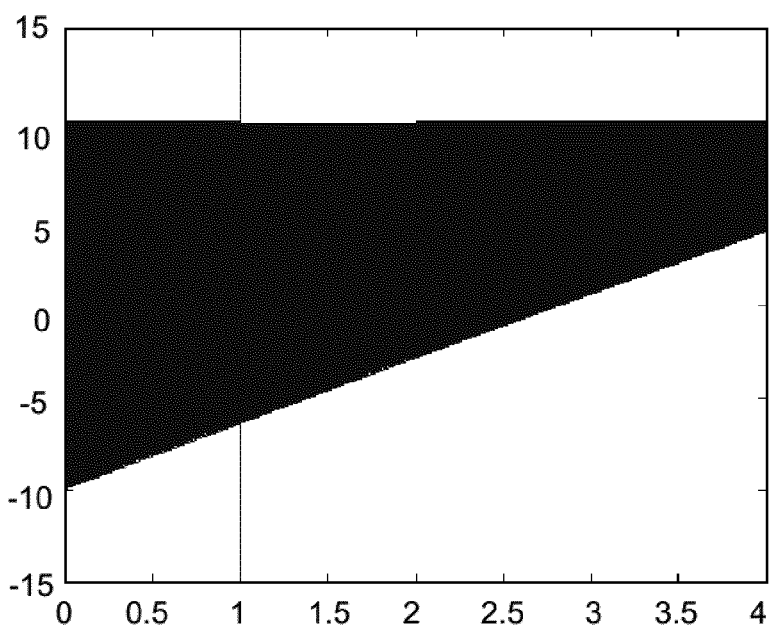
FIG. 14 shows the rendering ray trace of selected rays of FIG. 13, according to an embodiment of the disclosure.

In the FIGS. 13 and 14, the entrance pupil is at $(z_l, x_l)=(4, 7)$, its size $A=6$, and due to this size, there is a whole set of parallel lines in the 2D ray diagram that need to be selected and trace the rays belonging to the whole line set.

Now, we focus on observations of the application of the Radon Transform to a 2D ray diagram. As mentioned previously, if there are pinholes toward which rays do concentrate, the two plane parametrization of those rays are represented as lines in the 2D ray diagram. Let us for the sake of illustration set up a light-field that is captured by two groups of three cameras. The first group of cameras is at a first depth $(x_3, z_3)=\{(10, 2); (2, 2); (-5, 2)\}$, and the second group at another depth $(x_3, z_3)=\{(6, 14); (-3, 14); (-9, 14)\}$. All cameras have entrance pupil of 0.1 units (units can be either meters, centimeters, etc.). The parametrization planes are set at $z_1=0$; $z_2=1$, and the size of the planes are $|x_1| \leq 10$; $|x_2| \leq 10$ units. Both planes are sampled by 1000 cells, so that the 2D ray diagram is represented as a 1000×1000 pixel image (see FIG. 15).

Figure 15:
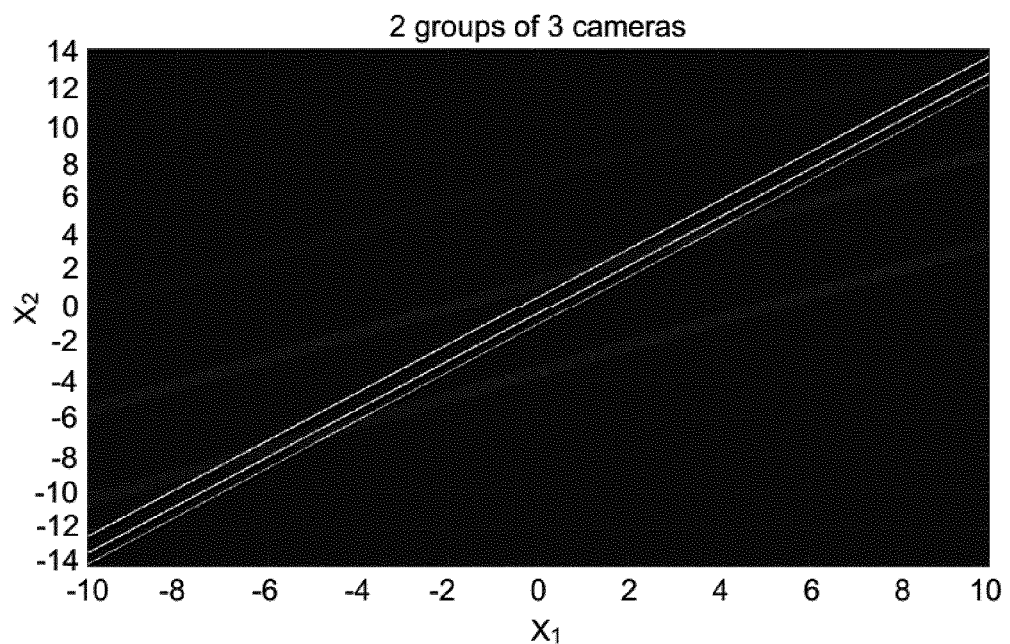
FIG. 15 is a 2D ray diagram of two groups of three cameras according to an embodiment of the disclosure. The first group has the pinholes set at the plane $z_3=2$, and the second set at the plane $z_3=14$.

Then as it has been taught previously, just by observing FIG. 15 (which is a 2D ray diagram of two groups of three cameras, the first group having the pinholes set at the plane $z_3=2$, and the second set at the plane $z_3=14$), we see that there are two set of three lines, each group is set at a different depth, because on the 2D ray diagram, different depths result in different slopes. Hence from this observation, we see that in this diagram, only certain lines are important for the transmission or for the rendering of the light-field, so that there is room for compressing efficiently this representation.

A natural way of defining which values from the 2D ray-diagram are important is to detect all the lines from the diagram. This can be achieved via the use of Radon transform. The Radon transform in two dimensions, named after the Austrian mathematician Johann Radon, is defined as the integral transform consisting of the integral of a function over straight lines.

Figure 16:
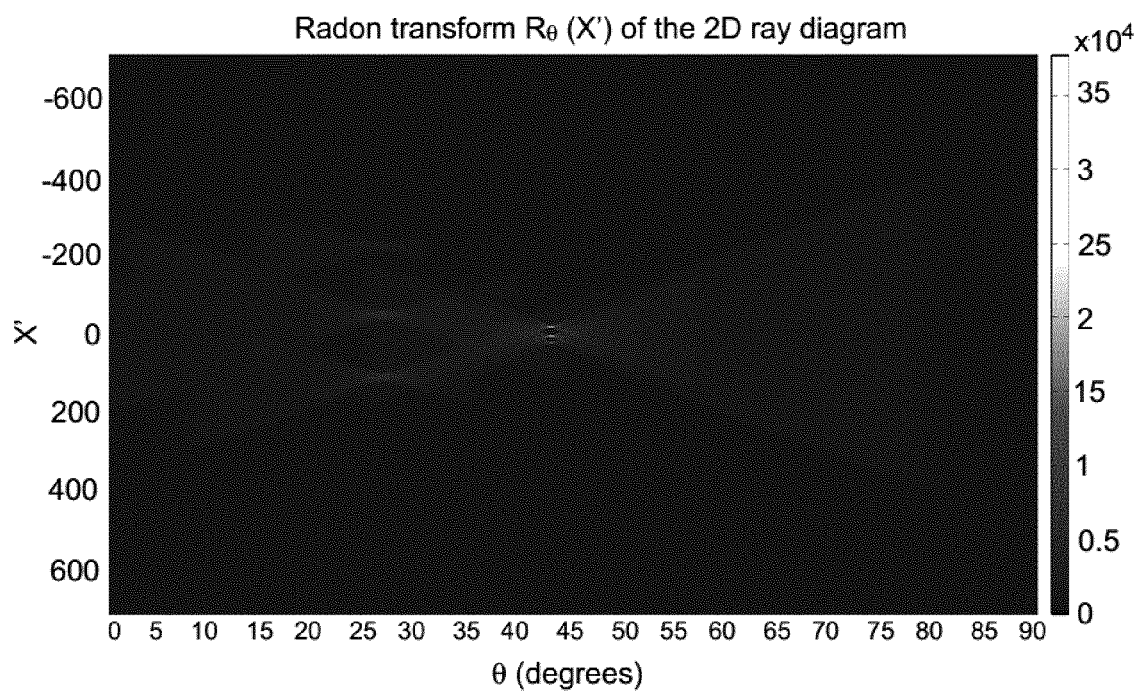
FIG. 16 is a sonogram of the Radon transform of the light field representation of FIG. 15.

This transform maps the 2D ray diagram into a parameter space which efficiently characterize a light field. FIG. 16 is a sinogram, which is the visualization of the Radon transform applied on the 2D ray diagram of FIG. 15. We see that it exhibits six local maxima in two groups of three. The first one along the line $\theta \approx 42$ and the second along $\theta \approx 27$ degrees.

FIG. 17 presents a coordinate system used for general viewpoint rendering in a 3D space.

Due to the parametrization described in FIG. 4, it is also possible to demonstrate that the following relationship stands between a point where we would like to render the parametrized light field at (such point being positioned in a plane located $z=z_3$, see FIG. 17) and the intersections points with the two planes used in the parametrization process (see the two planes perpendicular to z axis respectively at $z=z_1$ and $z=z_2$ in FIG. 17):

$$(z_2-z_3)(x_1+y_1p+(z_3-z_1)(x_2+y_2)=(z_2-z_1)(x_3+y_3)$$

As all $z_i$ are known, the only parameters of this equation, referenced as equation 2, are the four parameters $(x_1, y_1, x_2, y_2)$. Equation 2 basically means that all the rays that do impact (or converge to, or an equivalent formulation would be "form an image") through the point $(x_3, y_3, z_3)$ have their 4 coordinates linked.

It should also be noted that equation 2 defines a hyperplane in $\mathbb{R}^4$ (see the article entitled "*Polyhedral geometry and the two-plane parameterization*", by X. Gu and al., published in Rendering Techniques'97, Proceedings of the Eurographics Workshop in St. Etienne, France, Jun. 16-18, 1997.

Again, this means that if we want to render images from a two-plane parametrized light-field, we will only render the rays in the vicinity of hyperplanes. There is no need to trace them all. Of course everything behaves well, since we always chose parametrization planes in the direction of propagation or direction of rendering.

Some Comments about a Representation Format in 2D

If the light-field is parametrized by two planes, its representation in the phase space (i.e. a 4D ray diagram) occupies a portion of a 4D space. As the planes have finite dimensions, the 4D support of the plenoptic function in that phase space is compact. We can estimate the space required to store a light-field parametrized in this way. Let us consider both the cases of a 2D slice and the whole 4D case. Let us also assume that the planes are sampled by 1000×1000 cells. This means that the 2D phase space is represented by a matrix of 1000×1000 cells, and the 4D phase space by a matrix of $1000^4$ cells. If the spectrum of the ray associated to a cell is sampled by three bands, typically red (R), green (G) and blue (B) quantized with 8 bits, the color is stored as a 24 bits or 3 bytes value. We can see that each 4D representation in this particular case requires 2.8 TBytes of storage.

From FIG. 15, we see also that the matrix will be very sparsely populated, there will be lots of cells without any value at all, and this case is general with the light-field, since it is going to be captured by discrete acquisition means. The 4D representation matrix will even be less populated proportionally, so that it does not make sense to manipulate huge matrices. Similarly to what is done in sparse matrix representation, maybe we can find a way to avoid it.

We have also seen that for the 2D sliced representation, the rays do map along the vicinity of lines. In the 4D case, they map in the vicinity of hyper-planes.

Let us restrict the following discussion to the 2D case. As we have a mean to find the parameters of the lines with the discrete Radon transform, we can locate the regions of the matrix where there are representative values.

Figure 18:
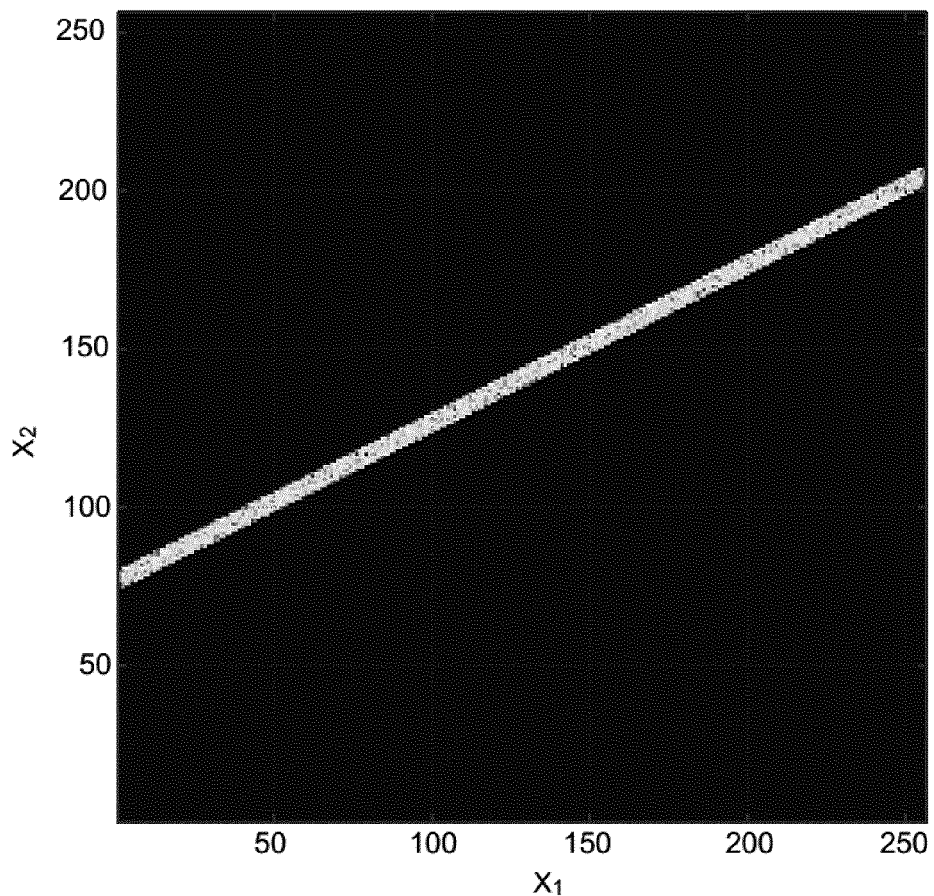
FIG. 18 is a 2D ray diagram of rays captured by one camera at coordinates $x_3=2$, $z_3=2$ with an aperture of $|A|<0.5$, according to one embodiment of the disclosure. The lines used to parametrize are sampled by 256 cells.

In order to illustrate explanations, we will take an example to follow the main ideas exposed hereafter. FIG. 18 shows 2D ray diagram of a system as described in the caption. More precisely, FIG. 18 depicts a 2D ray diagram of rays captured by one camera at position $x_3=2$, $z_3=2$, with an aperture of $|A|<0.5$, and where the lines used to parametrized are sampled by 256 cells. If the image shown on FIG. 18 is interpreted as a matrix, we can see that is very sparsely populated. The question that arises is: how is it possible to extract only the representative data from that matrix? What is the best way to store it in a file (In a structured manner, of course)? Even if the rays are saved individually in a file instead of the 4D phase space matrix, this requires to save for each ray, at least 2 bytes for each position $x_i$ or $y_i$ plus 3 bytes for the color. This is 7 bytes per ray for a 2D sliced light-field, and 11 bytes per ray for its full 4D representation. And even then, the rays are stored randomly in the file which might be very improper for a lot of applications that need to manipulate the representation.

A Beam of Digital Lines

As we know that the rays are mapped along lines, it is more efficient to store in sequence the parameters of the line (slope related s and intercept d) and then the collection of rays belonging to that line, and then the next line parameters and respective rays, and so on.

This would require 2 bytes for s and 2 for d and then only 3 bytes per ray, which, if we ignore the overhead of line parameters in comparison to color data, offers a compression ratio of 1:2 and 1:4 for the 2D, respectively 4D ray representation. Moreover, the rays would be ordered along lines in the file. In order to set lines through matrix cells we need to define the so called digital lines which approximate them with minimum error. We follow common definitions and digital lines defined in literature dedicated to the discrete Radon transform (see for example the article entitled "*A fast digital radon transform-an efficient means for evaluating the hough transform*" by W. A. Götz and H. J. Druckmüller, published in Pattern Recogn., 28(12):1985-1992, December 1995, and in the article entitled "*Discrete Radon transform has an exact, fast inverse and generalizes to operations other than sums along lines.*", by W. H. Press, in Proc. Natl. Acad. Sci. USA, 103(51):19249-19254, 2006.).

At this stage the digital lines are generated with Bresenham's algorithm. More advanced recursive type digital line generation will be shown later on. From previous references, the digital line is defined by two points of the grid, (0, d) and (N−1, s) where the parameter s is coupled with the slope of a line by the following equation:

$$a = \frac{s}{N-1} \text{ where } s \in \{0, 1, ..., N-1\}. \ d \text{ is the intercept and } d \in \{0, 1, ..., N-1\}$$

Figure 19:
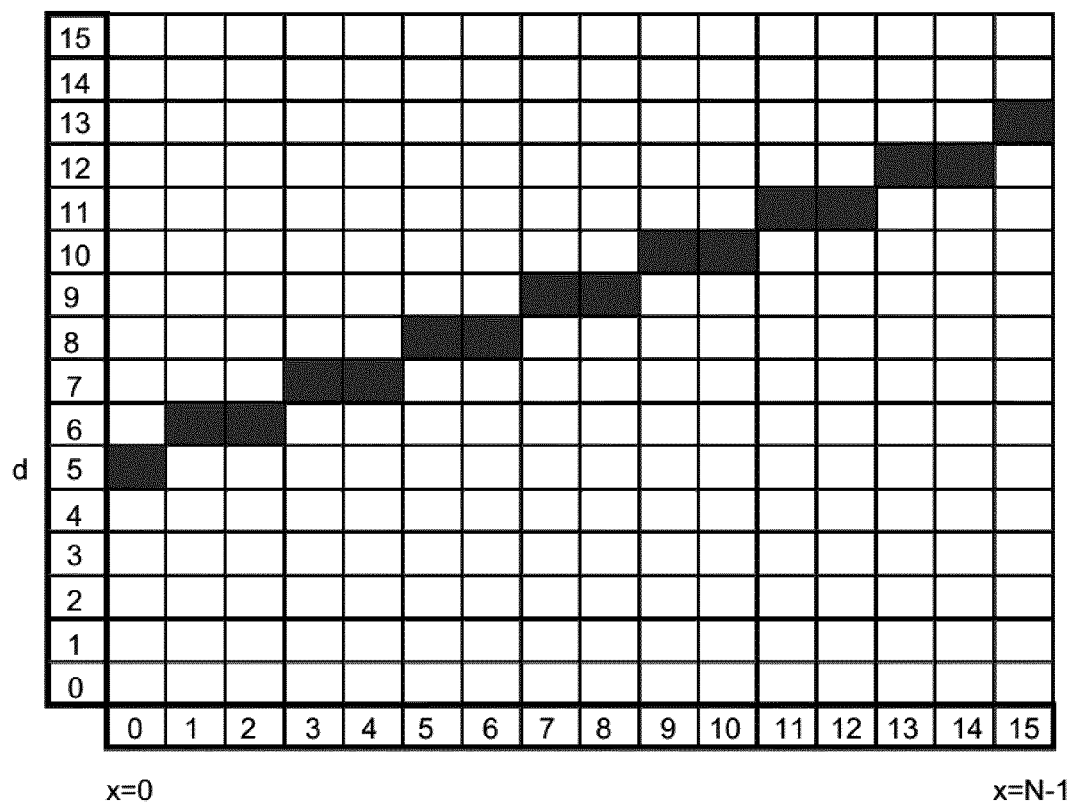
FIG. 19 presents an example of a line in a 2D ray diagram according to an embodiment of the disclosure.

See for example the FIG. 19, which is an illustration of d, s and numbering of the x axis for the digital lines. As we have seen it previously, we can restrict the digital line to one octant, either the first one within $$\left[0, \frac{\Pi}{4}\right],$$

or the second octant $$\left[\frac{\Pi}{4}, \frac{\Pi}{2}\right].$$

Until now, we have only two points of a line. This is sufficient for an analytical line, but now we also have to provide the grid points that approximate the analytical line. The most straightforward way to get a digital line is to round an analytical line to its nearest grid-point. Bresenham's algorithm provides a way to do it with minimal operation number whereas the approach developed in the previously mentioned articles, which gives alternate definition which are better adapted to a fast discrete Radon transform calculation. The Bresenham implementation has been adapted from the following reference: http://www.cs.helsinki.fi/group/goa/mallinnus/lines/bresenh.html. As it has been previously said, the analysis is restricted to one octant. In this particular case, we have 0≤α≤1 so that d≤s.

Figure 20:
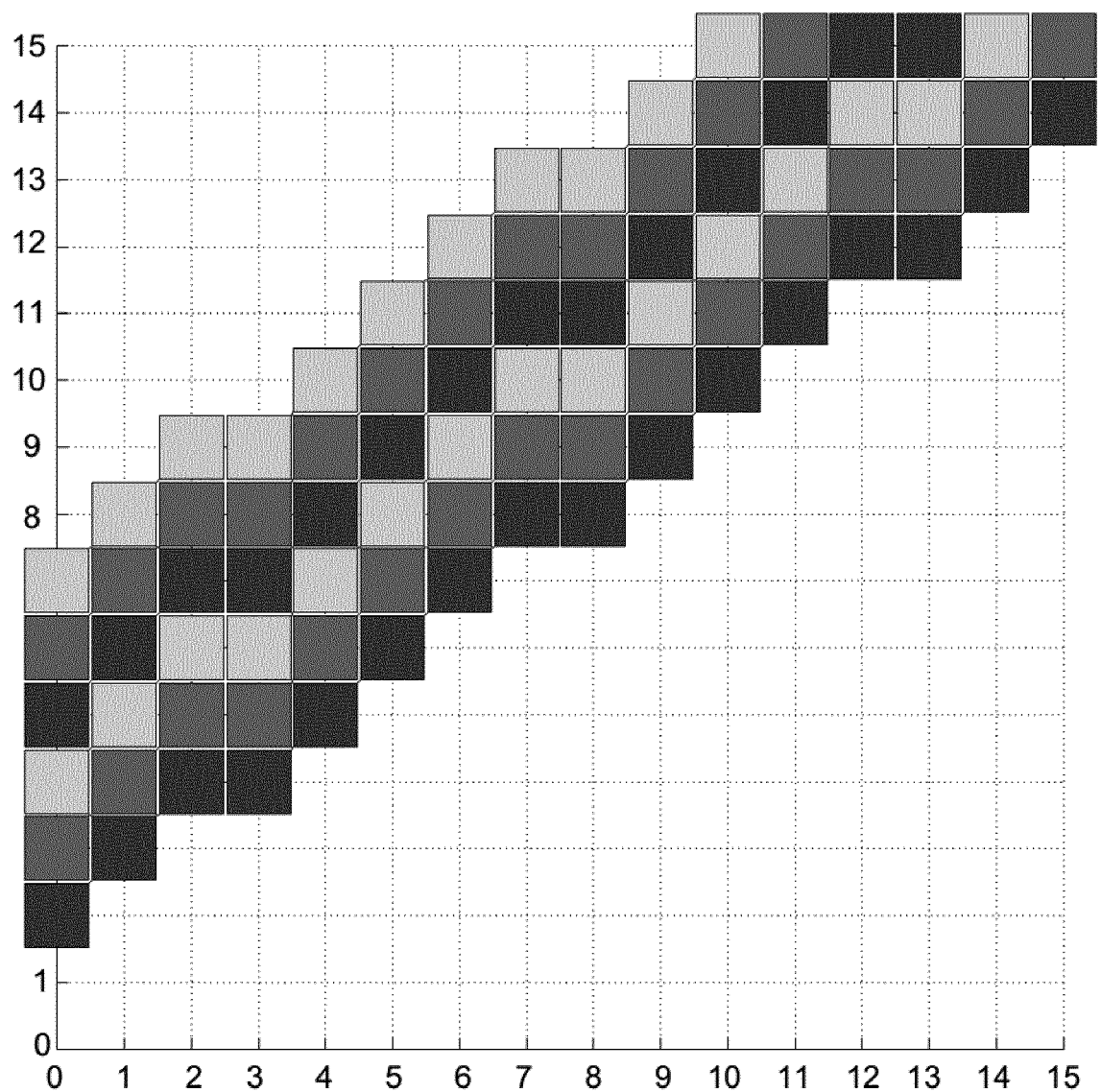
FIG. 20 is a 2D ray diagram comprising six lines or digital lines according to an embodiment of the disclosure.

Consider now a family of digital lines having the same slope a but different intercepts d, and the family of lines being contiguous. This family of digital lines will be named a "beam". FIG. 20 shows a beam of 6 digital lines according to that definition, with the same s−d value, but different d intercepts. A particular pixel within the region hit by the beam of lines belongs only to one unique line.

Hence, to sum up, ray data parameterized by a sampled pair of lines (in 2D) and belonging to one camera, belong to a family of digital lines (beam) in the phase space used for representing the data. The header of the beam can simply contain the slope a and the thickness $d_{max}-d_{min}$ of the beam. The ray values will be stored as RGB colors along digital lines whose header can be d and s. The file will not store void cells of the ray diagram sampled space. Nor will it store the coordinates $x_1$, $x_2$ of the rays, the later will be deduced from d, s and from the position of the cell along the digital line. The FIG. 21 is a format description that takes into account these remarks, as described later.

Discrete Radon Transform for Characterizing a Beam of Digital Lines

In order for the previous format to be implementable and usable as an interchange and rendering basis, it is at least wishful to be able to measure or guess the basic parameters which have to be written inside of the format. The parameters that need to be estimated from the light field or from camera's geometry are the slope a the lower and upper bounds of the digital line intercepts ($d_{min}$, $d_{max}$), and then the digital line parameters ($d_i$, $s_i$). The discrete Radon transform has been discussed as a tool to measure the support location of the light-field in the ray diagram.

Figure 23:
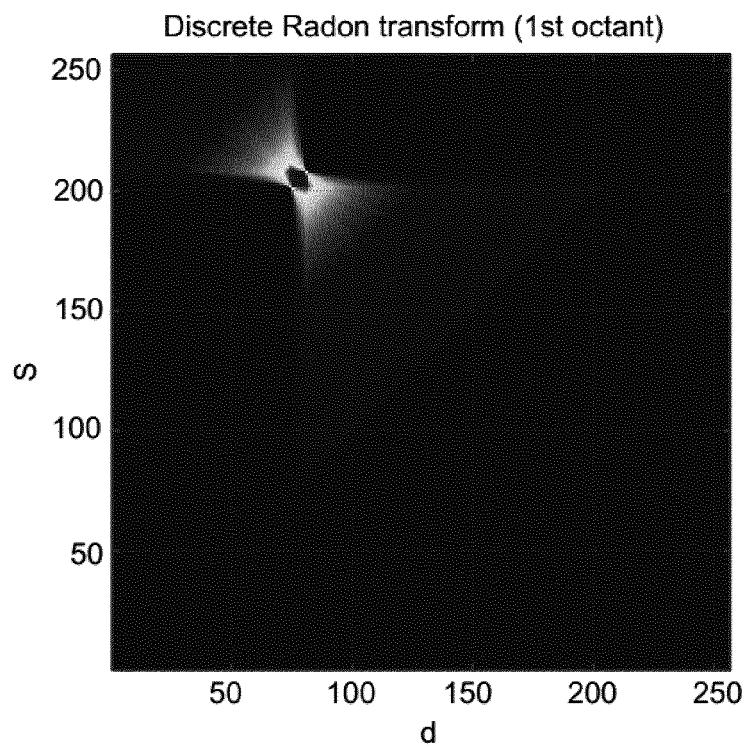
FIG. 23 presents the result of the application of the Discrete Radon Transform on data from FIG. 18.

The FIG. 23 shows the discrete Radon transform in the digital line parameter space (d, s), which shall not be confused with (ρ, θ) space of the sinogram.

Figure 24:
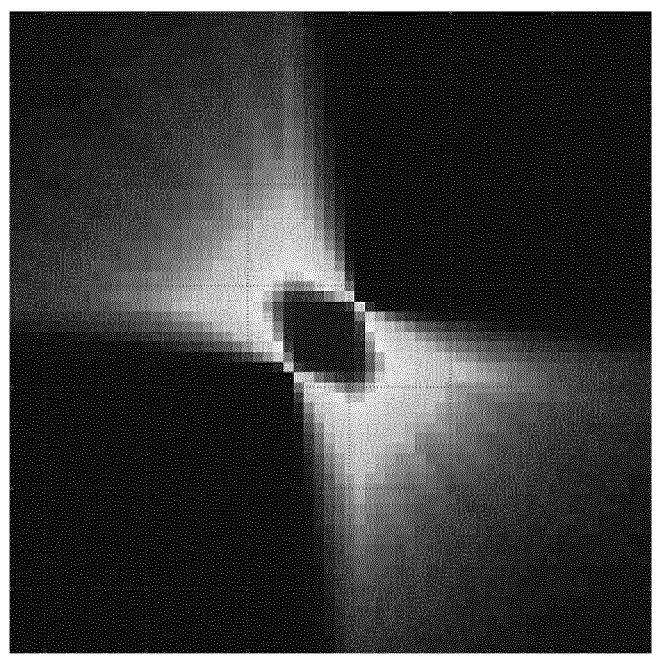
FIG. 24 is a zoom on an area in FIG. 23.

More precisely, FIG. 23 shows the discrete Radon transform of the distribution from FIG. 18, and FIG. 24 is a zoom into the region of interest comprised in FIG. 23. The beam of digital lines is spotted by the search for the maximum value parameters. There could be some offset between the geometrical center of symmetry of the DRT and the actual position of the maximum due to image content so that later on, an algorithm has to be found to pin-point the center of symmetry instead of the maximum. Instead of summing up the RGB values along the integration lines, finding the maximum without the bias of the content could be done by summing up the number of rays per cell along the integration line, which is more a Hough transform (binary version of Radon). Then, the waist of the beam transform as shown on FIG. 24 is easy to find and it directly gives the values ($d_{min}$, $d_{max}$) used into the format. In fact, the point ($d_{min}$=74, s=201) is the lower envelope of the beam of digital lines from FIG. 18, and ($d_{max}$=81, s=208) is the upper envelope of the beam of digital lines.

Once we have got those values, we can begin to fill in the data into the format specified by FIG. 21.

Evaluation of the Hyper-Plane Location by Orthogonal 2D Radon Transforms a) Principle Maybe what scares the most in this approach of representing the Light-field is the necessity to work in a 4D space to locate the hyper-plane of ray-data. In the following analysis, we will show that we can evaluate the location and volume of the whole hyper-plane by just two orthogonal 2D DRTs.

Let us write down the equations of two orthogonal 2D sliced spaces from equation 2.

$$(z_2-z_3)(x_1+y_1)+(z_3-z_1)(x_2+y_2)=(z_2-z_1)(x_3+y_3)$$

And if we take a 2D slice for $x_i$ coordinates, the equation of the beam of lines where ray data through an aperture of size A at $(x_3, y_3, z_3)$ will map is:

$$x_2 = \frac{(z_3 - z_2)}{(z_3 - z_1)}x_1 + \frac{(z_2 - z_1)}{(z_3 - z_1)}(x_3 \pm A) = mx_1 + (d_{max_x} - d_{min_x})$$

Similarly, if we take a 2D slice for $y_i$ coordinates:

$$y_2 = \frac{(z_3 - z_2)}{(z_3 - z_1)}y_1 + \frac{(z_2 - z_1)}{(z_3 - z_1)}(y_3 \pm A) = my_1 + (d_{max_y} - d_{min_y})$$

According to the previous section, we can evaluate in the discrete domain the values of m and $d_{max_x}$, $d_{min_x}$, $d_{max_y}$, $d_{min_y}$.

To localize the characteristics of a light-field as defined by the format discussed previously, there is no need to perform a 4D discrete Radon transform. If we do two orthogonal 2D DRT, we can measure the slope m of the hyper-plane and the beam width of the digital hyper-planes where all data will concentrate in the 4D ray-diagram.

This simpler procedure of location assumes a circular entrance pupil A so that $d_{max_x}$, $d_{min_x}$, $d_{max_y}$, $d_{min_y}$ will encompass all hyper-planes intercepts, some values written in the format will contain no values.

b) Example

Figure 25:
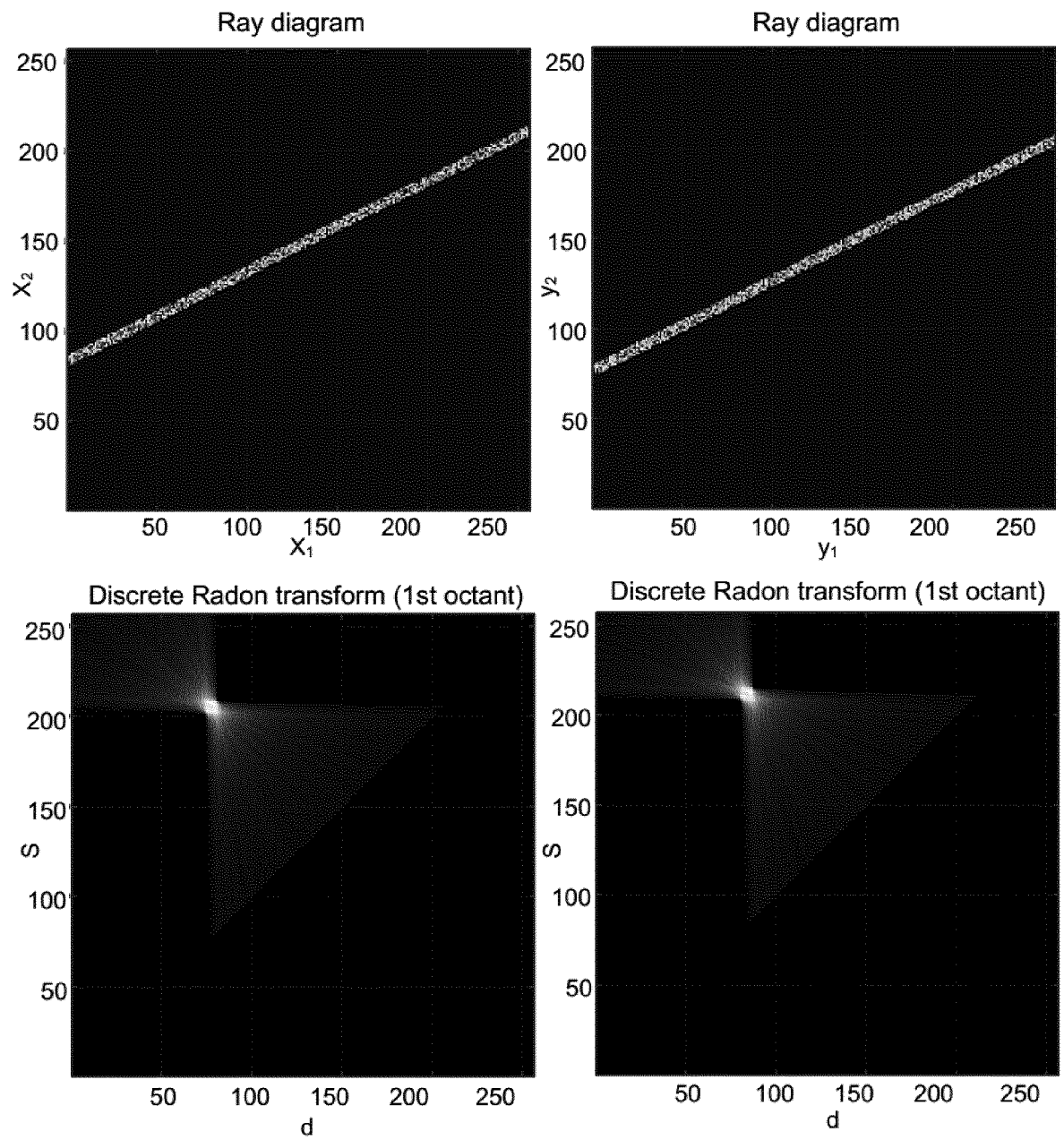
FIG. 25 presents on the left hand side a 2D ray diagram in x and the result of the application of the Discrete Radon Transform on data in such 2D ray diagram, and on the right hand side, a 2D ray diagram in y and the result of the application of the Discrete Radon Transform on data in such 2D ray diagram.

Let us extend the example from section 3 to a 4D case. Let us assume that we have a camera located at $(x_3, y_3, z_3) = (2, 5, 2)$. (i.e. the camera position is $(x_3, y_3, z_3)$) The 2D slice in the sampled ray diagram in x will be the same as the one represented on FIG. 18, and the 2D-DRT is the one from FIG. 23. The FIG. 25 shows as well the orthogonal 2D-DRT in a y 2D-slice. More precisely, FIG. 25 depicts two 2D ray diagrams: $x_2$), and $y_2$), as well as the result of the Discrete Radon transform applied to these 2D ray diagrams.

From the 2D-xSlice DRT, we get an evaluation for the slope of the hyper-plane m=0.5059 and from the 2D-ySlice DRT, another independent evaluation of m=0.4980. From equations in section a), the true value is m=0.5. The difference, which is small, comes from the fact that we transform a beam of digital lines. So that the maximum of the 2D Radon transform is broad and there is an uncertainty in the evaluation of the maximum. From the measurement of the waists, on both 2D-DRT, we find that $d_{max_x}$=80, s=208, $d_{min_x}$=74, s=201 for the beam envelope in x, and $d_{max_y}$=87, s=214, $d_{min_y}$=80, s=208 for the beam envelope in y. Those values are exactly what was expected.

It remains now to find a way to extend the format introduced in FIG. 21 to the 4D context.

c) Case of Multi-Camera

If we have a light-field belonging to a multi camera system, we can proceed by taking advantage of the linearity of the DRT to estimate recursively the parametric volume that each camera occupies.

We can begin to do two orthogonal DRT and seek for the maximum and envelope of the digital hyper-planes belonging to that maximum. Once we have all the parameters, we can erase all the rays from the 4D ray-diagram or from the file where they are stored and begin again by a pair of orthogonal DRT to locate the second maximum, and so on until we have emptied the 4D ray-diagram.

We would be interested to obtain a format for the 4D case which is similar to what was proposed for the 2D case, i.e., table in FIG. 21. To do so, we would be interested to associate the 2D lines found on the $\Pi(x_1, x_2)$ plane to the lines found on the $\Pi(y_1, y_2)$ plane, i.e., the lines that are the results of the intersection of the corresponding hyper plane with the two orthogonal slices of $\Pi(x_1, x_2)$ and $\Pi(y_1, y_2)$. From equations mentioned in section a), we know that the corresponding lines have the same slope m. This is the first parameter that associates each line on $\Pi(x_1, x_2)$ to a line in $\Pi(y_1, y_2)$ for a camera at a certain depth. Now, if we have multiple cameras at the same depth (i.e., the case of FIG. 15), we have three lines in $\Pi(x_1, x_2)$ and three lines in $\Pi(y_1, y_2)$ with the same estimated slope of m. We then need to determine the correspondences in the line offsets between the lines in these two planes. To do this, we exploit the formulation of the lines in Equations mentioned in section a). In particular, denoting k=

$$\frac{z_2 - z_1}{z_3 - z_1},$$

we have the offsets as the following:

$$\begin{cases} kx_3 + kA = d_{max_x} \\ kx_3 - kA = d_{min_x} \end{cases}$$

and $$\begin{cases} ky_3 + kA = d_{max_y} \\ ky_3 - kA = d_{min_y} \end{cases}$$

We can solve these sets of the equations for k, $x_3$ and $y_3$. Note that $(x_3, y_3, z_3)$ are the coordinates of the camera, or in other words the center of projection, which is also the center of the exit pupil of radius A of the camera. We have supposed that the aperture on the plane positioned at $z_3$ is circular, so that $d_{max_x} - d_{min_x} = d_{max_y} - d_{min_y} = 2$ kA, and by solving the previous sets of equations:

$$k = \frac{d_{max_x} - d_{min_x}}{2A}$$

$$x_3 = A\frac{d_{max_x} + d_{min_x}}{d_{max_x} - d_{min_x}}$$

$$y_3 = A\frac{d_{max_y} + d_{min_y}}{d_{max_y} - d_{min_y}}$$

$$z_3 = \frac{z_2 + (k-1)z_1}{k}$$

Now, we scan the digital lines the same as before on $\Pi(x_1, x_2)$ using the Bresenham digital lines. For each individual $(x_1, x_2)$ value in $\Pi(x_1, x_2)$, we need to store the corresponding $(y_1, y_2)$ value in $\Pi(y_1, y_2)$, captured in the light field. To find such values, we exploit equation 2. All the following are either known or estimated from previously mentioned equations.

Now moving on each line in $\Pi(x_1, x_2)$, for each $(x_1^q, x_2^q)$, we have the following relationship in $(y_1, y_2)$:

$$y_2 = \frac{z_3 - z_2}{z_3 - z_1}y_1 + \frac{z_3 - z_2}{z_3 - z_1}x_1^q + \frac{z_2 - z_1}{z_3 - z_1}(x_3 + y_3^*) - x_2^q$$

-continued

Hence, $$y_2 = my_1 + mx_1^q + k(x_3 + y_3^*) - x_2^q = my_1 + d_{off}(x_1^q, x_2^q, x_3, y_3^*)$$

It should be noted that in the case that we want to store lines parameter in $\Pi(y_1, y_2)$ in the format (instead of lines parameters of the lines identified in $\Pi(x_1, x_2)$), the same formula can be applied in order to recover from a point of a line in $\|(y_1, y_2)$ the corresponding value in $\Pi(x_1, x_2)$.

Where the aperture of the camera is a circle with the radius A. Therefore, variable $y_3^*$ varies between $y_3 \pm A$. As a consequence, for each point in $\Pi(x_1, x_2)$, we need to save a collection of lines in $\Pi(y_1, y_2)$. Therefore, $d_{off}(x_1^q, x_2^q, x_3, y_3^*)$ corresponds to the offset of the lines that need to be scanned and saved for $(x_1^q, x_2^q)$. To picture out how this works, we can refer to FIG. 20. Each one of the colored squares is a $(x_1^q, x_2^q)$, point, and for each one of these points, there is a set of Bresenham digital lines running out of the plane of the figure along a digital bundle defined by equation $y_2 = my_1 + d_{off}(x_1^q, x_2^q, x_3, y_3^*)$ perpendicular to the depicted ones, but in a 4D space.

Now, the compact light field representation format is defined as follows (see FIG. 22(a)): we first provide the general metadata of the 4D space: boundaries of the 4 axes, and their corresponding sampling. We then provide the number of cameras (bundles). For each camera, we create a block in the table, and we save the following parameters for camera j:

cam$_j$ corresponding to the size of aperture $A_j$;
focusPoint=$(x_3, y_3, z_3)$;
lowest cam$_j$ intercept in $(x_1, x_2)$, noted $d_j$;
m$_j$ which correspond to cam$_j$ steepness;
$l_j^x$ which corresponds to the number of digital lines in $(x_1, x_2)$ for cam$_j$;
$l_j^y$ which corresponds to the number of digital lines in $(y_1, y_2)$ for cam$_j$.

Then on this camera, for each $(x_1^q, x_2^q)$, we start scanning $(y_1, y_2)$. with respect to equation $y_2 = my_1 + d_{off}(x_1^q, x_2^q, x_3, y_3^*)$ using the Bresenham digital lines, and we save the RGB values. In particular, $y_3^*$ is changed from $y_3^* - A$ to $y_3^* + A$, and the corresponding $d_{off}$ is calculated according to $mx_1^q + k(x_3 + y_3^*) - x_2^q$. The same calculations are performed in decoding step using the stored metadata. In particular, k is found by determining $$\frac{d_{max_x} - d_{min_x}}{2A}.$$

Hence, the format remains compact. We do not need to store four indexes for each ray in the system. Besides, note that we assume that the aperture size is known and the same for all the cameras. We however propose to save it for each camera to keep the format general.

It shall be noticed that the sampling of the hyper-plane above is the sampling of the 4D ray-space and we are sure not to miss a single $x_1$ $y_1$, $x_2$, $y_2$ location.

This is only an example of a systematic scanning of the 4D ray-space for saving all data into a very compact form. There could be other schemes of course. The parametric form seems to be adapted to explore the hyper-plane because it permits an inter-leaved space exploration.

Case of Multi-Cameras

To work on data that contain several bundles of hyper-planes (several maxima in the Radon transform due to multiple cameras), we can use a greedy algorithm. As a pre-processing step, the parameters (m, k) are found for all the peaks in the radon transform on $\Pi(x_1, x_2)$, and put in one set. The same is done for the peaks in $(y_1, y_2)$ and the parameters are put in another set. Now in each iteration of the greedy algorithm, the maximum peak intensity is found in the 2D radon transform of $(x_1, x_2)$, and the corresponding peak in $(y_1, y_2)$, is found by matching the previously found parameters (m, k). After saving the data as mentioned in the last section, these peaks are cleaned from the radon transforms, and the next iteration is started, until nothing meaningful remains in the light field.

Figure 22C:
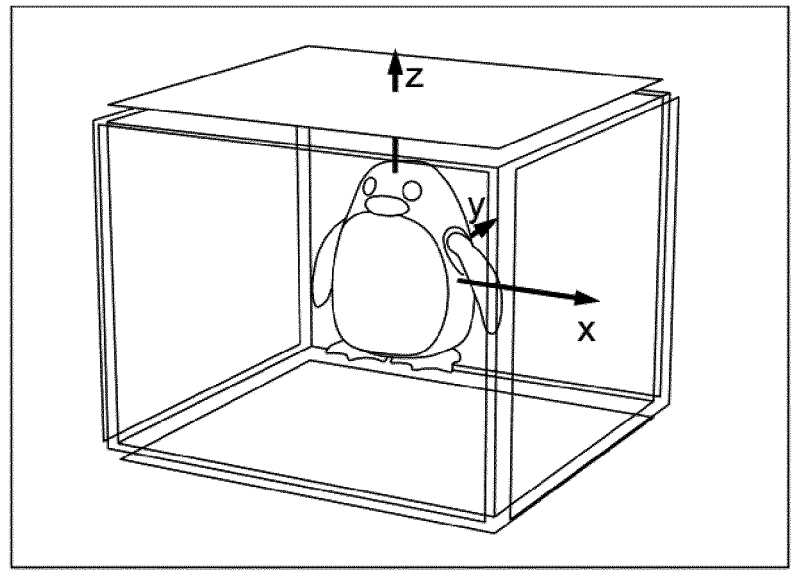
FIG. 22(*a*) is another example of a representation of light field rays according to an embodiment of the disclosure.
Figure 22D:
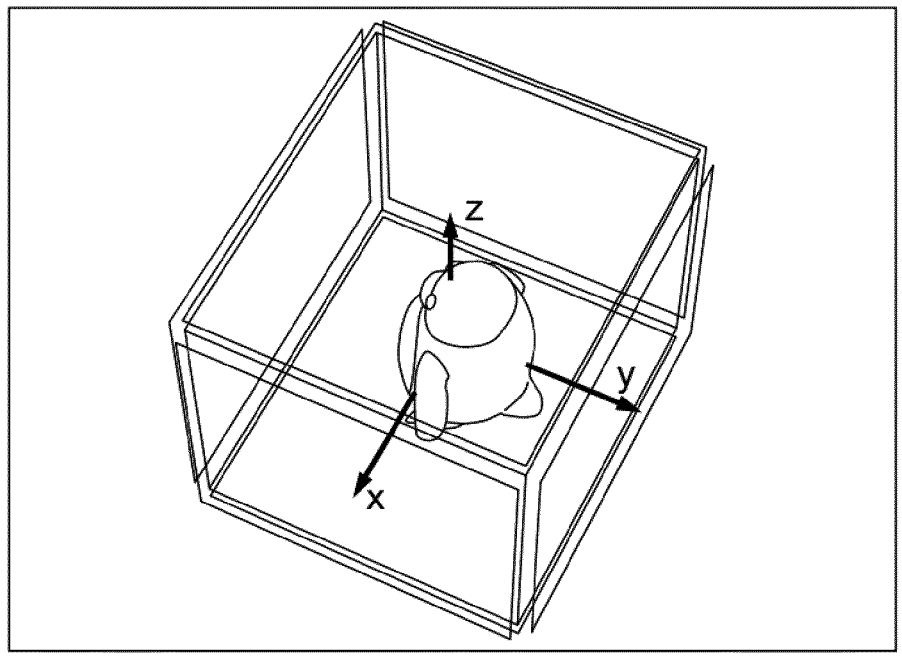

It should be noted that the context in FIG. 22(a) is limited to one light slab. However, it can be generalized to the context when six light slabs are used. The FIGS. 22(c) and 22(d) depict an object (the penguin) that could be enclosed into a double box whose sides are used to build light slabs to parameterize the emitted light field capture by some randomly distributed cameras placed outside of the double box/cube. Hence, the file format of FIG. 22(a) can be extended to hold tags for six light slabs. +z has already been assumed previously, but one can add −z, +x, −x, −y, +y to have a complete parametrization of the whole light field.

Each one of the six orientations gets then assigned a coordinate system for referencing the parametrization planes. Let us assume that we want to parametrize the direction $w \in \{-z, +z, +x, -x, -y, +y\}$. This direction gets assigned the coordinate system $(\vec{e}_1, \vec{e}_2, \vec{e}_3)$ with components (u, v, w). The planes are set at $w_1$ and $w_2$ and their dimensions are $u_{min}$, $u_{max}$ and $v_{min}$, $v_{max}$. The 4D ray space will have components within $u_1, u_2, v_1, v_2$.

The FIG. 22(b) presents the generalization of the Format in FIG. 22(a). The FIG. 22(b) presents only two light slab, but in general, depending of the application and on the scene also, there can be any number of section between one and six included. The value one would be the format for a light field propagation only in one direction, and the value of six would be for a light field propagation in all directions. It should be noted that the planes used to parametrize the light field are not necessary faces of the cube/box, and each one of the plane does not need to have a limitation of its size so as to build up a convex cube.

Figure 26A:
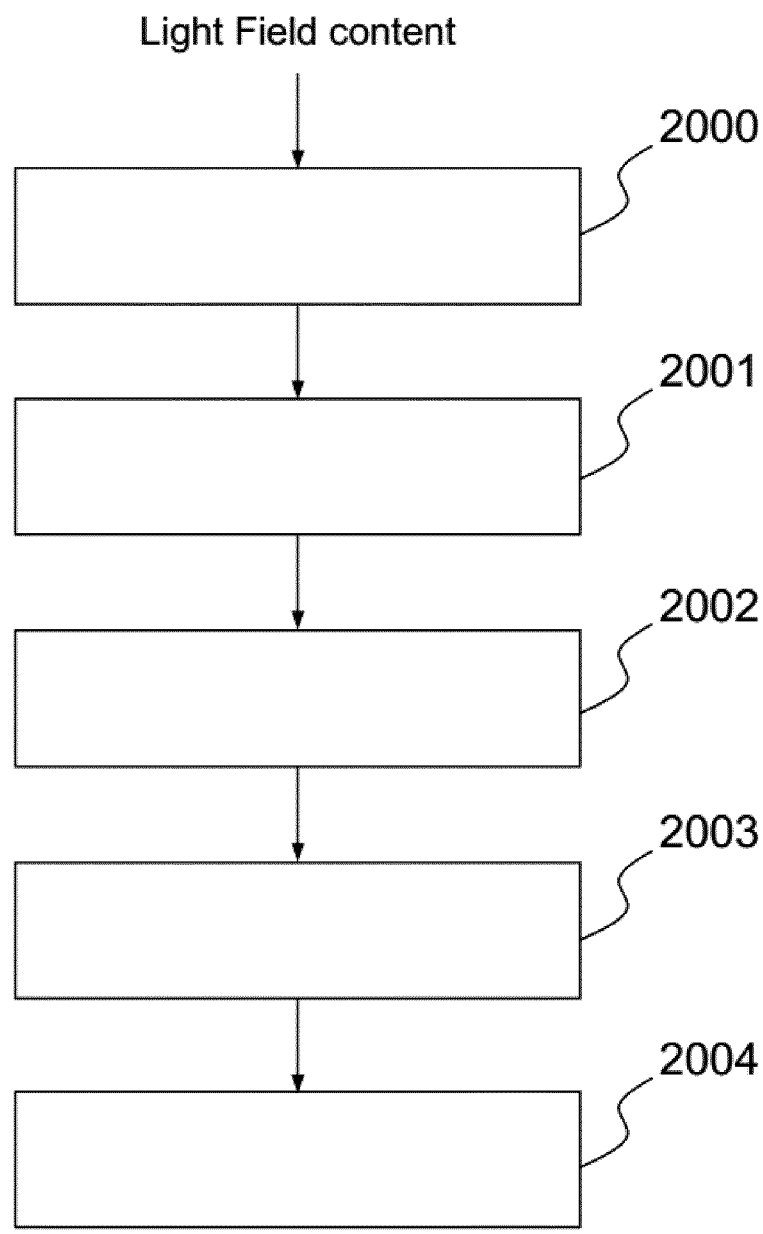
FIG. 26(*a*) presents some steps of a method for providing a compact light field representation according to an embodiment of the disclosure.

FIG. 26(a) presents some steps of a method for providing a compact light field representation.

In one embodiment of the disclosure, a light field content is provided to an electronic device. Such light field content can be for example 4D light-field data as detailed previously or a two planes parametrization of light rays.

Figure 26B:
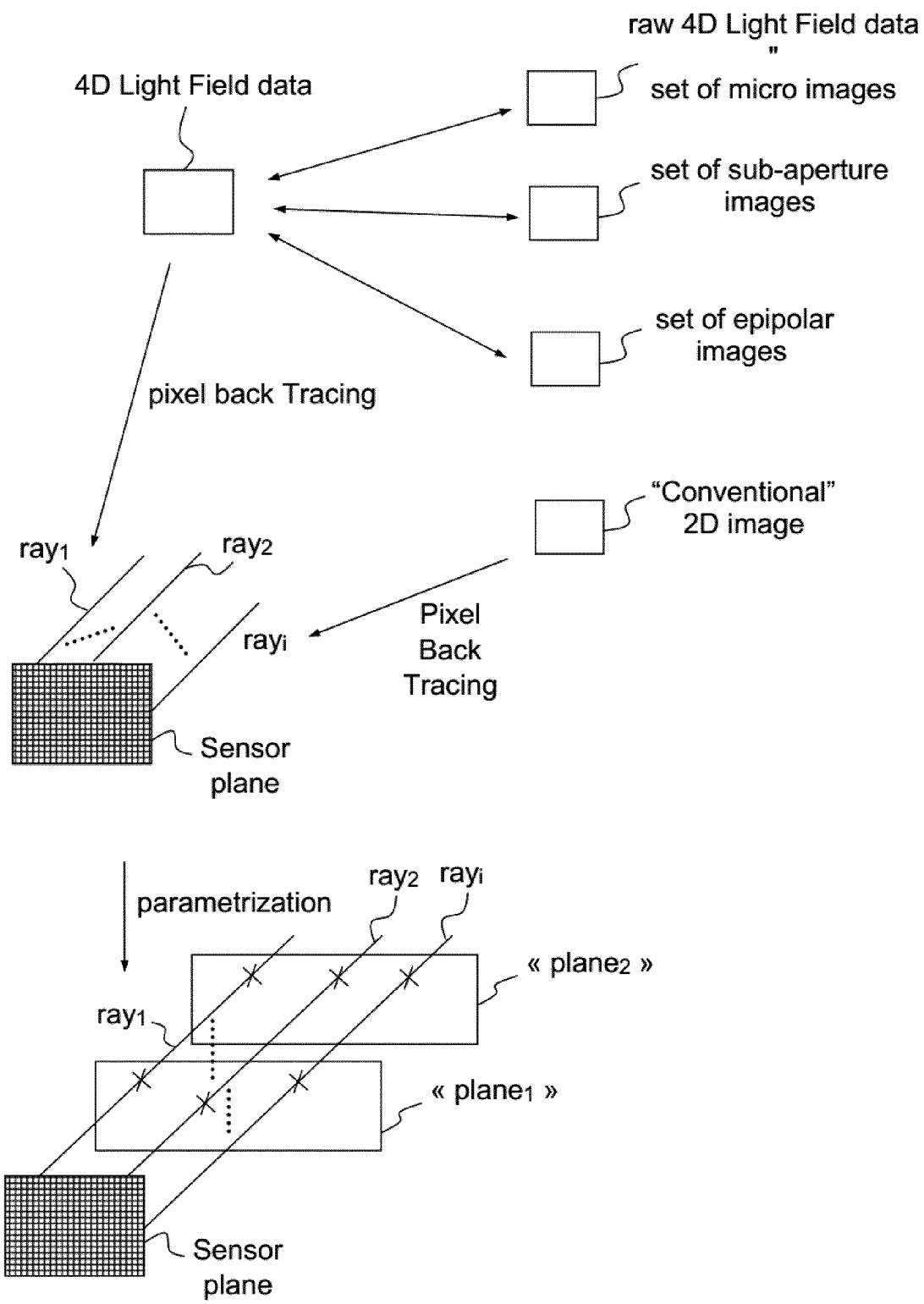
Figure 26C:
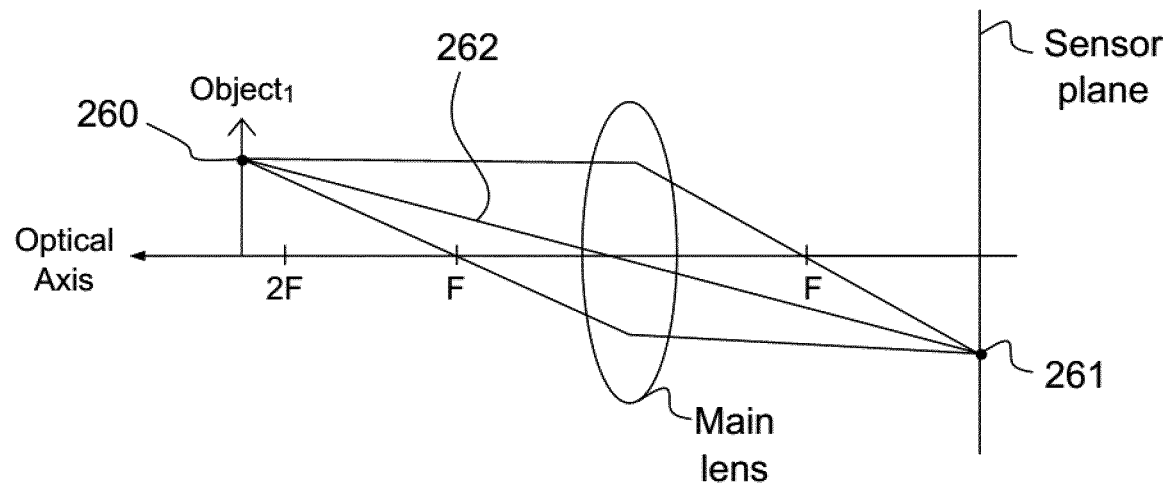

In a step referenced 2000, if the light field content is not represented by the parametrization of light rays via the use of two planes, a parametrization of light rays of the light field content is done via the use of two planes. The FIG. 26(b) presents a synthetic scheme that depicts a conversion from either 4D light-field data or a conventional 2D image into a representation based on the parametrization of light rays via the use of two planes, corresponding to said step 2000.

Then, in a step referenced 2001, projections of light rays on one plane is done (either on the plane 405 or the plane 404, and generation of one 2D ray diagram is done (i.e. the 2D ray diagram $\Pi(x_1, x_2)$ in the case that projection on plane 404 is used, or the 2D ray diagram $\Pi(y_1, y_2)$ in the case that projection on plane 405 is used. Obviously, the generation of said one 2D ray diagram can be obtained directly from the sampling of the two parametrization planes.

In a step referenced 2002, the discrete Radon transform is applied on the 2D ray diagram outputted in step 2001 (i.e. the discrete Radon Transform is applied on either $\Pi(x_1, x_2)$ or on $\Pi(y_1, y_2)$ depending of the output of step 2001) in order to identify some lines of interest in the 2D ray diagram.

In a step referenced 2003, the Bresenham algorithm is used in order to encode the identified lines in the step 2002. It delivers for example for an identified line parameters d and s. In a variant, it only delivers parameters d, and the slope of the identified line. In the case that several identified lines belong to a beam (as explained previously), the slope and the thickness of the beam can be stored.

In a step referenced 2004, the light field content is stored in a compact way. Indeed, as it is possible to associate identified lines in step 2002 with lines in another 2Dray diagram, it is not necessary to store the coordinates in said another 2D ray diagram. Indeed, in the case that the outputted 2D ray diagram in step 2001 corresponds to the 2D ray diagram $\Pi(x_1, x_2)$, as we know that an identified line in $\Pi(x_1, x_2)$ must be associated with a line with the same slope in the 2D ray diagram $\Pi(y_1, y_2)$, and more precisely the following equation stands: $y_2 = my_1 + mx_1^q + k(x_3 + y_3^*) - x_2^q = my_1 + d_{off}(x_1^q, x_2^q, x_3, y_3^*)$, then, for each point on an identified line (i.e. the point with coordinates $x_1^q, x_2^q$, which does not have to be explicitly stored as it belongs to an identified line), a value (i.e. an RGB value) of the corresponding ray light "passing through" a point of the collection of points $(y_1, my_1 + d_{off}(x_1^q, x_2^q, x_3, y_3^*))$ is stored. However, in some case, the corresponding ray light does not exist, and a null value is stored. For example, taking the values in FIG. 19, which presents an identified line, then when an electronic have to store the light field content, the value (i.e. RGB value) of the light ray (or more precisely the projection of such light ray) "passing though" coordinates $x_1 = 0, x_2 = 5, y_1 = 0$, and $y_2 = m.0 + d_{off}(0, 5, x_3, y_3^*)$ will be stored, as well as the value (i.e. RGB value) of the light ray "passing though" $x_1 = 0, x_2 = 5, y_1 = 1$, and $y_2 = m.1 + d_{off}(0, 5, x_3, y_3^*)$, etc. until the value of $y_2$ is out of the boundaries of the planes (for example, the value (i.e. RGB value) of the light ray "passing though" $x_1 = 0, x_2 = 5, y_1 = 15$, and $y_2 = m.15 + d_{off}(0, 5, x_3, y_3^*)$, is not stored as it is out of the boundaries of the plane. Then, the value (i.e. RGB value) of the light ray "passing though" coordinates $x_1 = 1, x_2 = 6, y_1 = 0$, and $y_2 = m.0 + d_{off}(1, 6, x_3, y_3^*)$ will be stored, as well as the value (i.e. RGB value) of the light ray "passing though" $x_1 = 1, x_2 = 6, y_1 = 1$, and $y_2 = m.1 + d_{off}(1, 6, x_3, y_3^*)$, etc. until the value of $y_2$ is out of the boundaries of the planes. The same process is repeated for each point on the identified line (i.e. until the processing of point $x_1 = 15, x_2 = 13$). The light field is encoded in this compact when all the point belonging to lines identified in step 2002 have been handled.

The FIG. 26(*b*) presents a synthetic scheme that depicts a conversion from either 4D light-field data or a conventional 2D image into a representation based on the parametrization of light rays via the use of two planes.

In one embodiment, it should be noted that it is possible to obtain from a conventional camera (i.e. from a conventional 2D image comprising a set of pixels), a set of light rays that correspond to a rough/average light field representation via a pixel back tracing operation.

In one embodiment of the disclosure, inputted 4D light-field data (obtained via a plenoptic camera or a camera array for example) comprise a set of pixels from which a collection of rays can be extracted. In order to extract such collection of rays, the method for converting comprises a pixel back tracing method/operation that can convert a pixel into a light ray. Indeed, as it is possible to convert one of the representation of 4D light field data into a set of sub-aperture images (i.e. a set of images from different point of views, taken at a same or close time. Each images can be virtually associated with a pixel sensor), therefore by applying a pixel back tracing on each images comprised in the set of sub-aperture images, a ray representation of the 4D light field data can be obtained.

Once a set of rays has been extracted from the pixels (or virtual pixels), a parametrization operation is executed by an electronic device. Such parametrization operation comprises the use of two planes (obviously, these planes are finite plane) in order to represent a ray as 4 coordinates (i.e. the coordinates of the intersection of a ray with the two planes).

In the following, details related to the pixel back tracing operation from a "conventional" 2D image are given (then this pixel back tracing operation is applied on several (or all) images comprised in the set of sub-aperture images, in order to obtain a ray representation for 4D light field data as explained previously). We will suppose for the sake of simplicity that the center of projection of the camera is at (0, 0, 0), the image plane centered at (0, 0, f). The camera is not rotated; its principal axis is pointing in the Z direction. We also suppose that the pixels are squares so that $m_u = m_v = m$ pixels·meter$^{-1}$. Finally, the image plane is translated by $(t_u, t_v)$ in such a way that the bottom left pixel is at (u=0, v=0). The pixels are addressed by their column indexes pair (i,j). If I is the image position vector in pixels (i,j, 1), then the relation between the pixel and a point P(X, Y, Z) that maps to that pixel through the central projection is:

$$\begin{pmatrix} i \\ j \\ 1 \end{pmatrix} = \begin{pmatrix} mf & 0 & mt_u \\ 0 & mf & mt_v \\ 0 & 0 & 1 \end{pmatrix} \cdot \begin{pmatrix} X \\ Y \\ Z \end{pmatrix} \Leftrightarrow I = KP$$

And now, m, f, $t_u$, $t_v$ being known from a calibration step, back tracing the pixel leads simply to:

$$K^{-1}I = P$$

P is a point in 3D space where a ray launched from pixel (i, j). would pass through. So we have one position, P, getting the direction is a matter of evidence, since that ray also passes through (0, 0, 0), the direction is the vector P(X, Y, Z).

This example illustrates how to back-trace a pixel, or in other words, how to go from pixels to a light-field.

In the case of processing of 4D light-field data, a multi-camera model can be used (i.e. to each of the sub-aperture images is associated a camera).

The parameterization is the process of identifying uniquely each ray with some tags. As a ray passes through a position and has a direction, the most straightforward parameterization would be a set of 6 real numbers (x, y, z, u, v, w) mixing spatial and directional coordinates. For the sake of simplicity we will adopt here a two plane parameterization already discussed previously. The question which is very often asked is where to put those planes with respect to the acquisition system. Often in the literature, in particular for plenoptic cameras, for some calculation convenience, one is placed at the sensor, another one on the lenslets array or main lens. Those positions should be avoided, because micro-lenses have a thickness, so where exactly shall we put one of the planes? Main lenses have a very complicated lens prescription which is unknown. So in one embodiment, a solution is to put the planes outside of the acquisition system.

Let us assume we have one plane at $z=z_1$ and another one at $z=z_2$ with $z_2>z_1$. we can find the parameters for a ray which has been back-traced from pixel (i, j) as:

$$\begin{pmatrix} x_1 \\ y_1 \\ z_1 \end{pmatrix} = \begin{pmatrix} mf & 0 & mt_u \\ 0 & mf & mt_v \\ 0 & 0 & 1 \end{pmatrix}^{-1} \cdot \begin{pmatrix} i \\ j \\ 1 \end{pmatrix}$$

Once the system of equations is written, the two first lines have to be divided by $z_1$ as it is the rule for homogenous coordinates.

The second set of parameters which come from the intersection with the second plane can also be written as:

$$\begin{pmatrix} x_2 \\ y_2 \\ z_2 \end{pmatrix} = \begin{pmatrix} mf & 0 & mt_u \\ 0 & mf & mt_v \\ 0 & 0 & 1 \end{pmatrix}^{-1} \cdot \begin{pmatrix} i \\ j \\ 1 \end{pmatrix}$$

As the couple $(z_1, z_2)$ is known, we can see from the previous derivations that the ray can be uniquely described by the 4-uplet $(x_1, x_2, y_1, y_2) \in \mathbb{R}^4$. In addition, the ray is assigned with a RGB value. So to represent the ray in this parameterization, we need 4 floats and 3 bytes, a total of 19 bytes (but we have not sampled the ray space so far)! In the image based format, the elemental data is represented by 2 floats and 3 bytes only. So we can see that this parameterization adds a lot of data to the content and in general, the light-field being a four dimensional data set, it needs an amount of storage which is not manageable as it is.

Figure 26D:
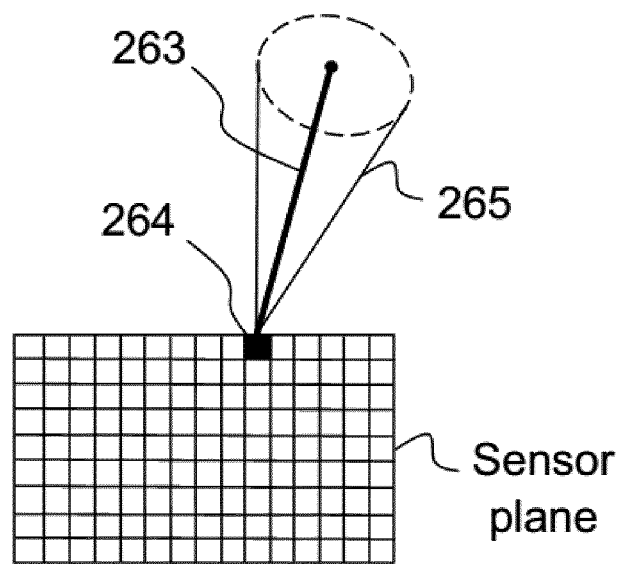

The FIG. 26 (c) and FIG. 26(d) present how a ray is "extracted" from a pixel (or virtual pixel) sensor. Indeed, from a pixel (or virtual pixel) referenced 261 or 264, a chief ray (referenced 262 or 263) can be obtained (being the ray passing through the peak of a cone (the cone being referenced 265) at the pixel location, to the center of the basis of the cone (the base being defined as a function of the size of the main lens of the camera).

It should be noted that, missing data or pixel cross-talk can still occur when using the method described in FIG. 26(a) in the case that the sampling of the two planes used for the parametrization is too broad. In one embodiment of the disclosure, details related to a technique for sampling the parametrization planes are described in the following. Such technique enables the filling of data in the light-field format described in FIGS. 21 and 22 in such way that the sampling avoids missing data or pixel cross-talk.

Figure 27A:
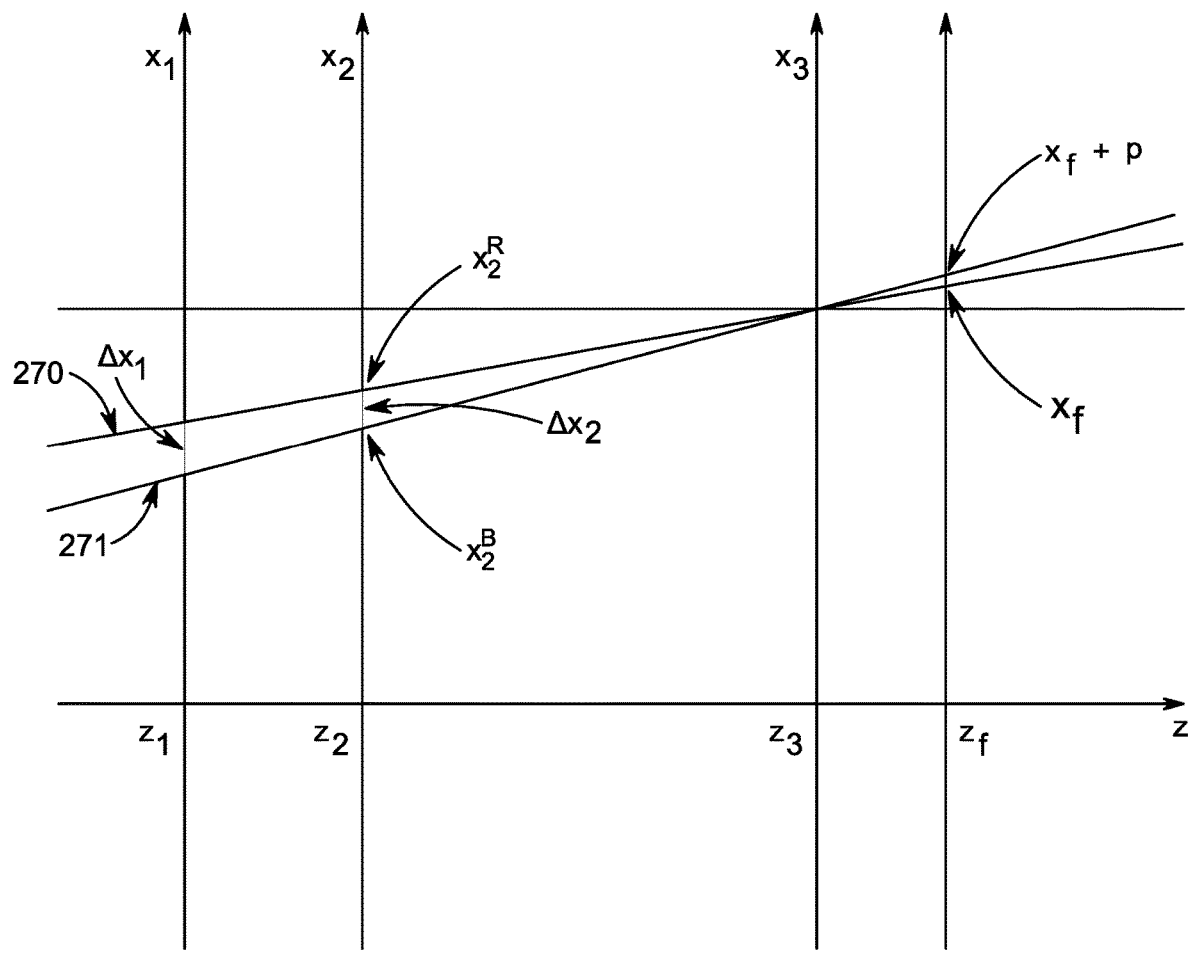
FIG. 27(*a*) presents parameters used to derive sampling steps of the method according to one embodiment of the invention.

FIG. 27(a) presents parameters used to derive sampling steps of the method according to one embodiment of the disclosure. The view in FIG. 27(a) correspond to a projection on a plane P. It should be noted that such plane is the same as $\Pi(x_1, x_3)$, or $\Pi(x_2, x_3)$, and so on.

Figure 27B:
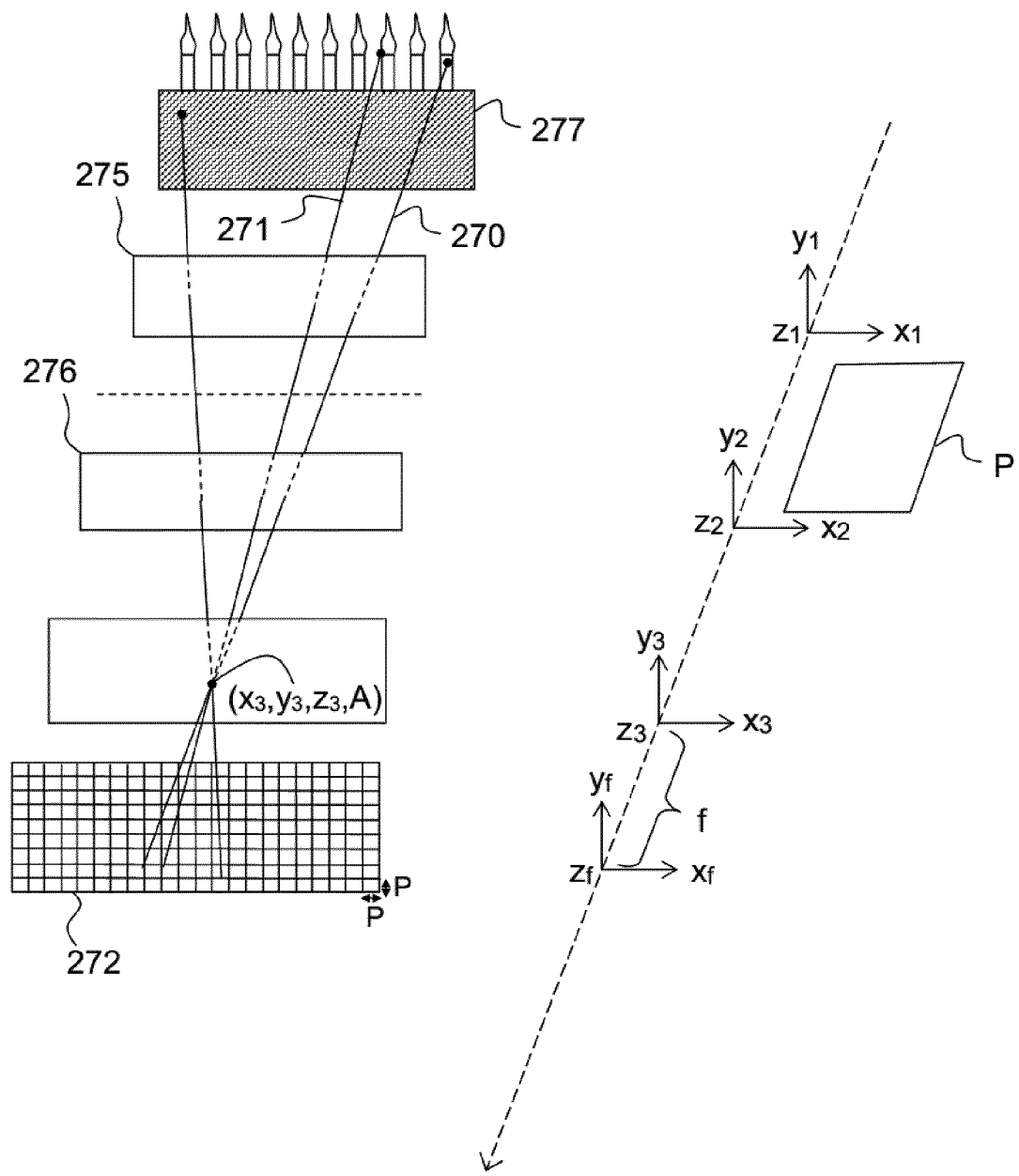

FIG. 27(b) corresponds to a 3D representation of the FIG. 17 with some additional elements.

More precisely, let us suppose that we have one camera to begin with, and let us restrict the analysis to a 2D slice without any loss of generality. The center of projection of the camera of focal length f is at coordinates $(x_3, y_3, z_3)$ and we have a pixel array at depth $z_f$ which is such that $z_f-z_3=f$. The pixel pitch is p. Indeed, the pixel array, (also named a pixel sensor) referenced 272, comprising pixels elements, each element having a surface equal to $p^2$.

A birthday cake with candles, referenced 277, represents an object in the object space (i.e. a real scene) from which rays are emitted and they go through the center of projection of a camera, also named a camera for simplification, positioned at coordinates $(x_3, y_3, z_3)$ in 3D space. Such camera has an aperture noted A (that is a circle of radius r).

From equivalent triangles and from FIG. 27(a), we can establish the following equation:

$$\frac{x_f - x_3}{z_f - z_3} = \frac{x_2 - x_3}{z_2 - z_3}$$

which leads for the light ray, referenced 270 in FIG. 27(a) to a position on $\Pi_2$:

$$x_2^R = \frac{z_2 - z_3}{z_f - z_3} x_f + \frac{z_f - z_2}{z_f - z_3} x_3$$

The same can be written for an adjacent pixel, the light ray, referenced 271, from the FIG. 27(a):

$$x_2^B = \frac{z_2 - z_3}{z_f - z_3}(x_f + p) + \frac{z_f - z_2}{z_f - z_3} x_3$$

If we set that $z_f-z_3=f$, and we want that that each pixel from the pixel sensor 272 receives one ray and this ray is uniquely parameterized by both planes, then the largest sampling interval on $x_2$ (and/or $x_1$) is $\Delta x_2 = |x_2^R - x_2^B|$ (respectively $\Delta x_1 = |x_1^R - x_1^B|$)

should be bounded as follows:

$$\Delta x_2 \leq \frac{z_3 - z_2}{f} p$$
$$\Delta x_1 \leq \frac{z_3 - z_1}{f} p$$

The same holds for y sampling steps if we do not restrict the analysis to a 2D slice.

Hence, the following equations also stand:

$$\Delta y_2 \leq \frac{z_3 - z_2}{f} p$$
$$\Delta y_1 \leq \frac{z_3 - z_1}{f} p$$

In such embodiment, the two planes $(x_1, y_1)$ and $(x_2, y_2)$ are globally chosen outside and common to all cameras that acquire the scene with the birthday cake 277. The plane $(x_3, y_3)$ is positioned on the aperture of each camera.

Figure 27C:
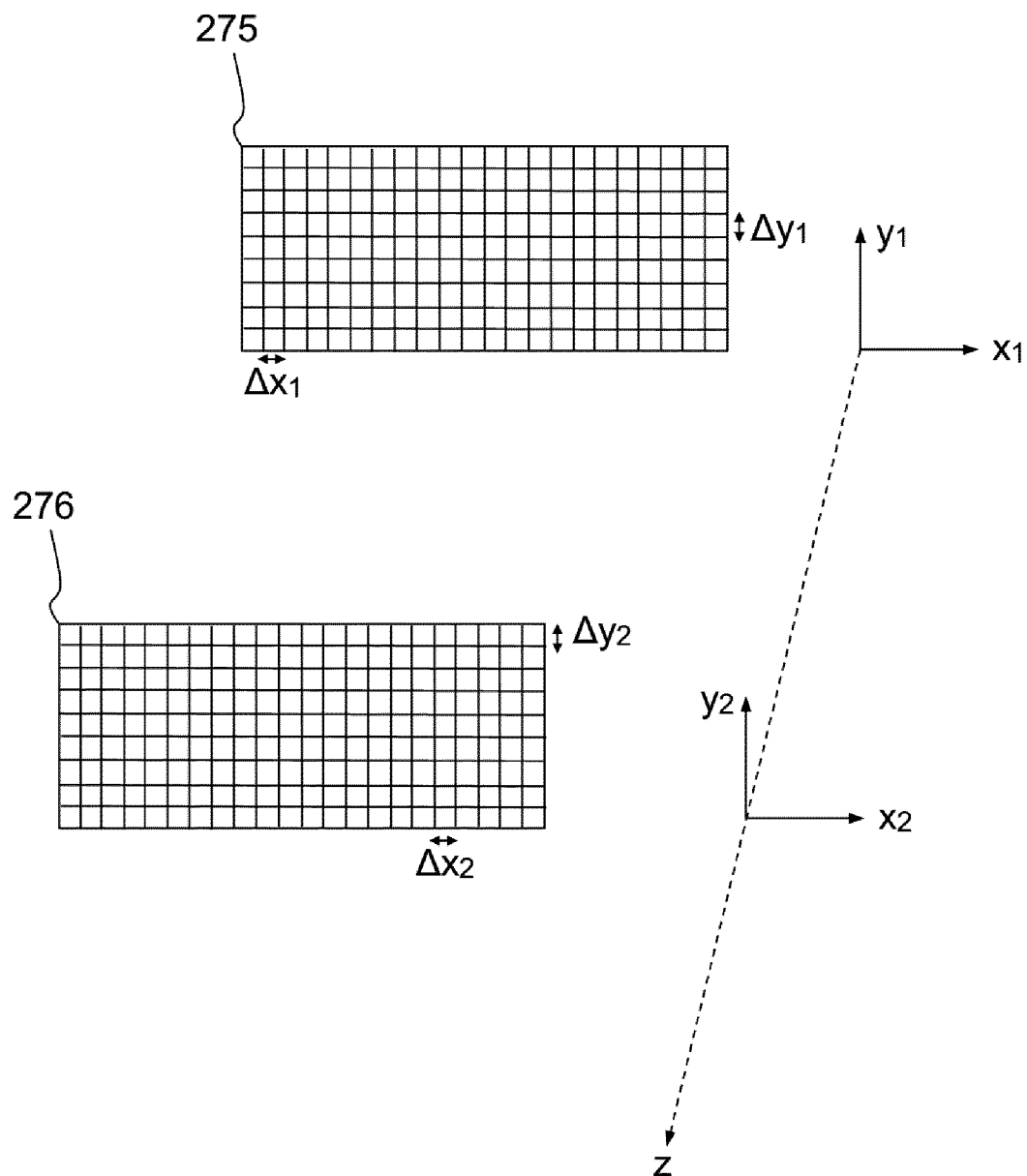

The FIG. 27(c) presents a discretization of the planes used to perform the parametrization of the light field. In order to have only one light ray on a pixel sensor in the configuration detailed in the FIGS. 27(a) and 27(b), it is necessary that the discretized planes referenced 275 and 276 fulfill the restriction mentioned previously.

For example, the pixel pitch can be equal to 4 µm (full frame camera), the parameter f=50 mm, the values $z_3-z_2=5$ m and $z_3-z_1=6$ m. If the sensor comprises 6000×4000 pixels, the discretized planes comprises 6000 cells (in the plane $x_1$, $x_2$) and 4000 cells (in the plane $y_1$, $y_2$).

Now, we assume that we have multiple cameras with their center of projection at $(x_3^i, z_3^i)$, focal length f', and pixel pitch $p^i$, then the largest sampling steps on both planes which ensure that each ray will be uniquely mapped into the light field ray file format are:

$$\Delta x_2 \leq \min \frac{z_3^i - z_2}{f^i} p^i$$

$$\Delta x_1 \leq \min \frac{z_3^i - z_1}{f^i} p^i$$

And the same set of equations holds for the y dimension if we do not restrict the analysis to a 2D slice. The sampling interval on the parameterization planes can be smaller than that. The only effect will be a lack of storage efficiency, but it shall never be bigger than those values.

It should be noted that the present technique can also be used to estimate the intensity at the center of projection at coordinates $x_3$, $y_3$, $z_3$ associated with a radius A.

Such estimation of intensity can be done by an electronic device that perform the summing of the corresponding regions on the radon transform of $x_1$, $x_2$ plane and the one of $y_1$, $y_2$ plane. In particular, the intensities that are captured between $d_{max_x}$ and $d_{min_x}$ are summed up to provide one approximation of the intensity on the plane $\Pi(x_1, x_2)$. The same is done to obtain the results for $\Pi(x_1, y_2)$, and finally the two values are summed to get the final approximation of the intensity at the center of projection. It should be noted that this technique only gives an approximation of the light intensity at the center of projection and shall be used only when the relative intensities between the centers of projection are of interest.

In one embodiment of the disclosure, the two planes $(x_1, y_1)$ and $(x_2, y_2)$ are globally chosen outside and common to all the cameras, and the plane $(x_3, y_3)$ is positioned on the aperture of each camera and $z_1$, $z_2$ and $z_3$ are defined to be positive. In that case, bigger values of m (in the previously mentioned equation $y_2 = my_1 + d_{off}(x_1^q, x_2^q, x_3, y_3^*))$ imply bigger values of $z_3$ $$\left(\text{note that } m = \frac{z_3 - z_2}{z_3 - z_1}\right).$$

Having two bundles with two different values $m_1$ and $m_2$, if $m_1 > m_2$, it can be deduced that the first bundle is occluded in certain coordinates by the second line. Therefore, the ray intensities for the corresponding coordinates on the first bundle are unknown.

Figure 28:
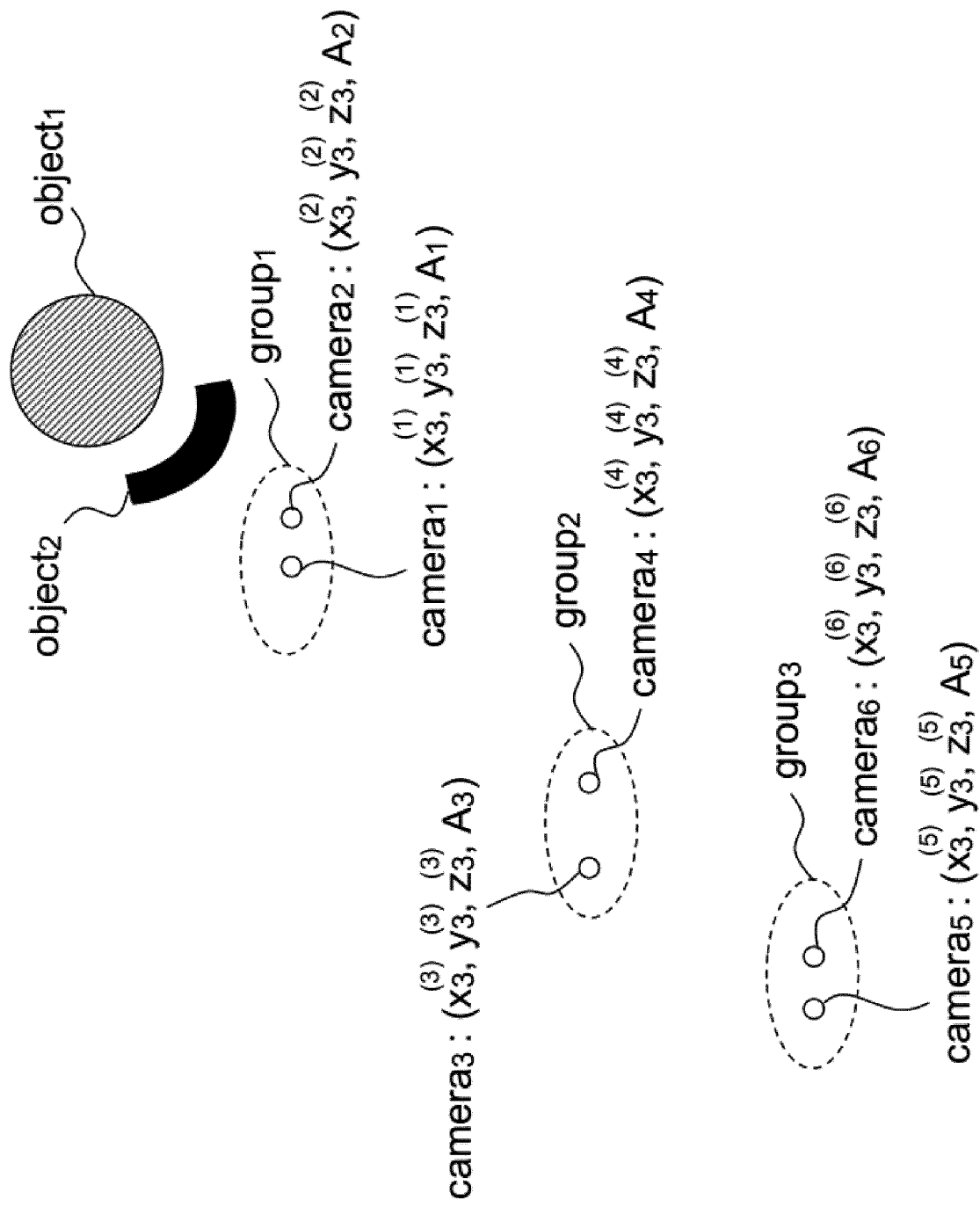
FIG. 28 presents a scene (comprising two objects) from which images are obtained by the use of cameras according to one embodiment of the disclosure. More precisely, the images are obtained from three groups of two cameras.

The method described in FIG. 26(a) enables the obtaining of a light field content coded in an efficient way (i.e. the storage size of such light field content is compact). However, it should be noted that in a real scene, some occlusions can occur as depicted in FIG. 28. The proposed formats described in FIGS. 21 and 22 do not address the problem of having occlusions in the scene, meaning that the information of the occluding parts of the scene are also stored.

The use of a particular or additional features can overcome this issue, and enables the obtaining of a more efficient encoded light field content. FIG. 28 presents a scene (comprising two objects) from which images are obtained by the use of cameras. More precisely, the images are obtained from three groups of two cameras.

It should be noted that a group of camera is defined as a set of camera which are in the same depth plane.

The first group comprises a first camera and a second camera which have respectively the Cartesian coordinates values $(x_3^{(1)}, y_3^{(1)}, z_3^{(1)})$ and $(x_3^{(2)}, y_3^{(2)}, z_3^{(2)})$, with $z_3^{(1)} = z_3^{(2)}$. The first camera is also associated with an aperture value $A_1$, and the second camera is associated with an aperture value $A_2$.

The second group comprises a third camera and a fourth camera which have respectively the Cartesian coordinates values $(x_3^{(3)}, y_3^{(3)}, z_3^{(3)})$ and $(x_3^{(4)}, y_3^{(4)}, z_3^{(4)})$ with $z_3^{(3)} = z_3^{(4)}$. The third camera is also associated with an aperture value $A_3$, and the fourth camera is associated with an aperture value $A_4$.

The third group comprises a fifth camera and a sixth camera which have respectively the Cartesian coordinates values $(x_3^{(5)}, y_3^{(5)}, z_3^{(5)})$ and $(x_3^{(6)}, y_3^{(6)}, z_3^{(6)})$ with $z_3^{(5)} = z_3^{(6)}$. The fifth camera is also associated with an aperture value $A_5$, and the sixth camera is associated with an aperture value $A_6$.

FIG. 28 presents a configuration in which some occlusions between the camera occur. For example, the fourth camera cannot capture all the rays from the objects in its view field for the scene due to the fact that some rays are blocked by either the first camera or the second camera.

Figure 29:
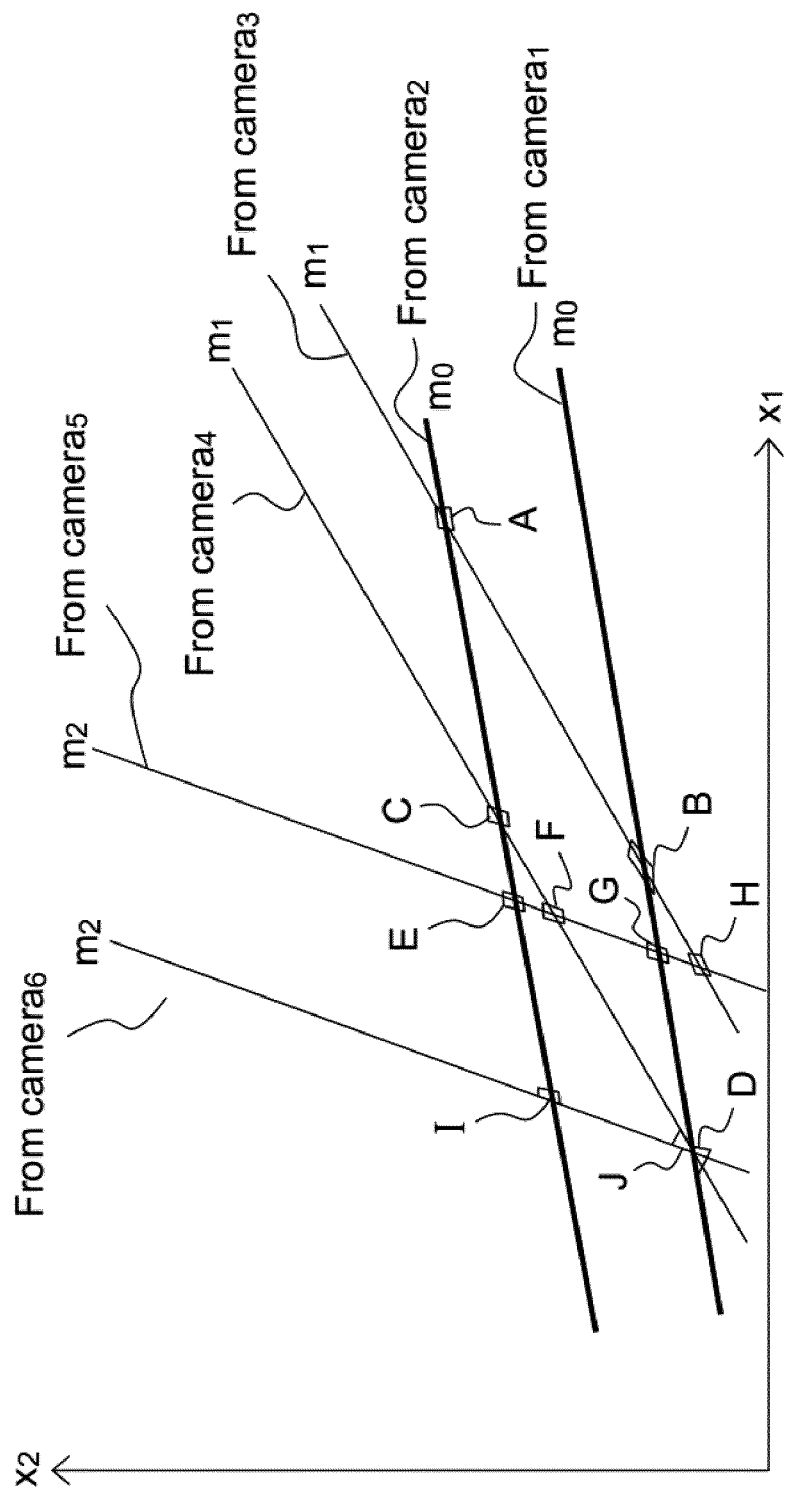
FIG. 29 presents a 2D ray diagram of three groups of two cameras, according to one embodiment of the disclosure.

FIG. 29 presents a 2D ray diagram of three groups of two cameras.

As the thickness of the line in the 2D ray diagram associated with the first camera is thicker than the other, the value of the aperture of first camera (i.e. the value of $A_1$.) is greater than the values of other apertures from other cameras.

Occlusions mentioned previously in the FIG. 28 can be represented by intersection in a 2D ray diagram. For example, the set referenced A in FIG. 29 corresponds to the set of points that belong to the lines associated with the second camera and the third camera. The present technique details a solution for storing the points in the 2D ray diagram (a point being associated with a ray) that correspond to intersection points of two (or more) lines.

Figure 30:
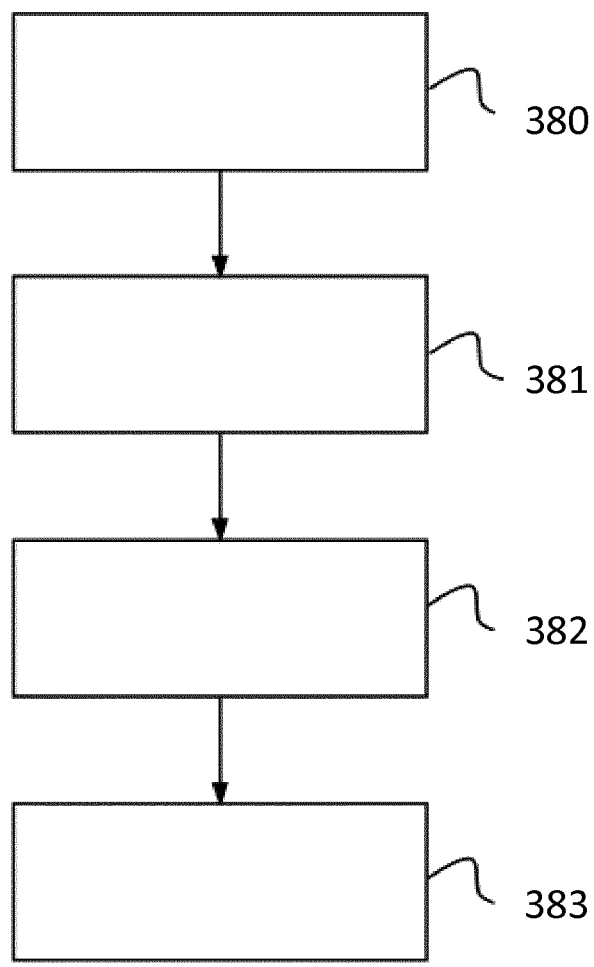
FIG. 30 depicts a method for handling the occlusions in a light field content, according to one embodiment of the disclosure.

FIG. 30 depicts a method for handling the occlusions in a light field content. More precisely, this method takes as input ray lights of a light field represented in two 2D ray diagram $\Pi(x_1, x_2)$ and $\Pi(y_1, y_2)$ as defined previously.

In a step referenced 380, considered as a pre-processing step, the parameters (m, k) of each lines identified, by the application of a discrete Radon Transform on the inputted 2D ray diagram $\Pi(x_1, x_2)$, are stored on a first set $\Omega_1$. Then, the parameters (m, k) of each lines identified, by the application of a discrete Radon Transform on the inputted 2D ray diagram $\Pi(y_1, y_2)$, are stored on a second set $\Omega_2$.

In a step referenced 381, the first set $\Omega_1$ is sorted according to the parameter m.

In a step referenced 382, the bundles having the smallest m value are fully captured and therefore fully stored in the way depicted in FIG. 22(a).

Then, in a step referenced 383, the following steps are iterated on the first set $\Omega_1$:

We consider the next smallest slope $m_n$ and find the intersection of the rays in this bundle with all of the rays of the bundles with smaller slope than $m_n$; Such set of bundles is noted is $\omega_{inf} \subset \Omega_1$;

For each line i of this bundle, we have the slope $m_i = m_n$, and the line formula in $\Pi(x_1, x_2)$ is written as follows:

$$x_2 = m_i x_1 + d_i$$

where $d_i$ is bounded by $d_{min_x}$ and $d_{max_x}$ of the corresponding bundle. Now we consider all lines j with slopes $m_m < m_i$ belonging to the bundles of $\omega_{inf}$. We find all the intersection point $(x_1^*, x_2^*)$ between i and j though the following:

$$\begin{cases} x_1^* = \dfrac{d_j - d_i}{m_i - m_j} \\ x_2^* = m_i \dfrac{d_j - d_i}{m_i - m_j} + d_i \end{cases}$$

These intersection points on line i are occluded by lines j. Therefore, when we store the values of line i in the FIG. 22(*a*), we should store Null or UnKnown for these $(x_1^*, x_2^*)$;

At last, in a cleaning step, we clean the corresponding intensity peaks from the 2D radon transform of $\Pi(x_1, x_2)$ and $\Pi(y_1, y_2)$, and the next iteration is started, until nothing meaningful remains in the light field.

Therefore, by applying such method to the example depicted in FIG. 28, it appears that all the points belonging to the line with the slope $m_0$ are stored.

Then, the lines with the slope $m_1$ are processed. The points belonging to the set A, B, C and D are not stored.

Then, the lines with the slope $m_2$ are processed. The points belonging to the set E, F, G, H, I and J are not stored.

More precisely, by tacking the example of FIG. 19, if another line with a slope smaller intersects the line of FIG. 19 (for example if points at coordinates $(x_1, x_2)=(5, 8)$, $(x_1, x_2)=(6, 8)$, $(x_1, x_2)=(7, 9)$, $(x_1, x_2)=(8, 9)$, belong the intersection between these two lines, then when processing the points of the line in FIG. 19 as mentioned previously, instead of storing the values of the collection of points $(y_1, my_1 + d_{off}(x_1^q, x_2^q, x_3, y_3^*))$ for the points $(x_1, x_2)=(5, 8)$, $(x_1, x_2)=(6, 8)$, $(x_1, x_2)=(7, 9)$, $(x_1, x_2)=(8, 9)$, an information indicating that no values is available is stored (for example a null value or whatever symbol is stored) for these points.

In another embodiment, in the case that the processed 2D ray diagram is $\Pi(y_1, y_2)$ and not $\Pi(x_1, x_2)$ as previously, the same method can be applied when processing lines in $\Pi(y_1, y_2)$ i.e. the values of the collection of points $(x_1, mx_1 + d_{off}(y_1^q, y_2^q, x_3, y_3^*))$ for the points $(y_1, y_2)$ belonging to an intersection area (with a line having a smaller slope) are not stored (or an indicating information of an occlusion is stored).

In one embodiment of the disclosure, in the case, that for a point with coordinates $x_1^q, x_2^q$ comprised on a identified line in $\Pi(x_1, x_2)$, there isn't a light ray "passing through" a particular point having the form $(y_1, my_1 + d_{off}(x_1^q, x_2^q, x_3, y_3^*))$, then instead of storing an RGB value equal to zero (i.e. 3 byte set up at zero), the proposed technique uses an additional information (for example a bit) for avoiding the storage of three bytes equal to zero. Indeed, such additional information is associated to all the RGB values for representing a light field content. Indeed, in the case that for a point with coordinates $x_1^q, x_2^q$ comprised on an identified line in $\Pi(x_1, x_2)$, there is a light ray passing through a particular point having the form $(y_1, my_1 + d_{off}(x_1^q, x_2^q, x_3, y_3^*))$, then the additional information is set up to one and the RGV value is stored after this additional information. In the case that for a point with coordinates $x_1^q, x_2^q$ comprised on an identified line in $\Pi(x_1, x_2)$, there isn't a light ray "passing through" a particular point having the form $(y'_1, my'_1 + d_{off}(x_1^q, x_2^q, x_3, y_3^*))$, then the additional information is set up to zero and no RGV value is stored after this additional information.

Here is an example of a coded data-line from the 4D sampled ray-diagram:

1 201 180 128 1 002 090 255 0 1 206 025 009 1 201 201 201 0 0 0 1 255 255 255

Which is interpreted as follows:

First data cell contains the RGB value 201 180 128 second data cell contains the RGB value 002 090 255 third data cell does not contain any ray fourth data cell contains the RGB value 206 025 009 fifth data cell contains the RGB value 201 201 201 sixth, seventh and eighth data cell do not contain any ray ninth data cell contains the RGB value 255 255 255.

Moreover, the use of such additional information allow to distinguish between a black pixel and no ray information at all, which is very different. Moreover, as there might be lots of void cells, such technique enables to obtain a more compact encoded light field content.

Figure 31:
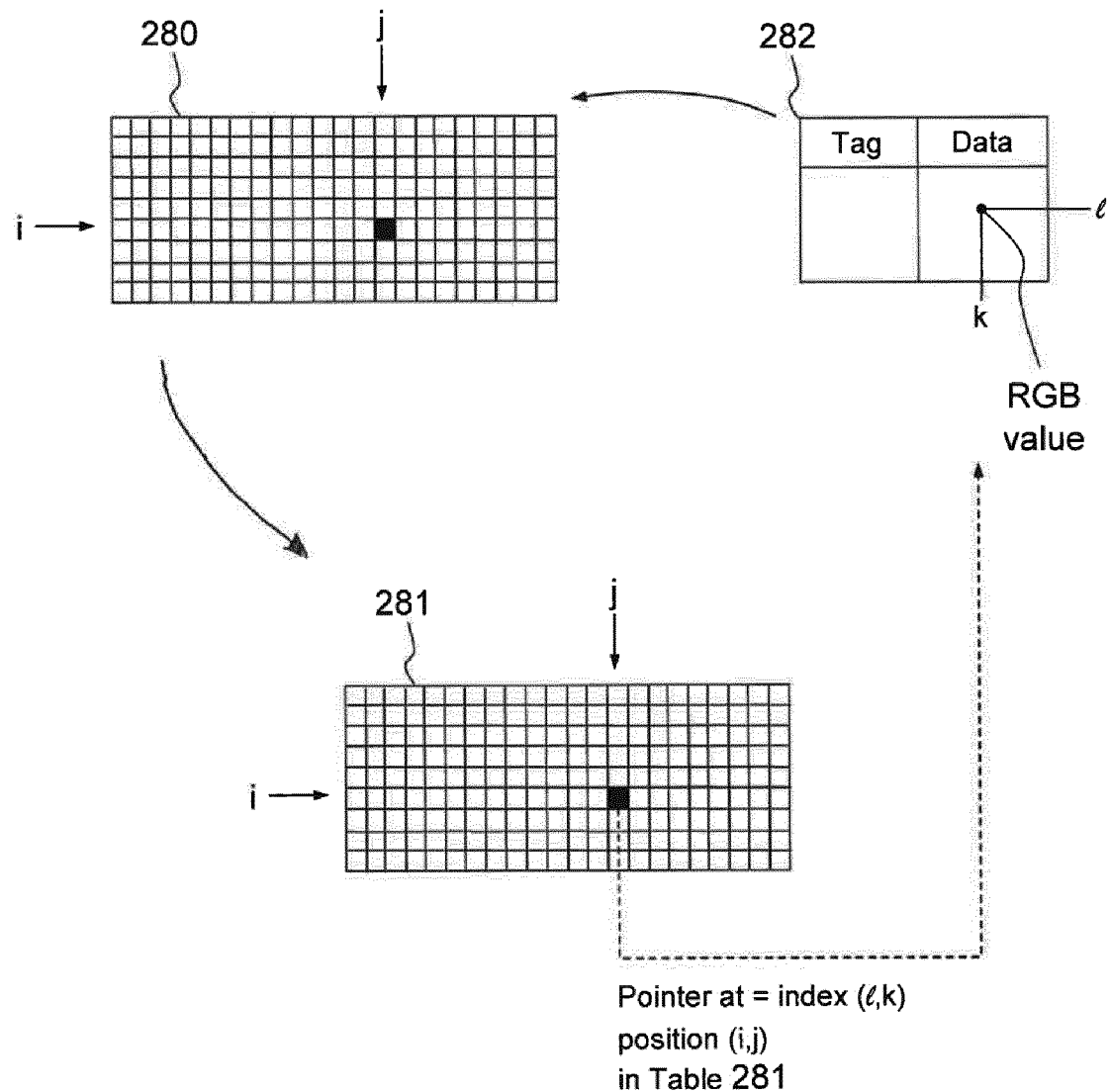
FIG. 31 presents a scheme for obtaining, for an image to be delivered by an electronic device, the values of the pixels of such image from the compact representation of a light field content as for example from the table of FIG. 22(*a*), according to an embodiment of the disclosure.

FIG. 31 presents a scheme for obtaining, for an image to be delivered by an electronic device, the values of the pixels of such image from the compact representation of a light field content as for example from the table of FIG. 22(*a*), according to an embodiment of the disclosure.

In order to fill in the values of pixels of an image, referenced 280, to be delivered comprising m×n pixels, m and n being integer greater than one, from a table that is based on an at least two 2D ray diagrams representation of a light field content, referenced 282 (such as the tables described in FIG. 22(*a*) or FIG. 22(*b*), it is proposed to, according to an embodiment of the disclosure:

obtain a 2-dimensional look-up table, referenced 281, comprising pointers to data in the table 282 (for example the table of FIG. 22(*a*) or FIG. 22(*b*); and obtain, for a pixel addressed by an index (i,j), a radiance value of a light ray from the table of FIG. 22(*a*) or FIG. 22(*b*) via the obtaining of a pointer in said 2-dimensional look-up table positioned at same index (i,j).

Then, such radiance value, located at position (l,k) is inserted in the image 280 to be delivered at pixel at index (i,j).

Such process for filing pixels values into an image is repeated for all the pixels. It enables the avoiding of computations for determining which values to obtain/extract from the table of FIG. 22(*a*) or FIG. 22(*b*).

It should be noted that in order to generate/create the 2-dimensional look-up table used in FIG. 31, an electronic device can perform the pixel back tracing described in FIG. 26(*b*) in order to determine for each pixel from the sensor plane of an acquisition device/camera, the coordinates of the corresponding ray of light. Such ray with such coordinates has its radiance value stored in a table as depicted in FIG. 22(*a*). But, the 4-coordinates are not stored due to the compact storage representation used. Hence, the 2-dimensional look-up table, having the same indexes as the one of images to be delivered, comprises pointers (such as indexes, each index having for example two elements) for locating easily the radiance values in the table as the one depicted in FIG. 22(*a*) for a light ray. The generation of the pointers of such 2-dimensional look-up table can be done in parallel in order to speed up the process.

It should be noted that the use of such 2-dimensional look-up table can speed up the process of generation of images from data represented as in FIG. 22(*a*) or FIG. 22(*b*).

Figure 32:
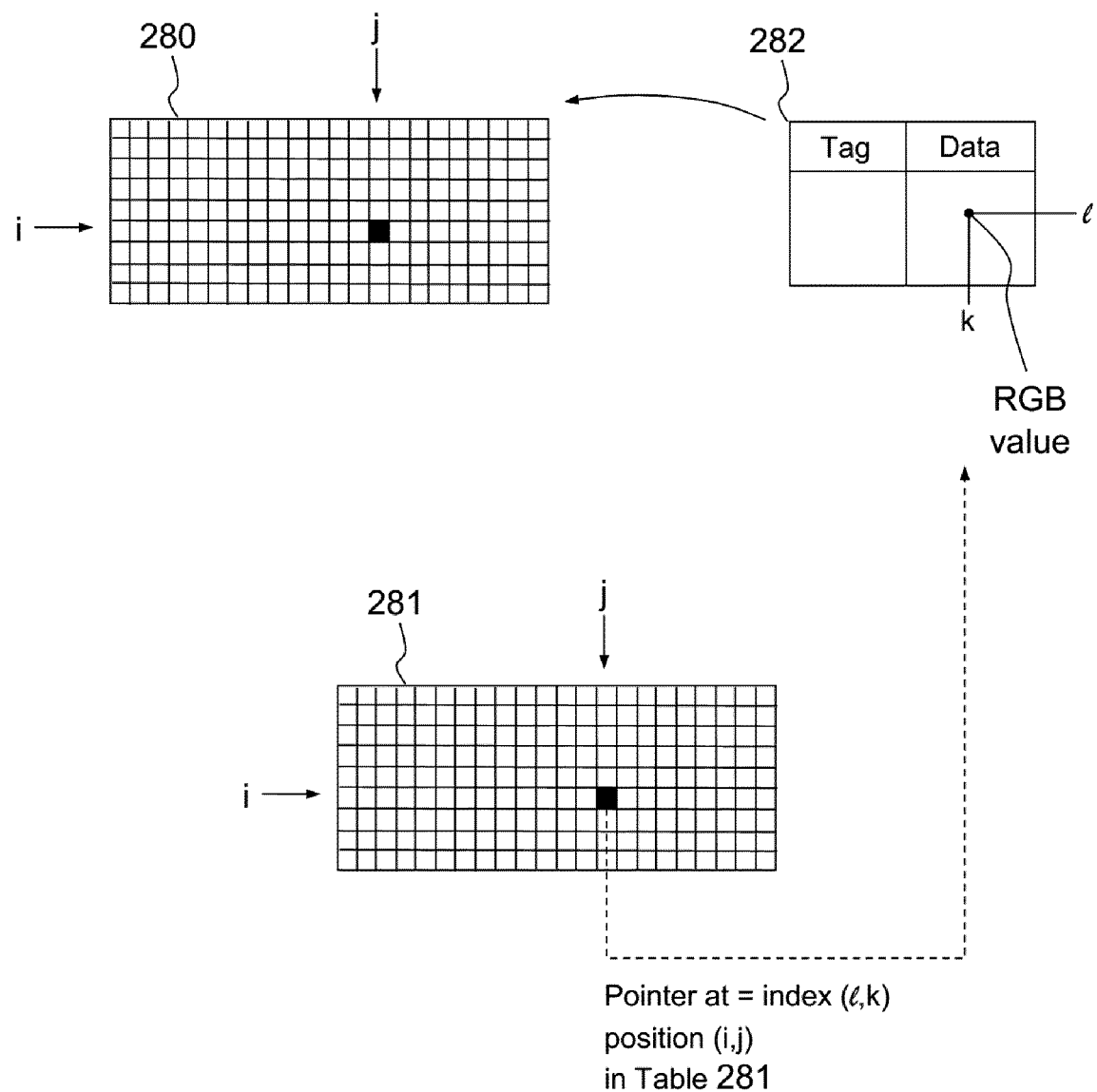
FIG. 32 presents a scheme for generating a compact representation of a light field content as for example the table of FIG. 22(*a*), from an image and a 2-dimensional look-up table.

FIG. 32 presents a scheme for generating a compact representation of a light field content as for example the table of FIG. 22(a), from an image and a 2-dimensional look-up table, according to another embodiment of the disclosure.

More precisely, in order to fill in the radiance values in the table based on an at least two 2D ray diagrams representation of a light field content 282 (such as the tables described in FIG. 22(a) or FIG. 22(b), it is proposed to, according to an embodiment of the disclosure:

obtain a 2-dimensional look-up table, referenced 281, comprising pointers to data position in the table 282 (for example the table of FIG. 22(a) or FIG. 22(b); and obtain, for a pixel addressed by an index (i,j), a radiance value of a light ray from an image 280 comprising m×n pixels, m and n being integer greater than one;

store the obtained radiance value into the table 282 (i.e. the table of FIG. 22(a) or FIG. 22(b)) via the obtaining of a pointer in said 2-dimensional look-up table positioned at same index (i,j). Therefore, the obtained radiance value is stored at position (l,k) in the table 282.

Such process for filing radiance values into a table 282 is repeated for all the pixels of the image 280.

In one embodiment of the disclosure, the radiance values are stored in a parallel process in the table 282.

In another embodiment of the disclosure, it is proposed a way to help the user to navigate through light-fields ray format. This is very tightly linked to the format description defined in previous sections. Maybe there are some ways to navigate in a multi-view capture (which is not a light-field), but what we present here is a way to take advantage of our specific format.

FIG. 22(a) describes a specific compact ray format. In this format, the different cameras are stored in an organized way. Their position is tagged by $x_{3i}$, $y_{3i}$, $z_{3i}$ triplets and we can decide to order $cam_i$ first by depth $z_{3i}$ from nearest to farthest, and then by $x_{3i}$ from bottom to top, and finally $y_{3i}$ also from bottom to top, relative to their axis orientation.

When a light-field is transmitted over a network or aired to an antenna, it can be transmitted only in part to save the bandwidth, so that one point of view only is transmitted. With that point of view, we can also transmit all the $cam_i$ foci.

The viewer can then display onto his display, from a menu button, a 3D screen overlay which visualizes other light-field view-points available in the original format. This can be in the form of a 3D axis system showing in 3D where the other viewpoints are located relative to the actual viewer position.

With a directional pad, the user navigates to the desired position, validates the position, and a feedback is sent over a network to the server. The server then positions the chosen data line which has to be streamed or broadcasted to the end user.

The screen overlay can also vary in aspect and the navigation through the viewpoints.

The file format can be modified to tag rectified camera pairs so that the screen overlay shows up an indication also for stereo content in the case the user wants to watch a stereo content, in which case two slots of digital line data have to be transmitted.

What makes such technique possible in relation to the representation format is the particular light-field analysis. Because we know that hyper-planes which are closer have a smaller m than those which a farther, we can begin to sort the different data line according to the distance. As m is calculated by the discrete Radon transforms as described previously. Also, as mentioned previously, it is possible to compute $x_{3i}$, $y_{3i}$ and, $z_{3i}$ and sort the different data lines in the format according to the sign and modulus of the focus components.

The fact that the data lines are sorted according to their 3D focus position in volume, enables a quick access to the one which is needed for broadcasting. What is broad-casted is a view point, or a pair of viewpoints in the case of stereo, and mathematically, it is one particular bundle of hyper-planes (or a pair thereof), which is a collection of rays stored according to 4D Bresenham scan lines or parametric data scanning.

Figure 33:
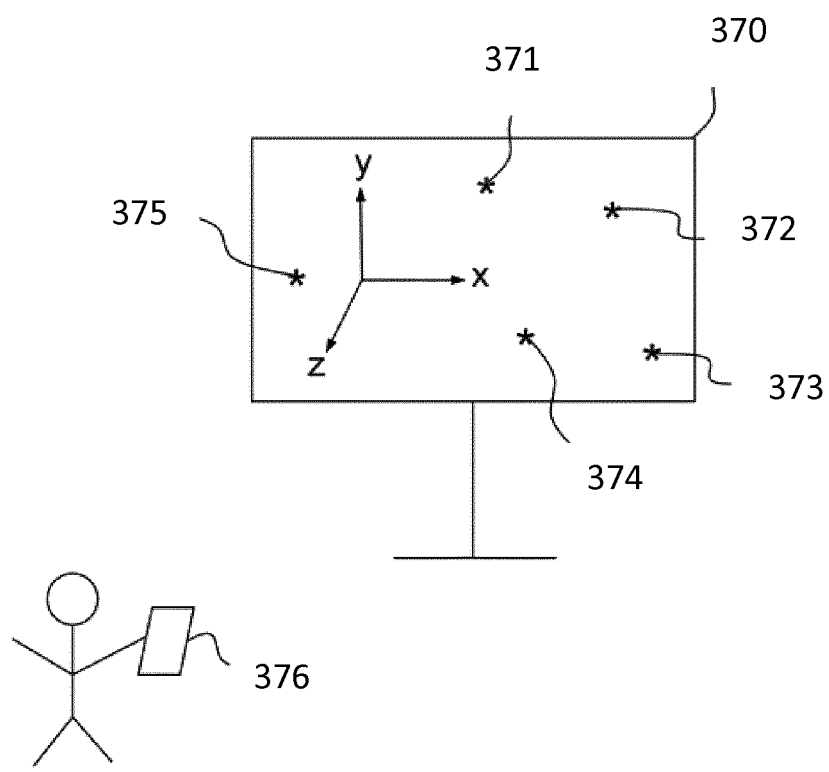
FIG. 33 presents a menu that comprises a 3D representation from which a user can select a position of a camera associated with 4D light-field data, according to an embodiment of the disclosure.

FIG. 33 presents a menu that comprises a 3D representation from which a user can select a position of a camera associated with 4D light-field data.

More precisely, a display device referenced 370 presents to a user the position in a 3D space of several camera (positions referenced 371 to 375 correspond to the positions of several camera).

Then user via a remote control unit referenced 376 can select one of these position. Once the selection has been done, 4D light field data associated with the selected camera are obtained by said display device. Then, the display device displays such 4D light field data.

In another embodiment of the disclosure, the user can select one of these position by touching the display device (i.e. it is a kind of touchscreen) instead of using the remote control unit 376.

Moreover, in one embodiment of the disclosure, the displayed 3D representation from which a user can select a position of a camera associated with 4D light-field data corresponds to a bounded spatial zone. However, in some embodiments of the disclosure, the spatial zone comprising positions of cameras can be greater than the one displayed. Hence, it may be possible to display additional visual indicators (such as arrows, etc.) for indicating a direction where positions of cameras are available. In another embodiment, axis lines x, y, z, as well as an origin are displayed. In one embodiment, the position of the origin is centered according to user's input.

In one embodiment of the disclosure, it is possible to perform rotation of the three axis lines. In one embodiment of the disclosure, the user can zoom in or out in a selected zone chosen by the user.

Figure 34:
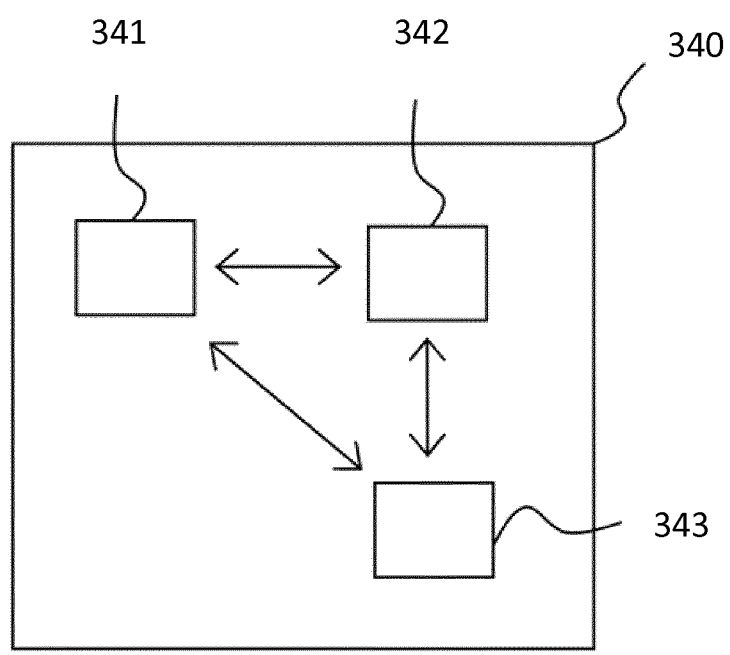
FIG. 34 presents an example of an electronic device that can be used to perform one or several steps of methods disclosed in the present document.

FIG. 34 presents an example of an electronic device that can be used to perform one or several steps of methods disclosed in the present document.

Such electronic device referenced 340 comprises a computing unit (for example a CPU, for "Central Processing Unit"), referenced 341, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 342. Computer programs are made of instructions that can be executed by the computing unit. Such electronic device 340 can also comprise a dedicated unit, referenced 343, constituting an input-output interface to allow the device 340 to communicate with other electronic devices. In particular, this dedicated unit 343 can be connected with an antenna (in order to perform communication without contacts), or with serial ports (to carry communications "contact"). It should be noted that the arrows in FIG. 34 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 34.

In one embodiment of the disclosure, the electronic device depicted in FIG. 34 can be comprised in a camera device that is configure to capture images (either conventional 2D images or a sampling of a light field). These images are stored on one or more memory units. Hence, these images can be viewed as bit stream data (i.e. a sequence of bits). Obviously, a bit stream can also be converted on byte stream and vice versa.

The invention claimed is:

1. A method for encoding a light field content, wherein the method comprises:
    obtaining, for a set of light rays associated with said light field content, four coordinates per light ray from a two planes parametrization of said light field content;
    obtaining, for each light ray from said set, two coordinates from said four coordinates, corresponding to a projection of said light rays from said set onto a plane perpendicular to two planes used in said two planes parametrization, defining points in a first 2D ray diagram;
    determining lines of interest in said first 2D ray diagram;
    encoding said lines of interest into encoded lines of interest; and
    storing said encoded lines of interest; wherein the method further comprises
    estimating coordinates of at least one center of projection and a radius associated with said at least one center of projection, said estimating comprising:
    obtaining at least one slope parameter m and thickness parameters $d_{max_x}$, $d_{min_x}$ for a line of interest in said first 2D ray diagram, said line of interest being associated with a center of projection $x_3$, $y_3$, $z_3$ and a radius A;
    estimating said coordinates $x_3$, $y_3$, $z_3$ of a center of projection and said radius A from said at least one slope parameter m and said thickness parameters $d_{max_x}$, $d_{min_x}$.

2. An electronic device for encoding a light field content, wherein the electronic device comprises: a memory; and at least one processor coupled to the memory, the at least one processor being configured to:
    obtain, for a set of light rays associated with said light field content, four coordinates per light ray from a two planes parametrization of said light field content;
    obtain, for each light ray from said set, two coordinates from said four coordinates, corresponding to a projection of said light rays from said set onto a plane perpendicular to two planes used in said two planes parametrization, defining points in a first 2D ray diagram;
    determine lines of interest in said first 2D ray diagram;
    encode said lines of interest; and
    store said encoded lines of interest, wherein said at least one processor is further configured to estimate coordinates of at least one center of projection and a radius associated with said at least one center of projection, comprising the at least one processor being further configured to:
    obtain at least one slope parameter m and thickness parameters $d_{max_x}$, $d_{min_x}$ for a line of interest in said first 2D ray diagram, said line of interest being associated with a center of projection $x_3$, $y_3$, $z_3$ and a radius A; and
    estimate said coordinates $x_3$, $y_3$, $z_3$ of a center of projection and said radius A from said at least one slope parameter m and said thickness parameters $d_{max_x}$, $d_{min_x}$.

3. The method for encoding a light field content according to claim 1, wherein said encoding said lines of interest further comprises applying the Bresenham algorithm.

4. The method of encoding a light field content according to claim 1,
    wherein said two planes used in said two planes parametrization, named a first plane and a second plane, are discretized planes comprising rectangular elements, wherein a maximum value for a length of a side of a rectangular element in said first plane is equal to $$\frac{z_f - z_2}{f} p,$$

where $z_f$ is a depth value of a sensor array comprised in a camera device with a pixel pitch p, f is a focal length of said camera device, and $z_1$ is a first depth value associated with said first plane, and wherein maximum value for a length side of a rectangular element in said second plane is equal to $$\frac{z_f - z_1}{f} p,$$

where $z_2$ is a second depth value associated with said second plane.

5. The method for encoding a light field content according to claim 1, wherein said storing comprises, for at least one first point belonging to a first encoded line of interest in said first 2D ray diagram:
    storing radiance of a light ray associated with at least a second point belonging to a second encoded line of interest in a second 2D ray diagram, said second encoded line of interest having the same slope as the first encoded line of interest, and storing a first additional information indicating the presence of a light ray; and/or
    storing a second additional information indicating that no light ray is associated with at least a third point, belonging to said second encoded line of interest.

6. The method for encoding a light field content according to claim 5, wherein said first and/or second additional information is a bit, and wherein said radiance of a light ray is encoded by three bytes values.

7. The method for encoding a light field content according to claim 1, wherein said two planes used in said two planes parametrization, named a first plane and a second plane, are associated with respectively a first depth value $z_1$ and a second depth value $z_2$, and wherein said estimating comprises obtaining $$z_3 = \frac{mz_1 - z_2}{m - 1}, A = \frac{d_{max_x} - d_{min_x}}{2k} \text{ with } k = \frac{z_2 - z_1}{z_3 - z_1},$$

$$x_3 = A \frac{d_{max_x} + d_{min_x}}{d_{max_x} - d_{min_x}} \text{ and } y_3 = A \frac{d_{max_y} + d_{min_y}}{d_{max_y} - d_{min_y}}.$$

8. The method for encoding a light field content according to claim 1, wherein said storing said encoded lines of interest further comprises storing a slope associated with an encoded line of interest, and storing, for each point belonging to an encoded line of interest in said first 2D ray diagram, a set of points belonging to a second 2D ray diagram, and in the case that a slope associated with a processed encoded line of interest in said first 2D ray diagram is greater than another slopes associated with other encoded lines of interest in said first 2D ray diagram, avoiding the storage of said set of point belonging to said second 2D ray diagram, when a point in said first 2D ray diagram belongs to an intersection between said processed encoded line of interest and said other encoded line of interest.

9. The method for encoding a light field content according to claim 8, wherein said avoiding further comprises storing an information indicating an occlusion.

10. The method for encoding a light field content according to claim 9, wherein said information is a null value.

11. A computer-readable and non-transitory storage medium storing a computer program comprising a set of computer-executable instructions to implement a method for encoding a light field content when the instructions are executed by a computer, wherein the instructions comprise instructions, which when executed, configure the computer to perform a method of claim 1.

12. The electronic device for encoding a light field content according to claim 2, wherein said at least one processor is further configured to encode said lines of interest with the Bresenham algorithm.

13. The electronic device for encoding a light field content according to claim 2, wherein said at least one processor is further configured to, for at least one first point belonging to a first encoded line of interest in said first 2D ray diagram:
store radiance of a light ray associated with at least a second point belonging to a second encoded line of interest in a second 2D ray diagram, said second encoded line of interest having the same slope as the first encoded line of interest, and storing a first additional information indicating the presence of a light ray; and/or
store a second additional information indicating that no light ray is associated with at least a third point, belonging to said second encoded line of interest.

14. The electronic device for encoding a light field content according to claim 2, wherein said two planes used in said two planes parametrization, named a first plane and a second plane, are discretized planes comprising rectangular elements, wherein a maximum value for a length of a side of a rectangular element in said first plane is equal to $$\frac{z_f - z_1}{f} p,$$

where $z_f$ is a depth value of a sensor array comprised in a camera device with a pixel pitch p, f is a focal length of said camera device, and $z_1$ is a first depth value associated with said first plane, and wherein maximum value for a length side of a rectangular element in said second plane is equal to $$\frac{z_f - z_2}{f} p,$$

where $z_2$ is a second depth value associated with said second plane.

15. The method of claim 1, wherein determining lines of interest in said first 2D ray diagram comprises applying a discrete Radon transform on said first 2D ray diagram to deliver said lines of interest in said first 2D ray diagram.

16. The electronic device of claim 2, wherein the at least one processor being configured to determine lines of interest in said first 2D ray diagram comprises the at least one processor being further configured to apply a discrete Radon transform on said first 2D ray diagram to deliver said lines of interest in said first 2D ray diagram.

17. The method for encoding a light field content according to claim 1, wherein
said four coordinates per light ray are coordinates of intersection points of said light ray with the two planes used for said two planes parametrization, said intersection points being points in coordinate systems defined by said two planes, said two planes being parallel to each other and having known z-values; and further comprising
determining parameters of said lines of interest, said parameters comprising for each line of interest a slope or a parameter coupled with the slope, and an intercept; and wherein storing said encoded lines of interest comprises
storing said parameters of said lines of interest as headers for encoded lines of interest, wherein said storing comprises, for at least one first point belonging to a first line of interest in said first 2D ray diagram:
storing a radiance of a light ray associated with at least a second point belonging to a second encoded line of interest in a second 2D ray diagram, said second encoded line of interest having the same slope as the first encoded line of interest, and
storing a first additional information indicating the presence of a light ray; or
storing a second additional information indicating that no light ray is associated with at least a third point, belonging to said second encoded line of interest.

* * * * *